United States Patent
von Flotow et al.

(10) Patent No.: US 11,897,628 B2
(45) Date of Patent: *Feb. 13, 2024

(54) ROTORCRAFT-ASSISTED SYSTEM FOR LAUNCHING AND RETRIEVING A FIXED-WING AIRCRAFT INTO AND FROM FREE FLIGHT

(71) Applicant: Hood Technology Corporation, Hood River, OR (US)

(72) Inventors: Andreas H. von Flotow, Hood River, OR (US); Corydon C. Roeseler, Hood River, OR (US)

(73) Assignee: Hood Technology Corporation, Hood River, OR (US)

( * ) Notice: Subject to any disclaimer, the term of this patent is extended or adjusted under 35 U.S.C. 154(b) by 200 days.

This patent is subject to a terminal disclaimer.

(21) Appl. No.: 17/246,969

(22) Filed: May 3, 2021

(65) Prior Publication Data
US 2021/0316861 A1    Oct. 14, 2021

Related U.S. Application Data

(63) Continuation of application No. 16/119,283, filed on Aug. 31, 2018, now Pat. No. 11,027,844.
(Continued)

(51) Int. Cl.
*B64D 5/00* (2006.01)
*B64U 70/20* (2023.01)
*B64F 1/04* (2006.01)
*B64F 1/22* (2006.01)
*B64C 39/02* (2023.01)
(Continued)

(52) U.S. Cl.
CPC .............. *B64D 5/00* (2013.01); *B64C 39/024* (2013.01); *B64F 1/029* (2020.01); *B64F 1/0295* (2020.01); *B64F 1/04* (2013.01); *B64F 1/222* (2013.01); *B64U 70/20* (2023.01); *B64U 70/30* (2023.01); *B64U 80/00* (2023.01)

(58) Field of Classification Search
CPC ................................. B64D 5/00; B64U 70/20
See application file for complete search history.

(56) References Cited

U.S. PATENT DOCUMENTS

| 968,339 | A | 8/1910 | Geraldson |
| 1,144,505 | A | 6/1915 | Steffan |

(Continued)

FOREIGN PATENT DOCUMENTS

| CA | 781808 A | 4/1968 |
| CA | 839101 A | 4/1970 |

(Continued)

OTHER PUBLICATIONS

"Bell QTR Quad Tiltrotor", AVIASTAR (3 pages), Jul. 27, 2015.
(Continued)

*Primary Examiner* — Joseph W Sanderson
(74) *Attorney, Agent, or Firm* — Neal, Gerber & Eisenberg LLP

(57) ABSTRACT

A rotorcraft-assisted system configured to launch a fixed-wing aircraft into flight comprising a fixed-wing aircraft and an aircraft launch apparatus where the aircraft launch apparatus comprises a mechanism for attaching the rotorcraft to the fixed-wing aircraft, such as a saddle that removably engages the wing or wings of the fixed-wing aircraft.

22 Claims, 54 Drawing Sheets

Related U.S. Application Data

(60) Provisional application No. 62/554,730, filed on Sep. 6, 2017.

(51) Int. Cl.
*B64F 1/02* (2006.01)
*B64U 70/30* (2023.01)
*B64U 80/00* (2023.01)

(56) References Cited

U.S. PATENT DOCUMENTS

| | | | |
|---|---|---|---|
| 1,306,860 A | 6/1919 | Smith | |
| 1,383,595 A | 7/1921 | Black | |
| 1,499,472 A | 7/1924 | Pratt | |
| 1,582,188 A | 4/1926 | Mummert | |
| 1,625,020 A | 4/1927 | Guillermo | |
| 1,686,298 A | 10/1928 | Uhl | |
| 1,716,670 A | 6/1929 | Sperry | |
| 1,731,091 A | 10/1929 | Clayton | |
| 1,748,663 A | 2/1930 | Tucker | |
| 1,836,010 A | 12/1931 | Audrain | |
| 1,848,828 A | 3/1932 | Griffin | |
| 1,912,723 A | 6/1933 | Perkins | |
| 2,415,071 A | 2/1947 | Brie | |
| 2,435,197 A | 2/1948 | Brodie | |
| 2,440,574 A | 4/1948 | Cotton | |
| 2,448,209 A | 8/1948 | Boyer et al. | |
| 2,488,050 A | 11/1949 | Brodie | |
| 2,488,051 A | 11/1949 | Brodie | |
| 2,552,115 A | 5/1951 | Replogle | |
| 2,807,429 A | 9/1957 | Hawkins et al. | |
| 2,843,337 A * | 7/1958 | James | F16C 11/069 244/2 |
| 2,944,815 A | 7/1960 | Moyer | |
| 3,017,138 A | 1/1962 | Flint | |
| 3,029,049 A | 4/1962 | Melville | |
| 3,146,974 A | 9/1964 | Petoia | |
| 3,249,322 A * | 5/1966 | Holland, Jr. | B64D 5/00 244/3 |
| 3,351,325 A | 11/1967 | Cotton | |
| 3,389,880 A | 6/1968 | Ferguson | |
| 3,785,316 A | 1/1974 | Leming et al. | |
| 3,980,259 A | 9/1976 | Greenhalgh et al. | |
| 4,079,901 A | 3/1978 | Mayhew et al. | |
| 4,116,408 A | 9/1978 | Soloy | |
| 4,123,020 A | 10/1978 | Korsak | |
| 4,147,317 A | 4/1979 | Mayhew et al. | |
| 4,267,987 A * | 5/1981 | McDonnell | B64D 39/00 244/6 |
| 4,311,290 A | 1/1982 | Koper | |
| 4,523,729 A | 6/1985 | Frick | |
| 4,575,026 A | 3/1986 | Brittain et al. | |
| 4,680,962 A | 7/1987 | Durbin | |
| 4,753,400 A | 6/1988 | Reuter et al. | |
| 4,757,959 A * | 7/1988 | Schroder | B64D 3/00 244/137.4 |
| 4,790,497 A | 12/1988 | Yoffe | |
| 4,842,222 A | 6/1989 | Baird | |
| 5,000,398 A * | 3/1991 | Rashev | B64C 27/08 244/116 |
| 5,039,034 A | 8/1991 | Burgess et al. | |
| 5,042,750 A | 8/1991 | Winter | |
| 5,054,717 A | 10/1991 | Taylor | |
| 5,092,540 A | 3/1992 | Burgess et al. | |
| 5,687,930 A | 11/1997 | Wagner et al. | |
| 5,799,900 A | 9/1998 | Mcdonnell | |
| 5,806,795 A | 9/1998 | Ortelli | |
| 6,264,140 B1 | 7/2001 | Mcgeer et al. | |
| 6,824,102 B2 | 11/2004 | Haggard | |
| 6,874,729 B1 | 4/2005 | Mcdonnell | |
| 6,961,018 B2 | 11/2005 | Heppe et al. | |
| 7,000,883 B2 | 2/2006 | Mercadal et al. | |
| 7,028,947 B2 | 4/2006 | Burns | |
| 7,059,564 B2 | 6/2006 | Dennis | |
| 7,066,430 B2 | 6/2006 | Dennis et al. | |
| 7,090,166 B2 | 8/2006 | Dennis et al. | |
| 7,097,137 B2 | 8/2006 | Mcdonnell | |
| 7,104,495 B2 | 9/2006 | Mcgeer | |
| 7,114,680 B2 | 10/2006 | Dennis | |
| 7,121,507 B2 | 10/2006 | Dennis et al. | |
| 7,128,294 B2 | 10/2006 | Roeseler et al. | |
| 7,140,575 B2 | 11/2006 | Mcgeer et al. | |
| 7,143,974 B2 | 12/2006 | Roeseler et al. | |
| 7,143,976 B2 | 12/2006 | Snediker et al. | |
| 7,152,827 B2 | 12/2006 | Mcgeer | |
| 7,165,745 B2 | 1/2007 | Mcgeer et al. | |
| 7,175,135 B2 | 2/2007 | Dennis et al. | |
| 7,219,856 B2 | 5/2007 | Watts et al. | |
| 7,264,204 B1 | 9/2007 | Portmann | |
| 7,344,108 B2 | 3/2008 | Muylaert et al. | |
| 7,360,741 B2 | 4/2008 | Mcgeer et al. | |
| 7,410,125 B2 | 8/2008 | Steele | |
| 7,464,650 B2 | 12/2008 | Steinkerchner et al. | |
| 7,510,145 B2 | 3/2009 | Snediker | |
| 7,530,527 B2 | 5/2009 | Kelleher | |
| 7,543,780 B1 | 6/2009 | Marshall et al. | |
| 7,562,843 B2 | 7/2009 | Lipponen | |
| 7,578,467 B2 | 8/2009 | Goodrich | |
| 7,581,702 B2 | 9/2009 | Olson et al. | |
| 7,602,415 B2 | 10/2009 | Von et al. | |
| 7,665,691 B2 | 2/2010 | Hanzlick et al. | |
| 7,712,702 B2 | 5/2010 | Mcgeer et al. | |
| 7,798,445 B2 | 9/2010 | Heppe et al. | |
| 7,806,366 B2 | 10/2010 | Jackson | |
| 7,876,359 B2 | 1/2011 | Von et al. | |
| 7,883,059 B2 | 2/2011 | Kunz | |
| 7,954,758 B2 | 6/2011 | Mcgeer et al. | |
| 8,091,833 B2 | 1/2012 | Von et al. | |
| 8,140,200 B2 | 3/2012 | Heppe et al. | |
| 8,162,256 B2 | 4/2012 | Goossen et al. | |
| 8,172,177 B2 | 5/2012 | Lovell et al. | |
| 8,226,039 B2 | 7/2012 | Von et al. | |
| 8,231,083 B2 | 7/2012 | Kutzmann et al. | |
| 8,245,968 B2 | 8/2012 | Mcgeer et al. | |
| 8,276,844 B2 | 10/2012 | Kariv | |
| 8,292,215 B2 | 10/2012 | Olm et al. | |
| 8,313,057 B2 | 11/2012 | Rednikov | |
| 8,348,193 B2 | 1/2013 | Mcgeer et al. | |
| 8,405,723 B2 | 3/2013 | Von et al. | |
| 8,453,966 B2 | 6/2013 | Mcgeer et al. | |
| 8,464,981 B2 | 6/2013 | Goldie et al. | |
| 8,573,536 B2 | 11/2013 | Mcgeer et al. | |
| 8,596,576 B1 | 12/2013 | Mcgeer et al. | |
| 8,672,264 B1 | 3/2014 | Mcgeer et al. | |
| 8,708,277 B1 | 4/2014 | Mcgeer et al. | |
| 8,708,278 B2 | 4/2014 | Mcgeer et al. | |
| 8,714,482 B2 | 5/2014 | Mcgeer et al. | |
| 8,740,134 B2 * | 6/2014 | Suzuki | G05D 1/104 244/75.1 |
| 8,740,142 B2 | 6/2014 | Mcgeer et al. | |
| 8,857,754 B2 * | 10/2014 | Ferrari | B64D 1/22 244/2 |
| 8,944,373 B2 | 2/2015 | Dickson et al. | |
| 8,950,698 B1 * | 2/2015 | Rossi | B64C 27/26 244/63 |
| 8,955,800 B2 | 2/2015 | Mcgeer et al. | |
| 8,955,801 B2 | 2/2015 | Mcgeer et al. | |
| 8,991,793 B1 | 3/2015 | Bernhardt | |
| 9,004,402 B2 | 4/2015 | Mcgeer et al. | |
| 9,010,683 B2 | 4/2015 | Gundlach et al. | |
| 9,132,916 B2 * | 9/2015 | Hanna | B64C 39/024 |
| 9,193,481 B2 | 11/2015 | Mcgeer et al. | |
| 9,266,609 B1 | 2/2016 | Kunz | |
| 9,290,269 B2 | 3/2016 | Walker et al. | |
| 9,340,301 B2 | 5/2016 | Dickson et al. | |
| 9,359,075 B1 * | 6/2016 | von Flotow | B64D 5/00 |
| 9,434,481 B2 | 9/2016 | Mcgeer | |
| 9,456,185 B2 | 9/2016 | Oakley et al. | |
| 9,475,575 B2 * | 10/2016 | Rossi | B64C 27/28 |
| 9,527,604 B2 | 12/2016 | Melish et al. | |
| 9,637,245 B2 | 5/2017 | Yoffe | |
| 9,656,765 B2 * | 5/2017 | von Flotow | B64D 5/00 |
| 9,685,091 B2 | 6/2017 | Hayes | |

(56) References Cited

U.S. PATENT DOCUMENTS

| | | | |
|---|---|---|---|
| 9,816,816 B2 | 11/2017 | Hayes | |
| 9,856,036 B2 | 1/2018 | Dickson et al. | |
| 9,896,222 B2 | 2/2018 | Kunz et al. | |
| 10,144,511 B2* | 12/2018 | von Flotow | B64C 39/024 |
| 10,183,741 B2* | 1/2019 | Roeseler | B64D 3/00 |
| 10,293,929 B2* | 5/2019 | von Flotow | B64C 25/10 |
| 10,457,389 B2* | 10/2019 | von Flotow | B64F 1/0295 |
| 10,501,176 B2* | 12/2019 | von Flotow | B64D 35/02 |
| 10,518,902 B2 | 12/2019 | Briggs et al. | |
| 10,538,318 B2* | 1/2020 | von Flotow | B65D 25/10 |
| 10,538,319 B2* | 1/2020 | von Flotow | B64C 27/26 |
| 10,549,851 B2* | 2/2020 | von Flotow | B64F 1/0295 |
| 10,569,868 B2* | 2/2020 | von Flotow | B64C 27/08 |
| 10,577,094 B2* | 3/2020 | von Flotow | B64C 25/08 |
| 10,583,920 B2* | 3/2020 | von Flotow | B64C 11/48 |
| 10,589,851 B2* | 3/2020 | von Flotow | B64C 27/001 |
| 10,597,149 B2* | 3/2020 | von Flotow | B64C 39/024 |
| 10,633,085 B2* | 4/2020 | von Flotow | B65D 85/68 |
| 10,696,385 B2* | 6/2020 | von Flotow | B64D 5/00 |
| 10,696,388 B2* | 6/2020 | von Flotow | B64C 39/024 |
| 10,696,419 B2* | 6/2020 | von Flotow | B64F 1/029 |
| 10,696,420 B2* | 6/2020 | von Flotow | F15B 9/14 |
| 10,730,615 B2* | 8/2020 | Roeseler | B64F 1/029 |
| 10,745,121 B2* | 8/2020 | von Flotow | B64D 1/00 |
| 10,752,345 B2* | 8/2020 | von Flotow | B64D 1/02 |
| 10,752,357 B2* | 8/2020 | von Flotow | B64U 70/20 |
| 10,836,477 B2* | 11/2020 | von Flotow | B64C 27/26 |
| 10,836,509 B2* | 11/2020 | McGrew | B64C 37/02 |
| 10,899,441 B1* | 1/2021 | von Flotow | B64C 27/26 |
| 10,933,997 B2* | 3/2021 | Hayes | B64C 39/024 |
| 10,988,257 B2* | 4/2021 | von Flotow | B64C 27/14 |
| 11,008,102 B2* | 5/2021 | Ryan | B64C 3/56 |
| 11,027,844 B2* | 6/2021 | von Flotow | B64U 50/13 |
| 11,053,008 B2* | 7/2021 | Drennan | B64U 80/86 |
| 11,104,439 B2* | 8/2021 | Fenny | B64D 5/00 |
| 11,204,612 B2* | 12/2021 | von Flotow | G05D 1/104 |
| 11,230,389 B2 | 1/2022 | Gamble et al. | |
| 11,286,059 B2* | 3/2022 | von Flotow | B64C 27/04 |
| 11,299,264 B2* | 4/2022 | Roeseler | B64D 3/00 |
| 11,312,492 B1* | 4/2022 | von Flotow | B64U 10/13 |
| 11,524,797 B2* | 12/2022 | von Flotow | B64C 39/024 |
| 11,548,608 B2* | 1/2023 | Drennan | B64C 3/546 |
| 2002/0100838 A1 | 8/2002 | Mcgeer et al. | |
| 2003/0222173 A1 | 12/2003 | Mcgeer et al. | |
| 2004/0256519 A1 | 12/2004 | Ellis et al. | |
| 2005/0017129 A1 | 1/2005 | McDonnell | |
| 2005/0178894 A1 | 8/2005 | Mcgeer et al. | |
| 2009/0224097 A1 | 9/2009 | Kariv | |
| 2010/0025528 A1 | 2/2010 | Jackson | |
| 2012/0223182 A1 | 9/2012 | Gilchrist et al. | |
| 2012/0292430 A1* | 11/2012 | Ferrari | B64F 1/0295 244/2 |
| 2013/0161447 A1 | 6/2013 | Mcgeer et al. | |
| 2014/0117147 A1* | 5/2014 | Hanna | B64C 39/024 244/2 |
| 2014/0263852 A1 | 9/2014 | Walker et al. | |
| 2015/0115096 A1* | 4/2015 | Rossi | B64C 37/02 244/2 |
| 2015/0129716 A1 | 5/2015 | Yoffe | |
| 2015/0314871 A1 | 11/2015 | Von Flotow | |
| 2015/0360797 A1 | 12/2015 | Melish et al. | |
| 2016/0023760 A1 | 1/2016 | Goodrich | |
| 2016/0114906 A1 | 4/2016 | Mcgeer et al. | |
| 2016/0152339 A1* | 6/2016 | von Flotow | B64C 27/04 244/2 |
| 2016/0221683 A1 | 8/2016 | Roberts et al. | |
| 2016/0236797 A1* | 8/2016 | von Flotow | B64F 1/0295 |
| 2016/0327945 A1* | 11/2016 | Davidson | G05D 1/0027 |
| 2017/0036762 A1* | 2/2017 | Gamble | B64U 10/25 |
| 2017/0072812 A1 | 3/2017 | Von Novak et al. | |
| 2017/0225784 A1 | 8/2017 | Hayes et al. | |
| 2017/0274997 A1 | 9/2017 | Von Flotow et al. | |
| 2017/0297738 A1 | 10/2017 | Von Flotow et al. | |
| 2017/0327230 A1 | 11/2017 | Von Flotow et al. | |
| 2017/0369185 A1 | 12/2017 | Grubb | |
| 2018/0050823 A1 | 2/2018 | Mcgeer | |
| 2018/0086481 A1 | 3/2018 | Briggs et al. | |
| 2018/0162528 A1* | 6/2018 | McGrew | B64F 1/02 |
| 2018/0327093 A1 | 11/2018 | Von Flotow et al. | |
| 2018/0327113 A1 | 11/2018 | Von Flotow et al. | |
| 2019/0033889 A1* | 1/2019 | von Flotow | G05D 1/104 |
| 2019/0329886 A1 | 10/2019 | Pinto | |
| 2020/0331598 A1* | 10/2020 | Roeseler | B64C 39/024 |
| 2020/0331633 A1* | 10/2020 | von Flotow | B64C 39/024 |
| 2022/0066471 A1* | 3/2022 | von Flotow | B64U 80/82 |

FOREIGN PATENT DOCUMENTS

| | | | | |
|---|---|---|---|---|
| CN | 204822072 U | | 12/2015 | |
| CN | 106915444 A | * | 7/2017 | B64C 27/08 |
| CN | 106915452 A | * | 7/2017 | B64C 27/08 |
| CN | 106915463 A | * | 7/2017 | B64D 5/00 |
| CN | 106965933 A | * | 7/2017 | B64D 47/00 |
| EP | 0472613 A1 | | 3/1992 | |
| EP | 2186728 A1 | | 5/2010 | |
| GB | 2071031 A | | 9/1981 | |
| WO | 0107318 A1 | | 2/2001 | |
| WO | 2008015663 A1 | | 2/2008 | |
| WO | 2013171735 A1 | | 11/2013 | |
| WO | 2014204550 A2 | | 12/2014 | |
| WO | 2016167849 A1 | | 10/2016 | |

OTHER PUBLICATIONS

"Flexrotor Long-Endurance VTOL Aircraft Transitions to Wing-Borne Flight", Aerovel, http://www.aerovelco.com/papers/FlexrotorTransitionsAnnouncement.pdf (2 pages), Aug. 4, 2011.

"Rotary Action", Pigasus Press, Description of Scene of License to Kill, http://www.rotaryaction.com/pages/licetkil.html, 2014 (2 pages).

"Screen captures from YouTube video clip entitled "Rc glider launched"", 20 pages, uploaded on Sep. 11, 2016 by user "carrier drone". Retrieved from Internet: https://www.youtube.com/watch?v=cAyDJBosNul&feature=youtu.be.

"Skyhook (Harrier Handling System)", www.harpoondatabases.com/encyclopedia/Entry2979.aspx (3 pages), Jun. 21, 2013.

"The Beartrap—A Canadian Invention", Originally published in Crowsnest Magazine—vol. 17, Nos. 3 and 4 (Mar.-Apr. 1965); retrieved at http://www.readyayeready.com/timeline/1960s/beartrap/index.htm>, retrieved on Sep. 14, 2007 (4 pages).

"TRAPEZE", Wikipedia, available at http://en.wikipedia.org/w/index.php?title=Trapeze&oldid=67584367 as of Aug. 4, 2006 (2 pages).

Dickard, H. E., "Mini-RPV Recovery System Conceptual Study", Teledyne Ryan Aeronautical, Prepared for Eustis Directorate, U.S. Army Air Mobility Research and Development Laboratory, Aug. 1977 (322 pages).

Durbin, Enoch, et al., "An Airspeed Vector Sensor for V/STOL Aircraft", Journal of Aircraft, vol. 19, No. 6, Jun. 1982 (7 pages), 449-455.

Hendrickson, Stephen P., et al., "A Miniature Powerplant for Very Small, Very Long Range Autonomous Aircraft", Final Report to the United States Department of Energy under contract No. DE-FG03-96ER82187 (Phase II SBIR) (23 pages), Sep. 29, 1999.

Holland, Greg J., et al., "Autonomous Aerosondes for Economical Atmospheric Soundings Anywhere on the Globe", Bulletin of the American Meteorological Society, vol. 73, No. 12, Dec. 1992 (12 pages).

McGeer, Tad, "Aerosonde Hazard Estimation", The Insitu Group, 1994 (7 pages).

McGeer, Tad, "Aerosonde Pacific Reconnaissance: Ready When You Are!", The Insitu Group, Pacific Northwest Weather Workshop, Mar. 2005 (15 pages).

McGeer, Tad, "Laima: the First Atlantic Crossing By Unmanned Aircraft", The Insitu Group (25 pages).

McGeer, Tad, et al., "Quantitative Risk Management as a Regulatory Approach to Civil UAVs", International Workshop on UAV Certification, Jun. 1999 (11 pages).

McGeer, Tad, "Regulatory Issues Involving Long-Range Weather Observation by Aerosonde Autonomous Aircraft", The Insitu Group (8 pages).

(56) References Cited

OTHER PUBLICATIONS

McGeer, Tad, "Safety, Economy, Reliability, and Regulatory Policy for Unmanned Aircraft", www.aerovelco.com, Mar. 2007 (9 pages).
McGeer, Tad, et al., "Wide-Scale Use of Long-Range Miniature Aerosondes Over the World's Oceans", available at www.aerovelco.com/papers/McGeerVagners99.mht, 1999 (25 pages).
Mullens, Katherine, et al., "Automated Launch, Recovery, and Refueling for Small Unmanned Aerial Vehicles", 2004 (11 pages).

* cited by examiner

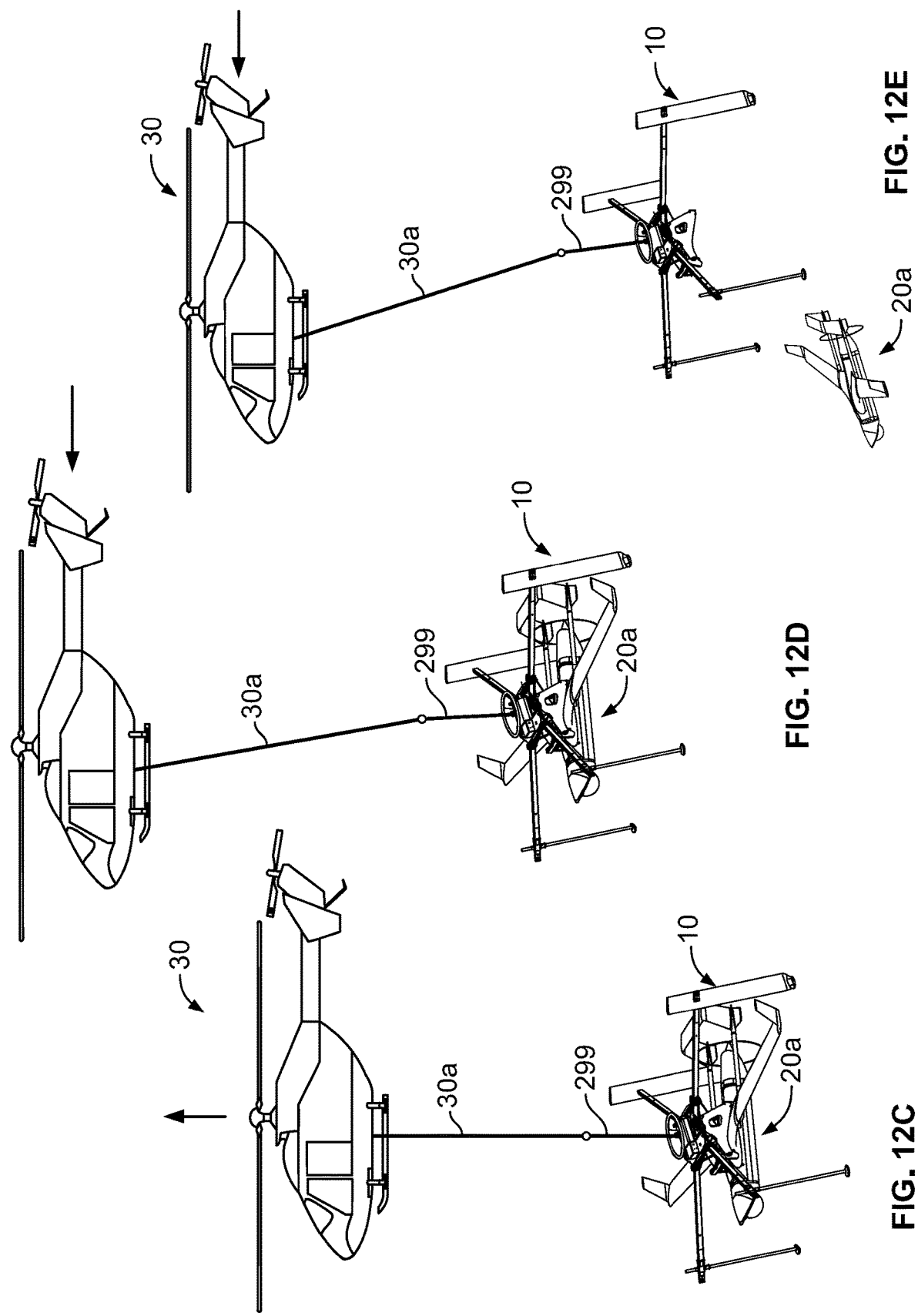

ROTORCRAFT-ASSISTED SYSTEM FOR LAUNCHING AND RETRIEVING A FIXED-WING AIRCRAFT INTO AND FROM FREE FLIGHT

PRIORITY CLAIM

This application is a continuation application and claims priority to and the benefit of U.S. patent application Ser. No. 16/119,283, filed Aug. 31, 2018, which claims priority to and the benefit of U.S. Provisional Patent Application No. 62/554,730, which was filed on Sep. 6, 2017, the entire contents of which is incorporated herein by reference.

FIELD

The present disclosure generally relates to systems and methods for launching fixed-wing aircraft into free, wing-borne flight and for retrieving fixed-wing aircraft from free, wing-borne flight. More specifically, the present disclosure relates to systems and methods for launching fixed-wing aircraft into free, wing-borne flight using a rotorcraft and for retrieving fixed-wing aircraft from free, wing-borne flight using a rotorcraft.

BACKGROUND

Aircraft capable of long-distance, efficient cruising flight typically require long runways for take-off and landing. This limits the locations from which the aircraft can take-off and at which the aircraft can land, since many locations do not have sufficient space for a runway. There is a need for new systems and methods that eliminate the need for these aircraft to use long runways to take-off and land.

SUMMARY

Various embodiments of the present disclosure provide a rotorcraft-assisted system for launching and retrieving a fixed-wing aircraft into and from free flight (sometimes called the "launch and retrieval system" for brevity). The launch and retrieval system is usable with a rotorcraft to launch a fixed-wing aircraft into free, wing-borne flight and to retrieve the fixed-wing aircraft from free, wing-borne flight.

The launch and retrieval system includes a modular, fixed-wing aircraft launch apparatus (sometimes called the "aircraft launch apparatus" for brevity), a storage and launch system, an anchor system, a flexible capture member, and an aircraft-landing device.

The aircraft launch apparatus is attachable to the fixed-wing aircraft and is independently attachable to the rotorcraft to facilitate launching the fixed-wing aircraft into free, wing-borne flight. The storage and launch system is usable to store the aircraft launch apparatus (when disassembled) and to act as a launch mount for the fixed-wing aircraft by retaining the fixed-wing aircraft in a desired launch orientation. The anchor system is usable with the rotorcraft, the flexible capture member, and the aircraft-landing device to retrieve the fixed-wing aircraft from free, wing-borne flight.

Generally, to launch the fixed-wing aircraft into free, wing-borne flight, an operator (or operators): (1) removes the disassembled aircraft launch apparatus from a container of the storage and launch system; (2) assembles the aircraft launch apparatus; (3) mounts the fixed-wing aircraft to the storage and launch system, which retains the fixed-wing aircraft in a desired launch orientation; (4) attaches the aircraft launch apparatus to the fixed-wing aircraft; (5) independently attaches the aircraft launch apparatus to the rotorcraft; (6) controls the rotorcraft to lift the aircraft launch apparatus (and the attached the fixed-wing aircraft) to a desired altitude and to accelerate to a desired speed; (7) controls the aircraft launch apparatus to release the fixed-wing aircraft into free, wing-borne flight; and (8) controls the rotorcraft to land.

Generally, to retrieve the fixed-wing aircraft from free, wing-borne flight, an operator (or operators): (1) attaches a free end of the flexible capture member to the rotorcraft such that the flexible capture member extends from a drum of the anchor system through the aircraft-landing device to the rotorcraft; (2) inflates the aircraft-landing device such that it is positioned above the anchor system; (3) controls the rotorcraft to fly to a designated altitude above the anchor system and to station-keep relative to the anchor system such that the flexible capture member extends therebetween and the anchor system regulates the tension in the flexible capture member; (4) controls the fixed-wing aircraft to contact and capture the flexible capture member; (5) controls the rotorcraft to descend such that the fixed-wing aircraft contacts the aircraft-landing device without destructive impact and without the need for a ground crew to secure the fixed-wing aircraft; and (6) controls the rotorcraft to land.

Additional features and advantages of the present disclosure are described in, and will be apparent from, the following Detailed Description and the Figures.

BRIEF DESCRIPTION OF THE FIGURES

FIG. 12C is a diagrammatic view of the rotorcraft lifting the aircraft launch apparatus and attached fixed-wing aircraft to a desired altitude.

FIG. 12D is a diagrammatic view of the rotorcraft dashing with the aircraft launch apparatus and attached fixed-wing aircraft attached thereto.

FIG. 12E is a diagrammatic view of the rotorcraft and the attached aircraft launch apparatus just after release of the fixed-wing aircraft into free, wing-borne flight.

DETAILED DESCRIPTION

Figure 1A:
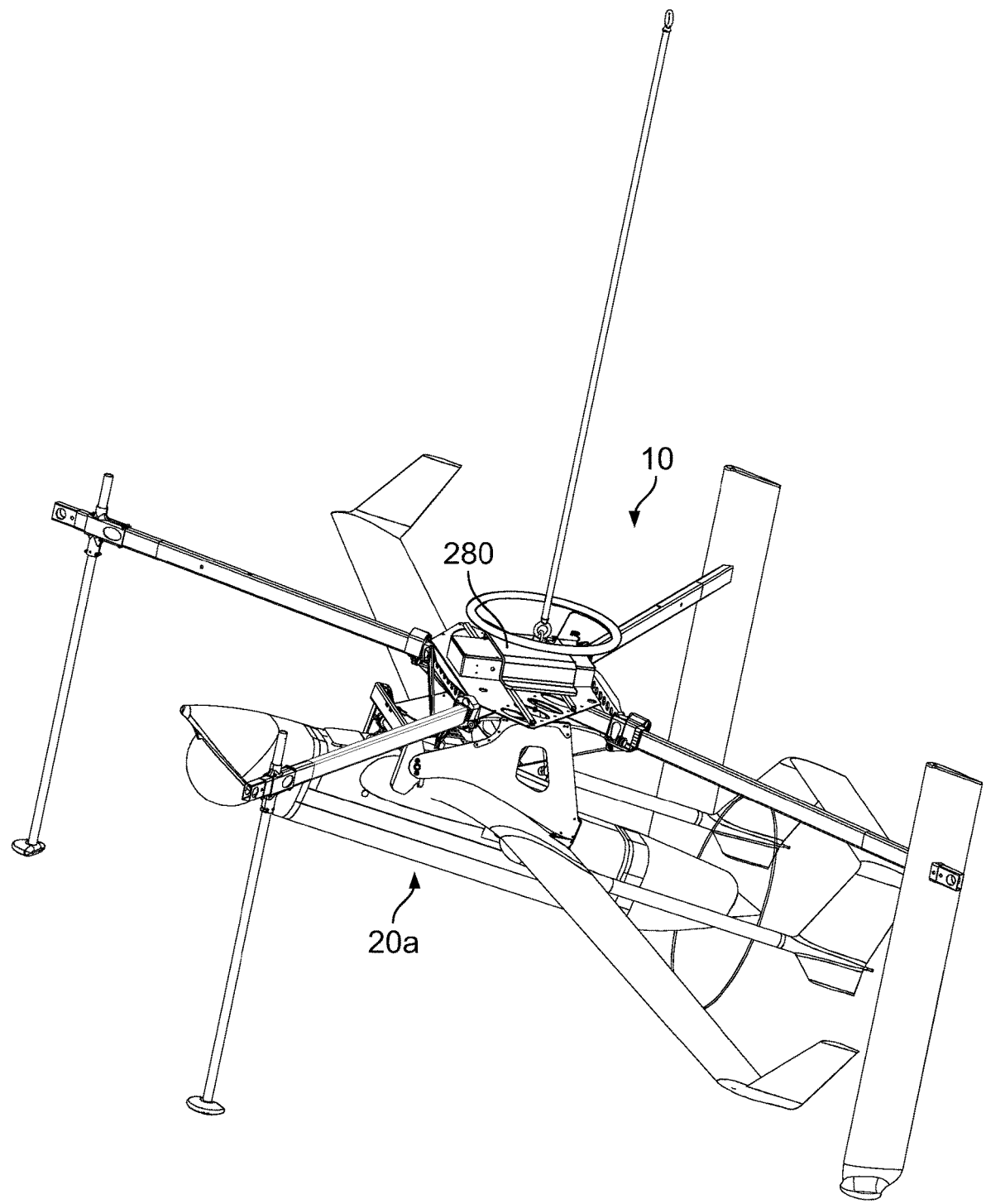
FIG. 1A is a perspective view of one example embodiment of the aircraft launch apparatus of the present disclosure attached to a fixed-wing aircraft.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components; the shapes, sizes, and materials of the components; and the manners of attachment and connections of the components may be made without departing from the spirit or scope of the claims as set forth herein. This specification is intended to be taken as a whole and interpreted in accordance with the principles of the disclosure as taught herein and understood by one of ordinary skill in the art. The drawings are not to scale unless noted otherwise.

The rotorcraft-assisted fixed-wing aircraft launch and retrieval system (sometimes called the "launch and retrieval system" for brevity) of various embodiments of the present disclosure is usable with a rotorcraft 30 to launch a fixed-wing aircraft 20 into free, wing-borne flight and to retrieve the fixed-wing aircraft 20 from free, wing-borne flight. While the fixed-wing aircraft 20 may be any suitable fixed-wing aircraft, the fixed-wing aircraft of the example embodiments described below include: (1) the INTEGRATOR unmanned aerial vehicle 20a (INTEGRATOR is a registered trademark of Insitu, Inc.); and (2) the SCANEAGLE unmanned aerial vehicle 20b (SCANEAGLE is a registered trademark of the Boeing Company). While the rotorcraft 30 may be any suitable rotorcraft—such as a helicopter, quadcopter, or octocopter—the rotorcraft 30 of the example embodiments described below is a UH1 "HUEY," H60, H65, Seahawk, Blackhawk, K-max, R44, Bell 205/206 or similar helicopter with a sling attachment capable of hoisting the mass of the aircraft launch apparatus and the fixed-wing aircraft. In other embodiments, the rotorcraft 30 is replaced with another suitable lift-producing device, such as a balloon or a parasail.

The launch and retrieval system includes a modular, fixed-wing aircraft launch apparatus 10 (sometimes called the "aircraft launch apparatus" for brevity), a storage and launch system 2000, an anchor system 3000, a flexible capture member 5000, and an aircraft-landing device 8000.

The aircraft launch apparatus 10 is attachable to the fixed-wing aircraft 20 and is independently attachable to the rotorcraft 30 to facilitate launching the fixed-wing aircraft 20 into free, wing-borne flight. The storage and launch system 2000 is usable to store the aircraft launch apparatus 10 (when disassembled) and to act as a launch mount for the fixed-wing aircraft 20 by retaining the fixed-wing aircraft 20 in a desired launch orientation. The anchor system 3000 is usable with the rotorcraft 30, the flexible capture member 5000, and the aircraft-landing device 8000 to retrieve the fixed-wing aircraft 20 from free, wing-borne flight.

Generally, to launch the fixed-wing aircraft 20 into free, wing-borne flight, an operator (or operators): (1) removes the disassembled aircraft launch apparatus 10 from a container of the storage and launch system 2000; (2) assembles the aircraft launch apparatus 10; (3) mounts the fixed-wing aircraft 20 to the storage and launch system 2000, which retains the fixed-wing aircraft 20 in a desired launch orientation; (4) attaches the aircraft launch apparatus 10 to the fixed-wing aircraft 20; (5) independently attaches the aircraft launch apparatus 10 to the rotorcraft 30; (6) controls the rotorcraft 30 to lift the aircraft launch apparatus 10 (and the attached fixed-wing aircraft 20) to a desired altitude and to accelerate to a desired speed; (7) controls the aircraft launch apparatus 10 to release the fixed-wing aircraft 20 into free, wing-borne flight; and (8) controls the rotorcraft 30 to land.

Generally, to retrieve the fixed-wing aircraft 20 from free, wing-borne flight, an operator (or operators): (1) attaches a free end of the flexible capture member 5000 to the rotorcraft 30 such that the flexible capture member 5000 extends from a drum of the anchor system 3000 through the aircraft-landing device 8000 to the rotorcraft 30; (2) inflates the aircraft-landing device 8000 such that it is positioned above the anchor system 3000; (3) controls the rotorcraft 30 to fly to a designated altitude above the anchor system 3000 and to station-keep relative to the anchor system 3000 such that the flexible capture member 5000 extends therebetween and the anchor system 3000 regulates the tension in the flexible capture member 5000; (4) controls the fixed-wing aircraft 20 to contact and capture the flexible capture member 5000; (5) controls the rotorcraft 30 to descend such that the fixed-wing aircraft 20 contacts the aircraft-landing device 8000 without destructive impact and without the need for a ground crew to secure the fixed-wing aircraft 20; and (6) controls the rotorcraft 30 to land. Afterwards, a ground crew can retrieve the fixed-wing aircraft 20 from the aircraft-landing device 8000.

1. Aircraft Launch Apparatus Components

Figure 1B:
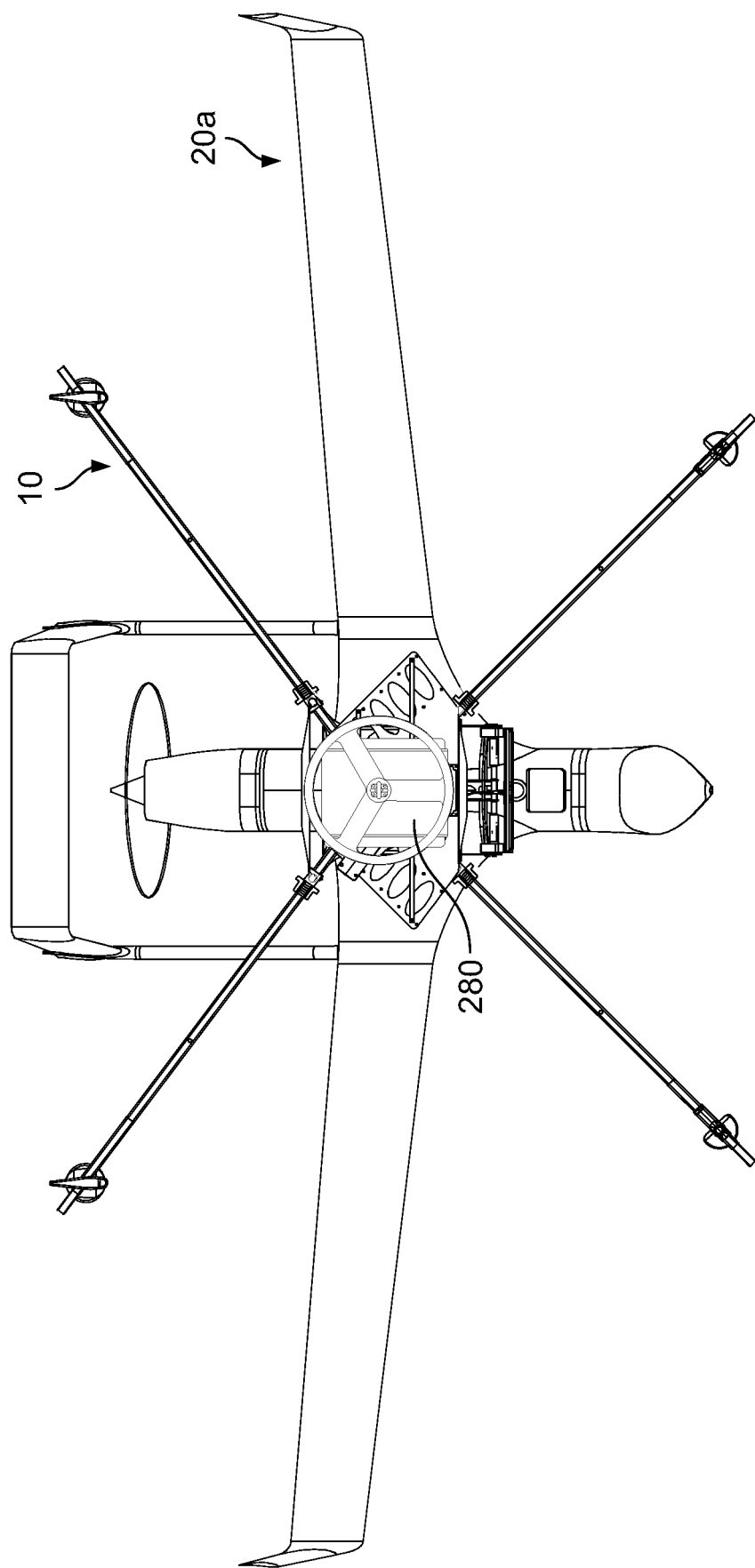
FIG. 1B is a top plan view of the aircraft launch apparatus and the fixed-wing aircraft of FIG. 1A.
Figure 1C:
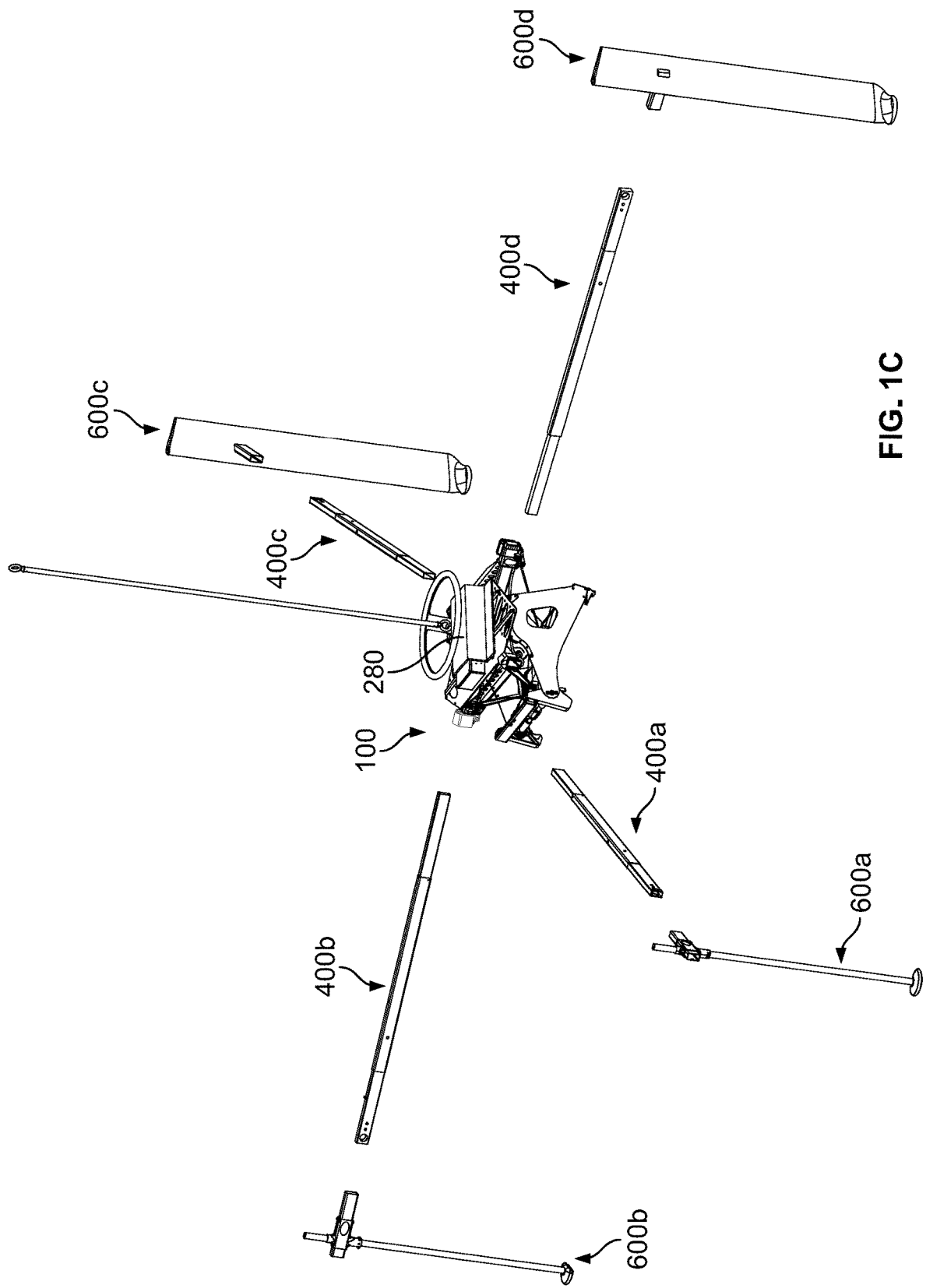
FIG. 1C is a partially-exploded perspective view of the aircraft launch apparatus of FIG. 1A.

FIGS. 1A, 1B, and 1C show the aircraft launch apparatus 10. The aircraft launch apparatus 10 is modular in that it is assembled from (and can be disassembled into) a plurality of different modules or subassemblies. The aircraft launch apparatus 10 is removably attachable to the fixed-wing aircraft 20 and is independently removably attachable to the rotorcraft 30 to facilitate launching the fixed-wing aircraft 20 into free, wing-borne flight (as described below).

As best shown in FIG. 1C, the aircraft launch apparatus 10 includes the following nine modules or subassemblies: a hub module 100; first, second, third, and fourth arm modules 400a, 400b, 400c, and 400d; first and second front landing gear modules 600a and 600b; and first and second rear landing gear modules 600c and 600d.

As described in detail below, to assemble the aircraft launch apparatus 10 from these nine modules or subassemblies after removing the modules from the storage and launch system 2000 (described below), an operator: (1) attaches the first, second, third, and fourth arm modules 400a, 400b, 400c, and 400d to the hub module 100; (2) attaches the first and second front landing gear module 600a and 600b to the first and second arm modules 400a and 400b, respectively; and (3) attaches the first and second rear landing gear modules 600c and 600d to the third and fourth arm modules 400c and 400d, respectively.

The modularity of this aircraft launch apparatus 10 is beneficial compared to non-modular or unitary construction. First, the modularity of this aircraft launch apparatus 10 enables an operator to quickly and easily disassemble this relatively large apparatus into nine smaller modules or subassemblies. The operator can compactly store these modules or subassemblies into a single container, which makes the disassembled aircraft launch apparatus 10 easy to store and transport compared to when it is assembled. Second, if a part of this aircraft launch apparatus 10 breaks, its modularity enables the operator to quickly and easily replace the module(s) or subassembly(ies) including the broken part with a properly-functioning replacement module(s) or subassembly(ies) rather than waste time repairing the broken component(s).

Other embodiments of the aircraft launch apparatus may include more or fewer modules.

Figure 1D:
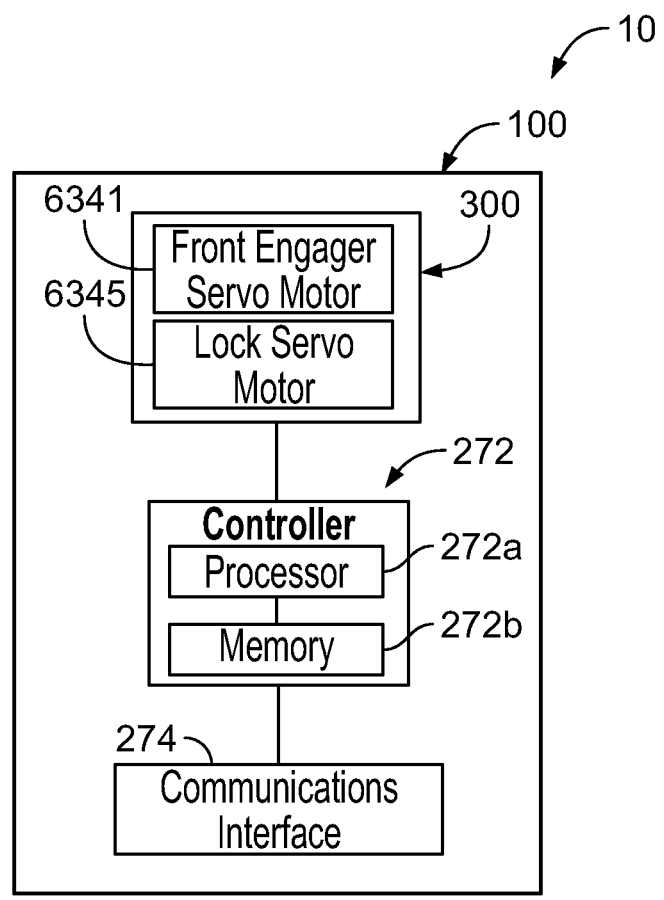
FIG. 1D is a block diagram showing certain electrically-controlled components of the aircraft launch apparatus of FIG. 1A.

FIG. 1D is a block diagram of certain electrically-controlled components of the aircraft launch apparatus 10. In this embodiment, although not shown in FIG. 1D, a lithiumion battery (or any other suitable power source(s)) powers these components. For a given component, the power source may be directly electrically connected to that component to power that component or indirectly electrically connected to that component (e.g., via another component) to power that component.

The hub module 100 includes a hub base 200 and a saddle 300. The hub base 200 includes a controller 272 and a communications interface 274 electrically and communicatively connected to the controller 272. The saddle 300 includes a front engager servo motor 6341 and a lock servo motor 6345 both electrically and communicatively connected to the controller 272. This is merely one example configuration, and these components may be located on any suitable part of the aircraft launch apparatus in other embodiments.

The controller 272 includes a processor 272a and a memory 272b. The processor 272a is configured to execute program code or instructions stored in the memory 272b to control operation of the aircraft launch apparatus 10, as described herein. The processor 272a may be one or more of: a general-purpose processor; a content-addressable memory; a digital-signal processor; an application-specific integrated circuit; a field-programmable gate array; any suitable programmable logic device, discrete gate, or transistor logic; discrete hardware components; and any other suitable processing device.

The memory 272b is configured to store, maintain, and provide data as needed to support the functionality of the aircraft launch apparatus 10. For instance, in various embodiments, the memory 272b stores program code or instructions executable by the processor 272a to control the aircraft launch apparatus 10. The memory 272b may be any suitable data storage device, such as one or more of: volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); and read-only memory.

The communications interface 274 is a suitable wireless communication interface, such as a transceiver like an MM2 900 MHz Embedded Radio by Freewave Technologies, configured to establish and facilitate communication between the controller 272 and: (1) a computing device (such as a laptop computer, a tablet computer, or a mobile phone, not shown); and (2) an R/C controller (not shown) that the operator of the aircraft launch apparatus 10 controls. In certain embodiments, the rotorcraft 30 is communicatively connected to the processor 272 via the communications interface 274. In operation, once the communications interface 274 establishes communication with the computing device, the controller 272 can send data (via the communications interface 274) associated with the operation of the aircraft launch apparatus 10 to the computing device. Once the communications interface 274 establishes communication with the R/C controller, the controller 272 can receive signals (via the communications interface 274) from the R/C controller. More specifically, upon receipt of these signals from the R/C controller, the communications interface 274 converts these signals into a format readable by the controller 272 and sends the converted signals to the controller 272 for processing.

The above-described communication may be bidirectional or unidirectional. In some embodiments, the communications interface 274 enables the controller 272 to send data to the computing device but not receive data from the computing device. In other embodiments, the communications interface 274 enables the controller 272 to send data to the computing device and to receive data from the computing device. In some embodiments, the communications interface 274 enables the controller 272 to receive signals from the R/C controller but not send signals to the R/C controller. In other embodiments, the communications interface 274 enables the controller 272 to receive signals from the R/C controller and send signals to the R/C controller. For example, the communications interface 274 might relay altitude and airspeed data from onboard sensors to a remote control console. If altitude and airspeed are acceptable, the remote operator would then command the launch apparatus to UNLOCK and RELEASE the fixed-wing aircraft into flight, as described below.

In certain embodiments, the communications interface 274 includes separate components for communicating with the computing device (such as a telemetry link) and the R/C controller (such as an R/C receiver).

In certain embodiments, the aircraft launch apparatus 10 includes suitable sensors configured to measure its altitude and its pitch, roll, and yaw rates. In certain embodiments, the processor 272a is configured to prevent release of the fixed-wing aircraft 30 if the aircraft launch apparatus 10 has an altitude below a certain threshold or a pitch, roll, or yaw rate above a certain threshold.

1.1 Hub Module

Figure 2:
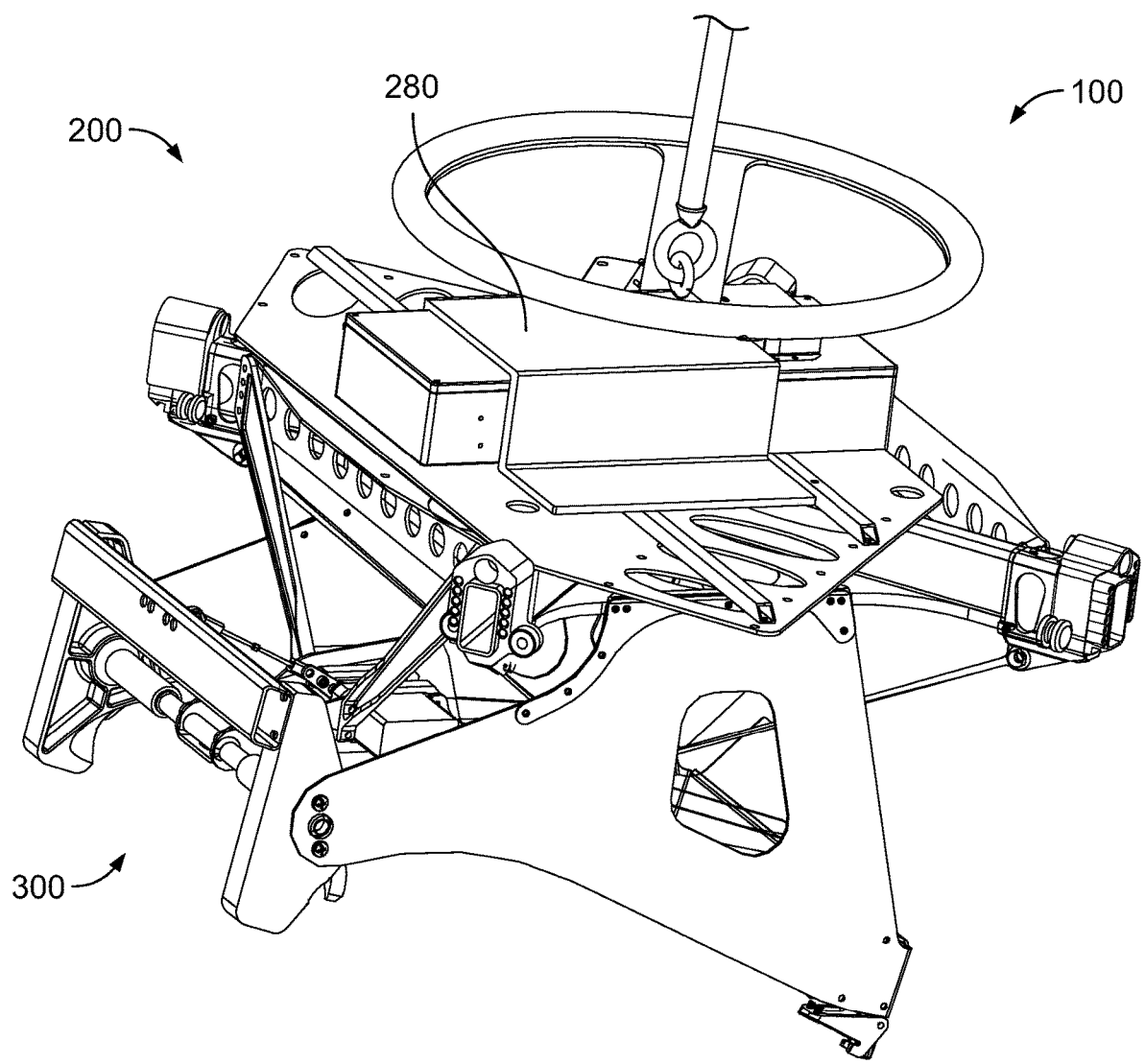
FIG. 2 is a perspective view of the hub module of the aircraft launch apparatus of FIG. 1A.

FIG. 2 shows the hub module 100. The hub module 100: (1) serves as the attachment point for the arm modules 400a to 400d; (2) is the portion of the aircraft launch apparatus 10 to which the fixed-wing aircraft 20 and the rotorcraft 30 are attached for launch; (3) includes the power source for the aircraft launch apparatus 10; and (4) includes certain components used to control operation of the aircraft launch apparatus 10.

The hub module 100 includes a hub base 200 and a saddle 300. The saddle 300 is attached to the underside of the hub base 200 via various brackets and fasteners (not labeled). This is merely one example of how the saddle can be attached to the hub base, and in other embodiments the saddle may be attached to the hub base in any suitable manner.

1.1.1 Hub Base

Figure 3A:
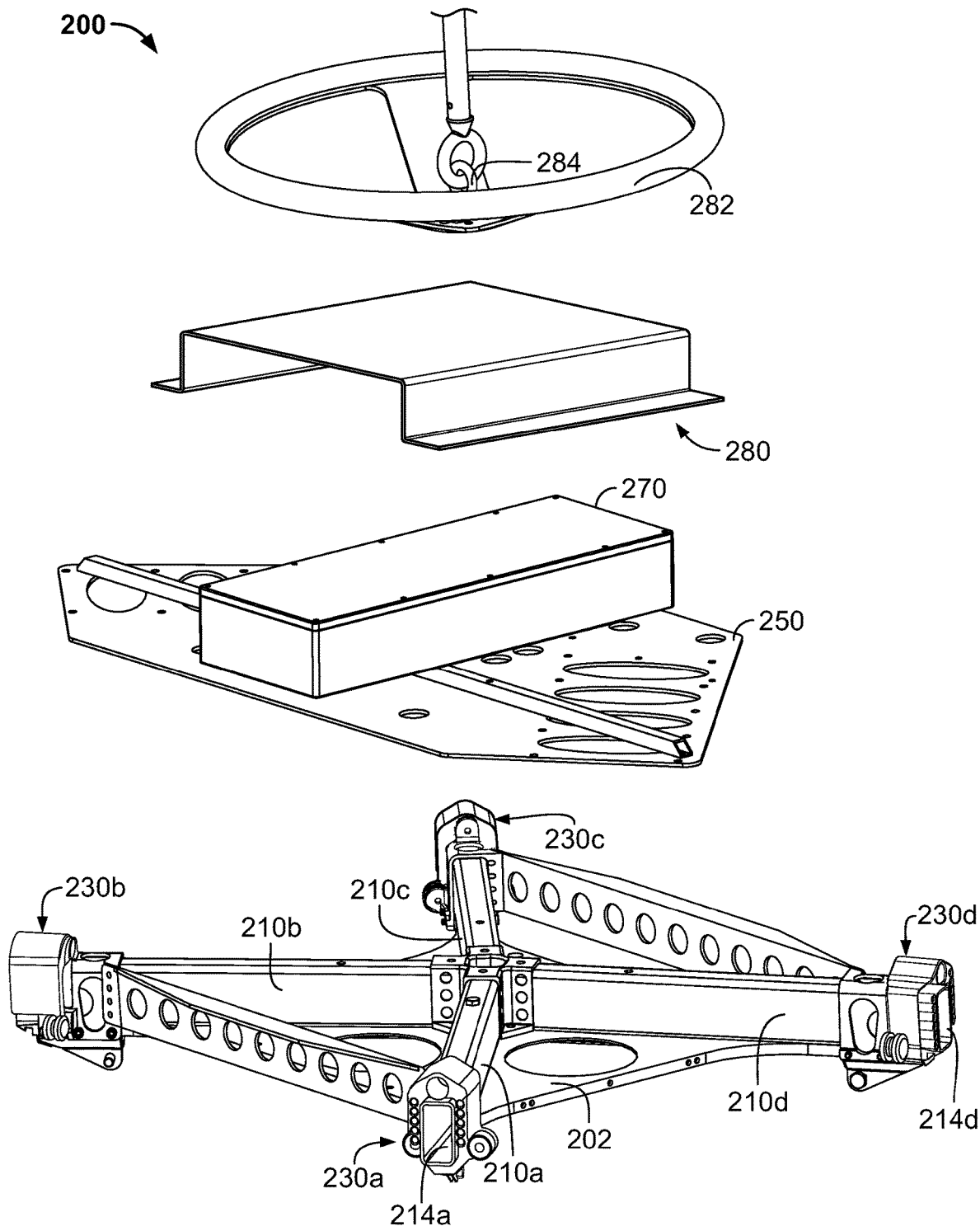
FIG. 3A is a partially exploded perspective view of the hub base of the hub module of FIG. 2.
Figure 3B:
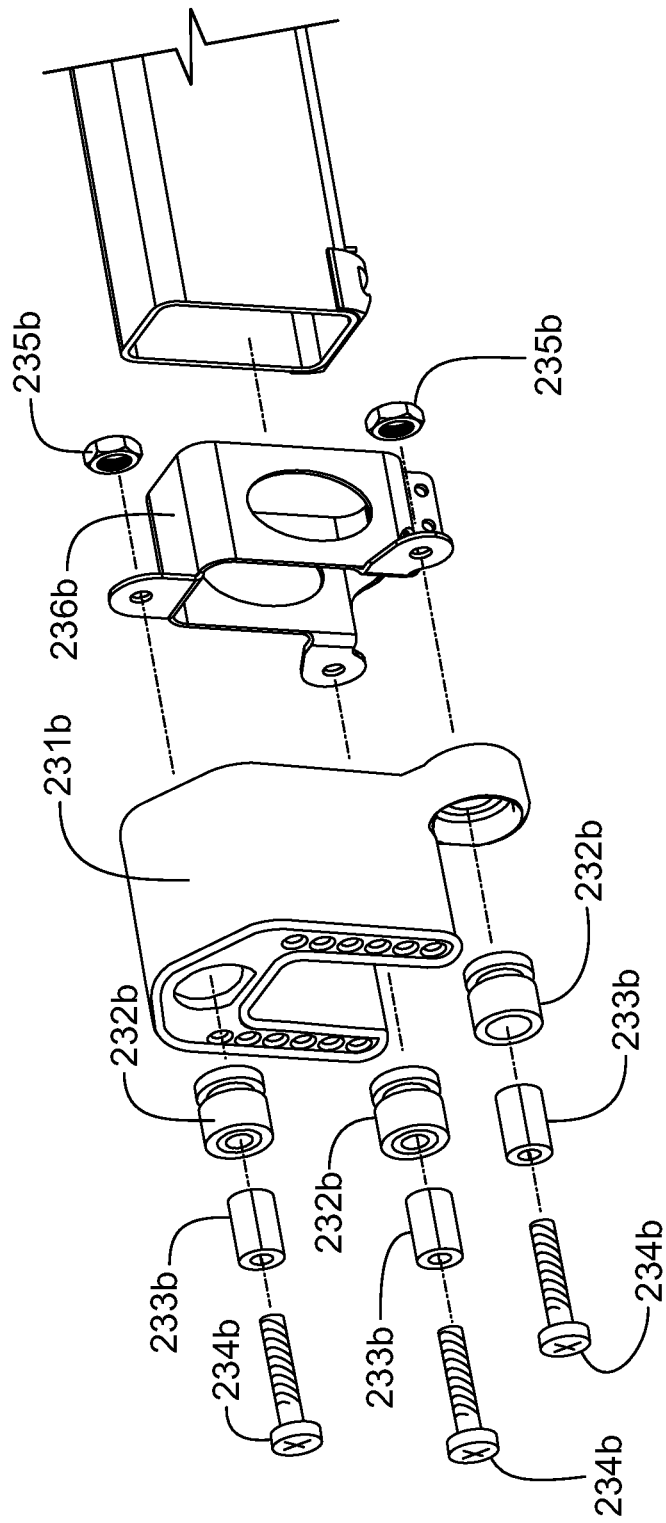
FIG. 3B is a partially exploded perspective view of one of the female blind mate assemblies of the hub base of FIG. 3A.
Figure 3C:
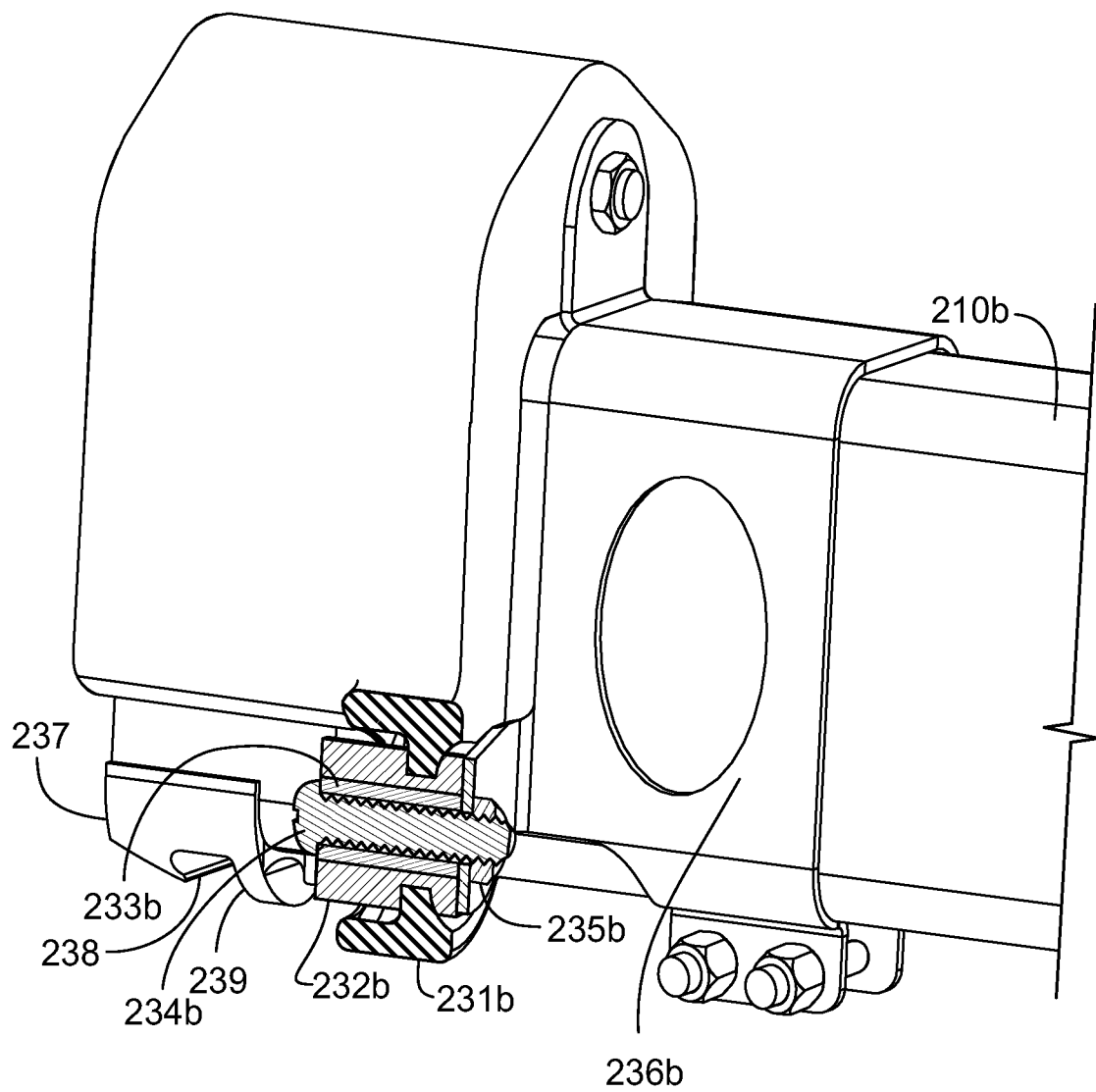
FIG. 3C is a partial cross-sectional view of one of the flexural mounts of the female blind mate assembly of FIG. 3B.

FIGS. 3A, 3B, and 3C show the hub base 200 or components thereof. The hub base 200 is the portion of the hub module 100 that: (1) serves as the attachment point for the arm modules 400a to 400d; (2) is the portion of the aircraft launch apparatus 10 to which the rotorcraft 30 is attached for launch; (3) includes the power source for the aircraft launch apparatus 10; and (4) includes certain components used to control operation of the aircraft launch apparatus 10.

As best shown in FIG. 3A, the hub base 200 includes four elongated tubular rectangular supports 210a, 210b, 210c, and 210d attached to a first mounting plate 202 with suitable brackets and fasteners. Stabilizing brackets (not labeled) extend between and connect the free ends of the supports 210a and 210b and the supports 210c and 210d. A second mounting plate 250b is attached to the supports 210a, 210b, 210c, and 210d such that the supports are sandwiched between the first and second mounting plates 202 and 250. A housing 270 is mounted to the second mounting plate 250. The housing 270 encloses various electrical components, such as the power source, the controller 272, and the communications interface 274.

A guard 282 is attached to a guard mounting bracket 280 (via suitable fasteners) that is attached to the second mounting plate 250 (via suitable fasteners). A snag-prevention member attachment device 284 is attached to the guard 282 near the center of the guard 282 (when viewed from the top). As described in detail below, a snag-prevention member 299 is attachable to the snag-prevention member attachment device 284 (such as a universal joint) such that the snag-prevention member 299 can rotate 360 degrees (or less in other embodiments) relative to the guard 282 and the aircraft launch apparatus 10 and pivot relative to a vertical axis between an angle defined by the geometry of the guard 282 and the geometry of the snag-prevention member 299. In this embodiment, the snag-prevention member 299 includes a flexible rod (such as a carbon-fiber rod) that has a normal shape to which it is biased to return once flexed. The snag-prevention member 299 may attach to the snag-prevention member attachment device 284 in any suitable manner, such as via a carabiner or other hook-type manner of attachment.

The open free ends of the tubular supports 210a-210d form arm module receiving sockets that can receive one of the arm modules 400a to 400d. Specifically, the support 210a forms a first arm module receiving socket 214a sized to receive the first arm module 400a, the support 210b forms a second arm module receiving socket (not shown) sized to receive the second arm module 400b, the support 210c forms a third arm module receiving socket (not shown) sized to receive the third arm module 400c, and the support 210d forms a fourth arm module receiving socket 214d sized to receive the fourth arm module 400d.

As best shown in FIG. 3A, female blind mate assemblies are attached to the free ends of the hollow supports 210a-210d. Specifically, a first female blind mate assembly 230a is attached to the free end of the support 210a near the first arm module receiving socket 214a, a second female blind mate assembly 230b is attached to the free end of the support 210b near the second arm module receiving socket, a third female blind mate assembly 230c is attached to the free end of the support 210c near the third arm module receiving socket, and a fourth female blind mate assembly 230d is attached to the free end of the support 210d near the fourth arm module receiving socket 214d.

The female blind mate assemblies 230 (along with the corresponding male blind mate connectors described below with respect to the arm modules) facilitate mechanical attachment of the arm modules 400a, 400b, 400c, and 400d to the hub module 100.

FIGS. 3B and 3C show the second female blind mate assembly 230b. The female blind mate assemblies 230a, 230c, and 230d are similar to the second female blind mate assembly 230b and are therefore not separately shown or described.

The second female blind mate assembly 230b includes: (1) a female blind mate connector 231b including a plurality of pin receptacles (not labeled); (2) three elastomeric grommets 232b; (3) three rigid, hollow cylindrical spacers 233b; (4) three fasteners 234b; (5) three nuts 235b; (6) a mounting bracket 236b; and (7) mounting bracket fasteners (not labeled).

The mounting bracket 236b is positioned at a desired location along the hollow support 210b, and the mounting bracket fasteners are tightened to clamp the mounting bracket 236b in place relative to the hollow support 210b.

The female blind mate connector 231b is flexurally mounted to the mounting bracket 236b via the elastomeric grommets 232b, the spacers 233b, the fasteners 234b, and the nuts 235b. Specifically, the elastomeric grommets 232b are fitted into corresponding cavities in the female blind mate connector 231b. As best shown in FIG. 3C, each cavity includes an inwardly-projecting annular rib that fits into a corresponding annular cutout of the corresponding elastomeric grommet 232b. The spacers 233b are disposed within longitudinal bores defined through the elastomeric grommets 232b. The fasteners 234b extend through the hollow spacers 233b and through corresponding fastener receiving openings defined through the mounting bracket 236b into their corresponding nuts 235b. This secures the female blind mate connector 231b to the mounting bracket 236b.

This flexural mount of the female blind mate connector to the mounting bracket via the elastomeric grommets is beneficial compared to a rigid connection of the female blind mate connector to the mounting bracket. The flexural mount enables the female blind mate connector to move—via deformation of the elastomeric grommet—relative to the mounting bracket (and the rest of the hub module) when loads are applied to the female blind mate connector, such as loads imposed on the female blind mate connector by the attached arm module during flight. Because the female blind mate connector is not rigidly attached to the corresponding mounting bracket, it is less likely that the pins of the male blind mate connector (described below) received by the pin receptacles of the female blind mate connector will break when loads are applied to the female blind mate connector.

As best shown in FIG. 3C, a latch plate 237 is attached to the underside of each hollow support 210a and 210b below each female blind mate connector 231 attached thereto. The latch plate 237 includes a claw engager 238 and a backstop 239. The latch plate 237 is described below with respect to the locking assemblies 420 of the arm modules 400a to 400d.

1.1.2 Saddle

FIGS. 4A-4I show the saddle 300 or components thereof. The saddle 300 is the portion of the hub module 100: (1) to which the fixed-wing aircraft 20a is attached for launch; (2) from which the fixed-wing aircraft 20a is released for launch This embodiment of the saddle 300 is sized, shaped, arranged, and otherwise configured to attach to and release the fixed-wing aircraft 20a without requiring any modification to the fixed-wing aircraft 20a. The size, shape, arrangement, and configuration of the components of the saddle 300 may be modified such that the saddle 300 can attach to and release other fixed-wing aircraft (such as the fixed-wing aircraft 20a).

The saddle 300 includes a saddle base bracket 6310 and first and second saddle side brackets 6312 and 6314 straddling the saddle base bracket 6310. A cross-brace 6318 is connected to and extends between the first and second saddle side brackets 6312 and 6314 near their back ends. As described in more detail below, the front ends of the first saddle side bracket 6312, the second saddle side bracket 6314, and the saddle base bracket 6310 are connected or otherwise mounted to a front engager 6320 such that the front engager 6320 can rotate relative to the first saddle side bracket 6312, the second saddle side bracket 6314, and the saddle base bracket 6310. Although not shown for clarity, the saddle base bracket 6310 is fixedly connected to the hub base via suitable mounting brackets, and the first and second saddle side brackets 6312 and 6314 are fixedly connected to the hub base via suitable fasteners.

Figure 4A:
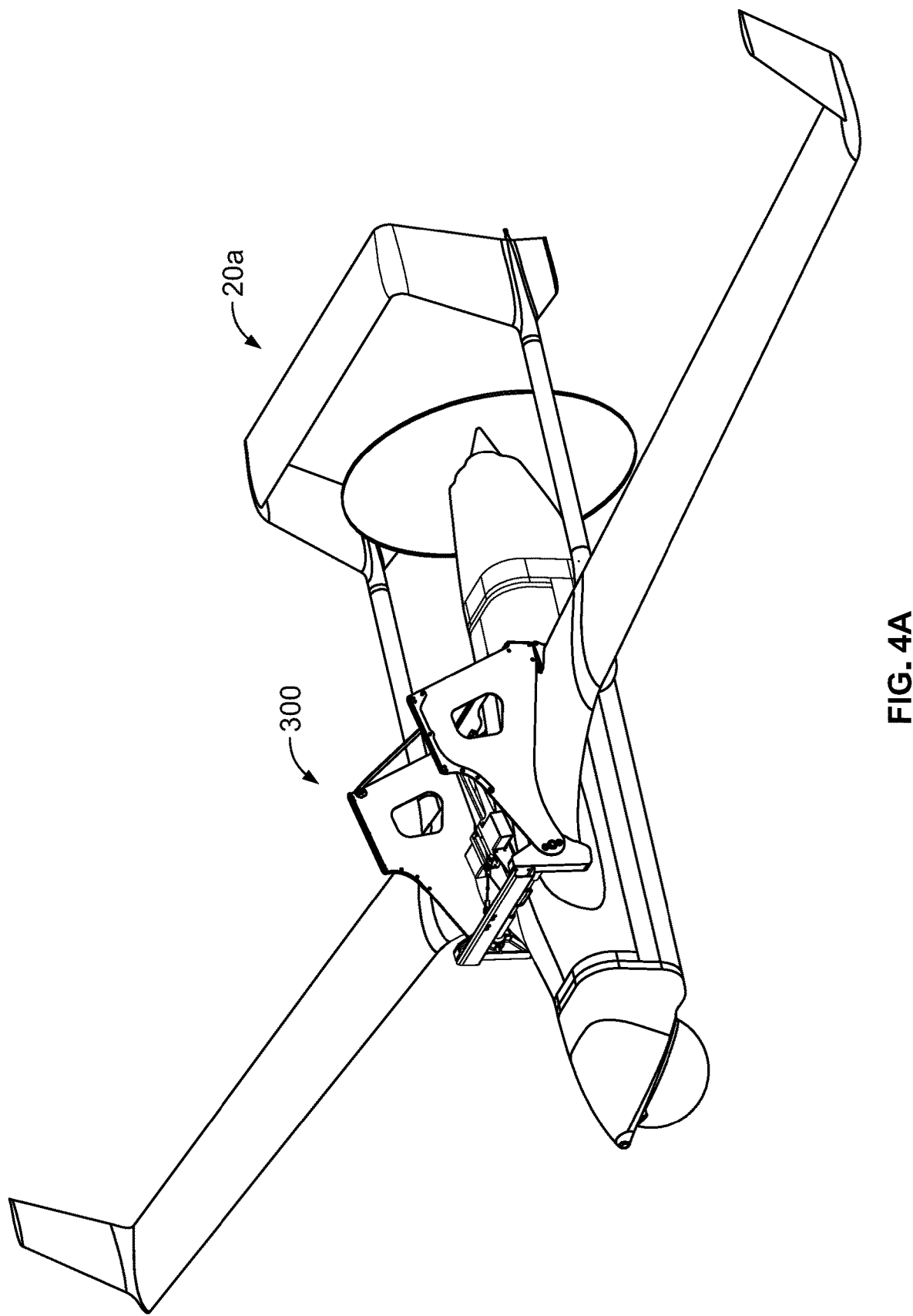
FIG. 4A is a perspective view of the fixed-wing aircraft of FIG. 1A attached to the saddle of the hub module of FIG. 2.
Figure 4B:
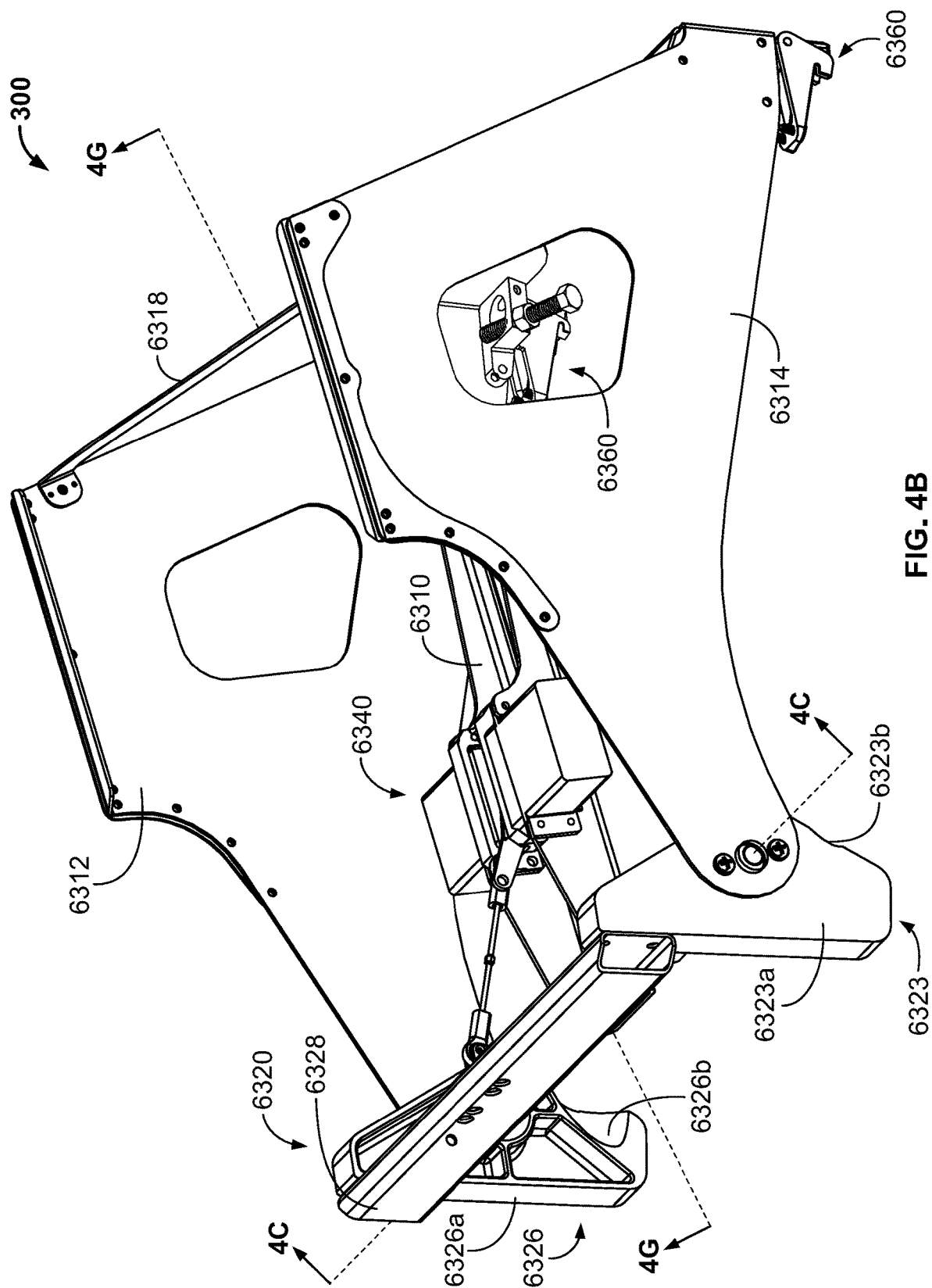
FIG. 4B is top perspective view of the saddle of FIG. 4A.
Figure 4C:
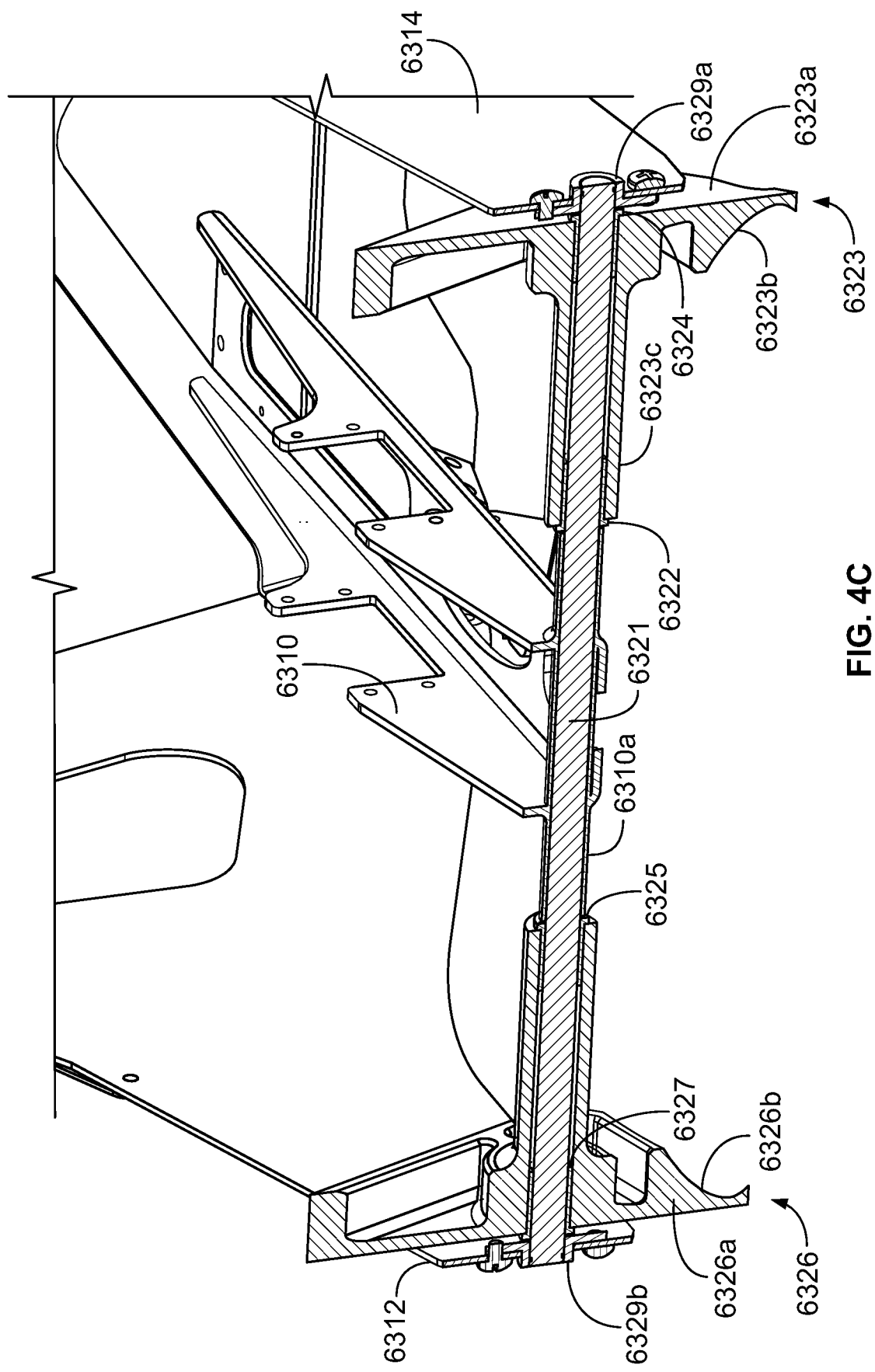
FIG. 4C is a cross-sectional view of the saddle of FIG. 4A taken substantially along line 4C-4C of FIG. 4B and with certain elements removed.

As best shown in FIGS. 4B and 4C, the front engager 6320 includes: a shaft 6321; first and second leading-edge engagers 6323 and 6326; sleeve bearings 6322, 6324, 6325, and 6327; and a stabilizer 6328.

The first leading-edge engager 6323 includes a generally triangular base 6323a having a tube 6323c extending therefrom. A shaft-receiving bore (not labeled) extends through the base 6323*a* and the tube 6323*c*. The base 6323*a* defines a contoured leading edge engaging surface 6323*b* that is shaped to receive and engage the portion of the leading edge of the wing of the fixed-wing aircraft 20*a* to which the saddle 300 will attach, as described below. The base 6323*a* includes a plurality of strengthening ribs extending outward from the tube 6323*c*. Similarly, the second leading-edge engager 6326 includes a generally triangular base 6326*a* having a tube 6326*c* extending therefrom. A shaft-receiving bore (not labeled) extends through the base 6326*a* and the tube 6326*c*. The base 6326*a* defines a contoured leading edge engaging surface 6326*b* that is shaped to receive and engage the portion of the leading edge of the wing of the fixed-wing aircraft 20*a* to which the saddle 300 will attach, as described below. The base 6326*a* includes a plurality of strengthening ribs extending outward from the tube 6326*c*.

As noted above, the front engager 6230 is connected or otherwise mounted to the saddle base bracket 6310 and the first and second saddle side brackets 6312 and 6314 such that the front engager 6320 is rotatable relative to those components. The saddle base bracket 6310 includes a tubular mounting portion 6310*a* that defines a shaft-receiving bore therethrough. Part of the shaft 6321 is received in the shaft-receiving bore of the tubular mounting portion 6310*a* such that first and second free ends of the shaft are positioned on opposing sides of the tubular mounting portion 6310*a*. The shaft 6321 is rotatably fixed relative to the saddle base bracket 6310, though in other embodiments the shaft 6321 may rotate relative to the saddle base bracket 6310. Suitable bearings may be incorporated at the interfaces between the saddle base bracket and the shaft to facilitate rotation of the shaft relative to the saddle base bracket.

The first and second leading-edge engagers 6323 and 6326 are rotatably mounted to the shaft 6321 on opposite sides of the tubular mounting portion 6310*a* of the saddle base bracket 6310 via the sleeve bearings 6322, 6324, 6325, and 6327. Specifically, the sleeve bearings 6322 and 6324 are press fit into the opposing ends of the shaft-receiving bore through the first leading-edge engager 6323 such that the sleeve bearings 6322 and 6324 cannot rotate relative to the first leading-edge engager 6323. Part of the shaft 6321 is received in the sleeve bearings 6322 and 6324 and the shaft-receiving bore of the first leading-edge engager 6323 such that the first end of the shaft 6321 protrudes from the sleeve bearing 6324. The first end of the shaft 6321 is received in a first retaining element 6329*a* fixedly attached to the second saddle side bracket 6314. The first retaining element 6329*a* prevents substantial axial movement of the shaft 6321 relative to the first retaining nub 6329*a*, and retains the first leading-edge engager 6323 on the shaft 6321. At this point, the first leading-edge engager 6323 is mounted to the shaft 6321 via the sleeve bearings 6322 and 6324 such that the first leading-edge engager 6323 is rotatable about the longitudinal axis of the shaft 6321 relative to the saddle base bracket 6310. The longitudinal axis of the shaft 6321 is above the leading edges of the wings of the fixed-wing aircraft 20*a*.

Similarly, the sleeve bearings 6325 and 6327 are press fit into the opposing ends of the shaft-receiving bore through the second leading-edge engager 6326 such that the sleeve bearings 6325 and 6327 cannot rotate relative to the second leading-edge engager 6326. Part of the shaft 6321 is received in the sleeve bearings 6325 and 6327 and the shaft-receiving bore of the second leading-edge engager 6326 such that the second end of the shaft 6321 protrudes from the sleeve bearing 6325. The second end of the shaft 6321 is received in a second retaining element 6329*b* fixedly attached to the first saddle side bracket 6312. The second retaining element 6329*b* prevents substantial axial movement of the shaft 6321 relative to the second retaining element 6329*a*, and retains the second leading-edge engager 6326 on the shaft 6321. At this point, the second leading-edge engager 6326 is mounted to the shaft 6321 via the sleeve bearings 6325 and 6327 such that the second leading-edge engager 6326 is rotatable about the longitudinal axis of the shaft 6321 relative to the saddle base bracket 6310.

The stabilizer 6328 is attached to the base 6323*a* of the first leading-edge engager 6323 and to the base 6326*a* of the second leading-edge engager 6326 such that the stabilizer 6328 extends between and connects the first and second leading-edge engagers 6323 and 6326. The stabilizer 6328 ensures the first and second leading-edge engagers 6323 and 6326 rotate relative to the saddle base bracket 6310 and the first and second saddle side brackets 6312 and 6314 substantially simultaneously rather than independently of one another.

Figure 4D:
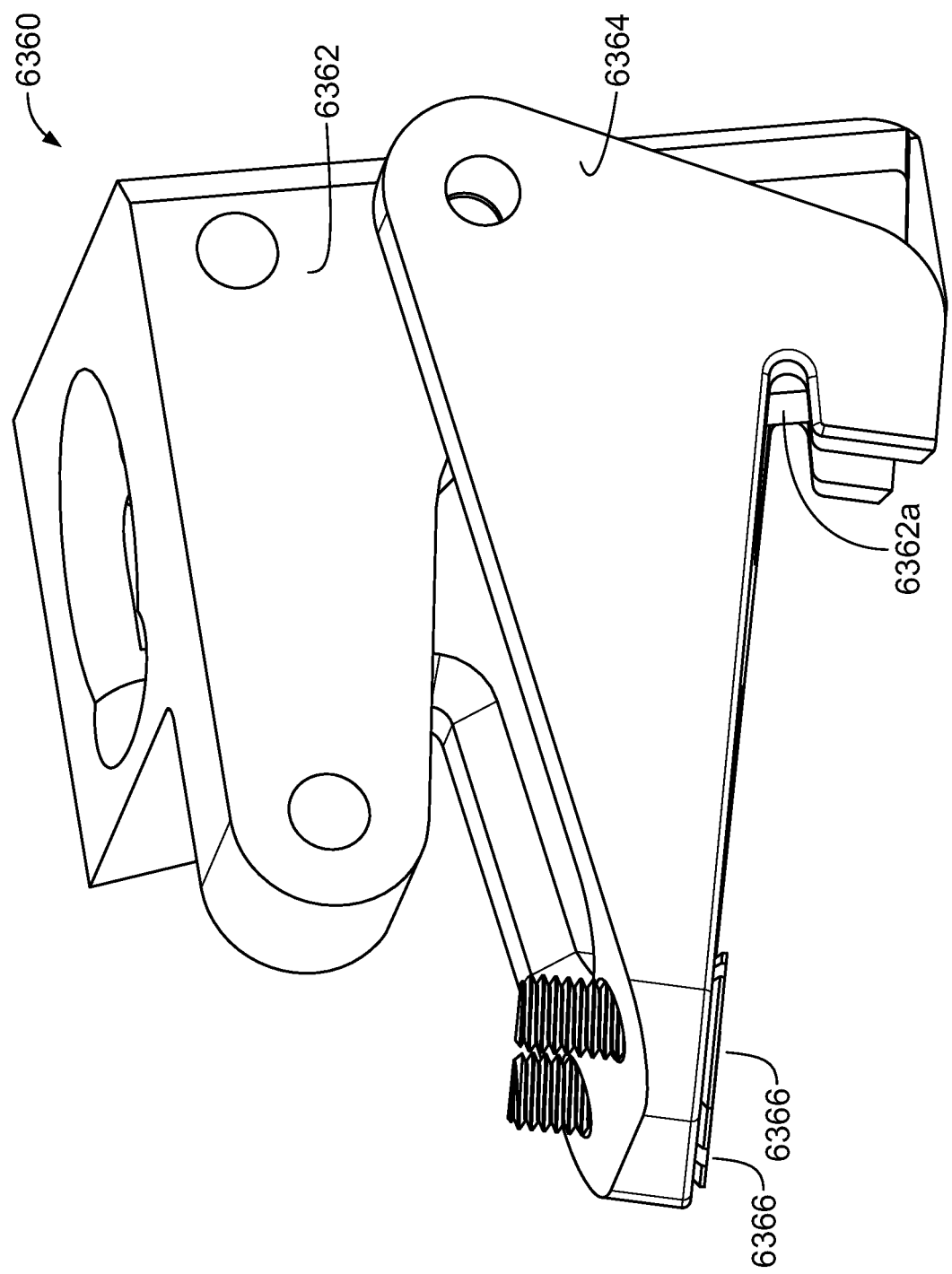
FIGS. 4D and 4E are, respectively, assembled and exploded top perspective views of a rear engager of the saddle of FIG. 4A.
Figure 4E:
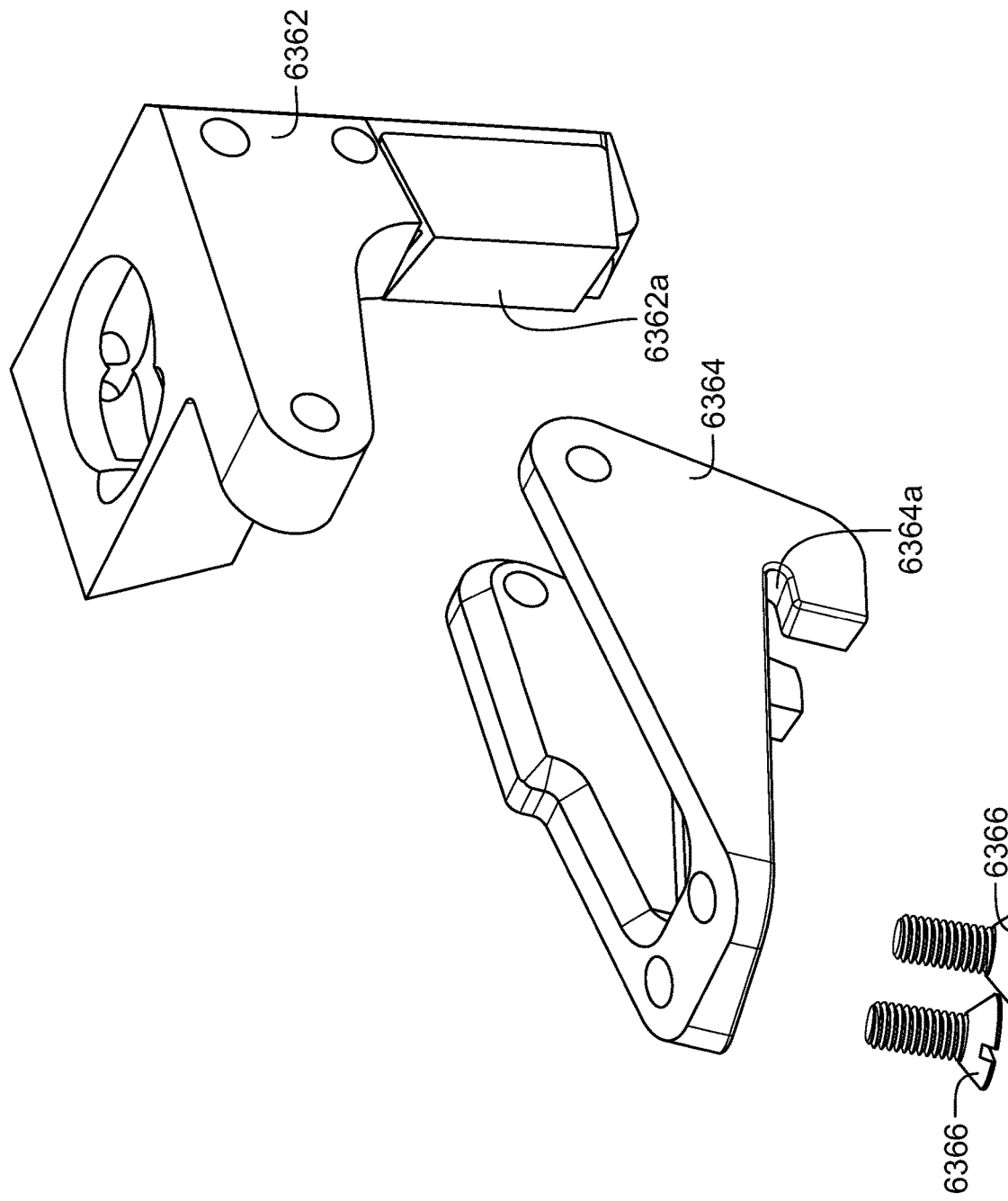
Figure 4F:
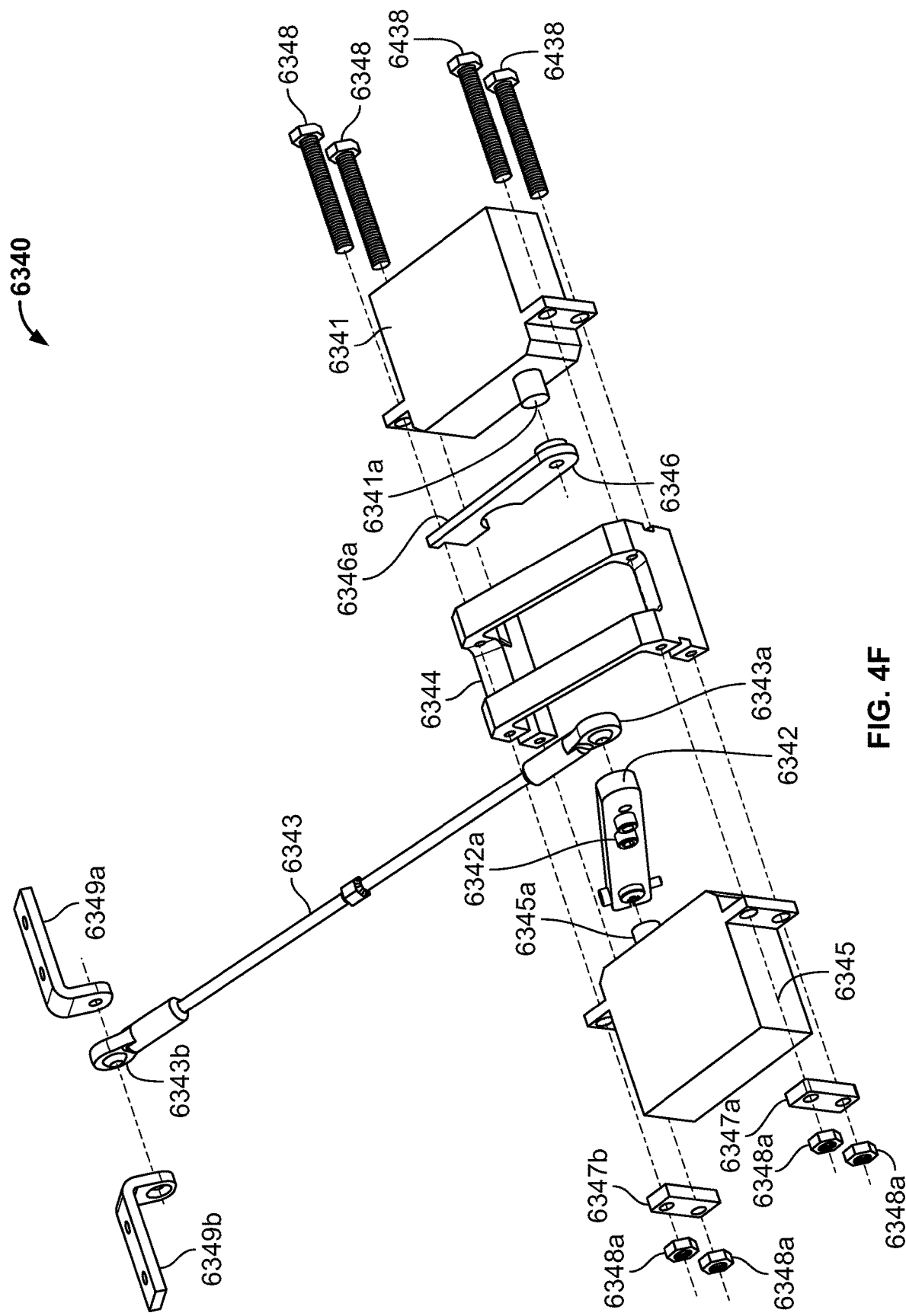
FIG. 4F is an exploded top perspective view of the attachment/release device of the part of the saddle of FIG. 4A.

As best shown in FIGS. 4B and 4F, an aircraft attaching/releasing assembly 6340 is attached to the saddle base bracket 6310 and to the front engager 6320 and controls rotation of the first engager 6320 about the longitudinal axis of the shaft 6321 relative to the saddle base bracket 6310. As best shown in FIG. 4F, the aircraft attaching/releasing assembly 6340 includes: a front engager servo motor 6345 having a front engager servo motor shaft 6345*a*, a front engager arm 6342, a front engager arm lock device 6342*a*, a servo spacer 6344, first and second nut plates 6347*a* and 6347*b*, fasteners 6348 and corresponding nuts 6348*a*, a front engager rotation control link 6343 having connectors 6343*a* and 6343*b* at opposite ends, a lock servo motor 6341 having a lock servo motor shaft 6341*a*, a lock arm 6346 terminating at one end in a locking extension 6346*a*, and first and second front engager attachment brackets 6349*a* and 6349*b*.

The front engager servo motor 6345 and the lock servo motor 6341 are attached to one another and to the saddle base bracket 6310 via the fasteners 6348, the servo spacer 6344, the first and second nut plates 6347*a* and 6347*b*, and the nuts 6348*a*.

The front engager arm 6342 is attached near one end to the front engager servo motor shaft 6345*a* and near the other end to the connector 6343*a*. The connector 6343*b* is attached to the stabilizer 6328 of the front engager 6320 via the first and second front engager attachment brackets 6349*a* and 6349*b* (such as via suitable fasteners, not shown). This operatively links the front engager servo motor shaft 6345*a* to the front engager 6320. The front engager arm lock device 6342*a* is attached to the front engager arm 6342 between the connector 6343*a* and the front engager servo motor shaft 6345*a*.

The lock arm 6346 is attached to the lock servo motor shaft 6341*a* near one end. The free end of the lock arm 6346 terminates in the locking extension 6346*a*, which is engageable to the front engager arm lock device 6342*a* in certain instances to prevent clockwise (from the viewpoint shown in FIGS. 4G-4I) rotation of the front engager arm 6342.

The front engager servo motor 6345 controls rotation of the front engager 6320 (and, specifically, the first and second leading-edge engagers 6323 and 6326) about the longitudinal axis of the shaft 6321 relative to the saddle base bracket 6310. To rotate the front engager 6320, the front engager servo motor 6345 rotates the front engager servo motor shaft 6345*a*, which rotates the attached front engager arm 6342, which in turn rotates the front engager 6320 via the front engager rotation control link 6343. The front engager servo motor 6345 can rotate the front engager 6320 between an attached rotational position-shown in FIGS. 4G and 4H—and a release rotational position-shown in FIG. 4I.

Figure 4G:
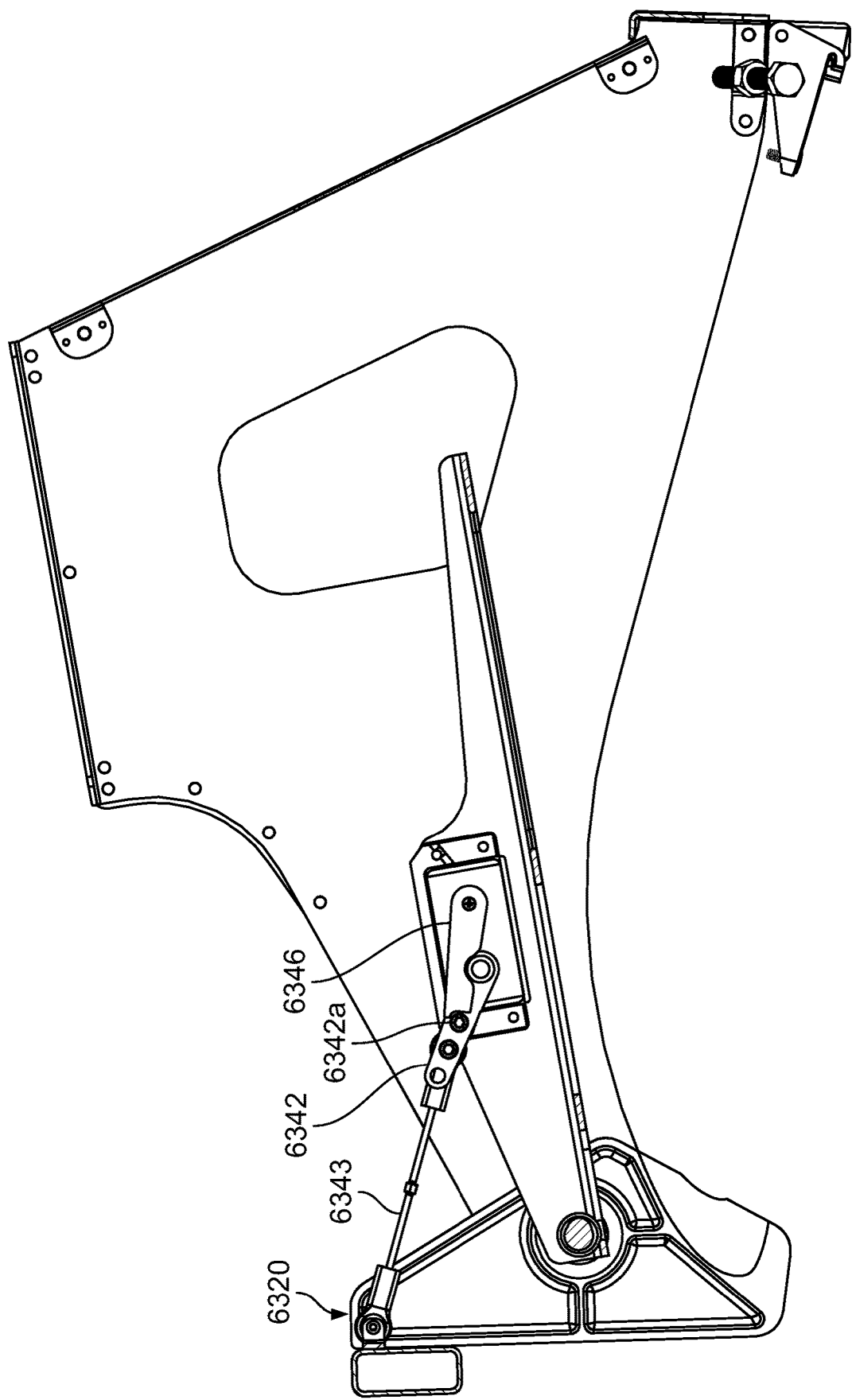
FIGS. 4G-4I are cross-sectional side elevational views of the part of the saddle of FIG. 4A showing different configurations of the lock arm and the front engager arm taken substantially along the line 4G-4G of FIG. 4B.
Figure 4H:
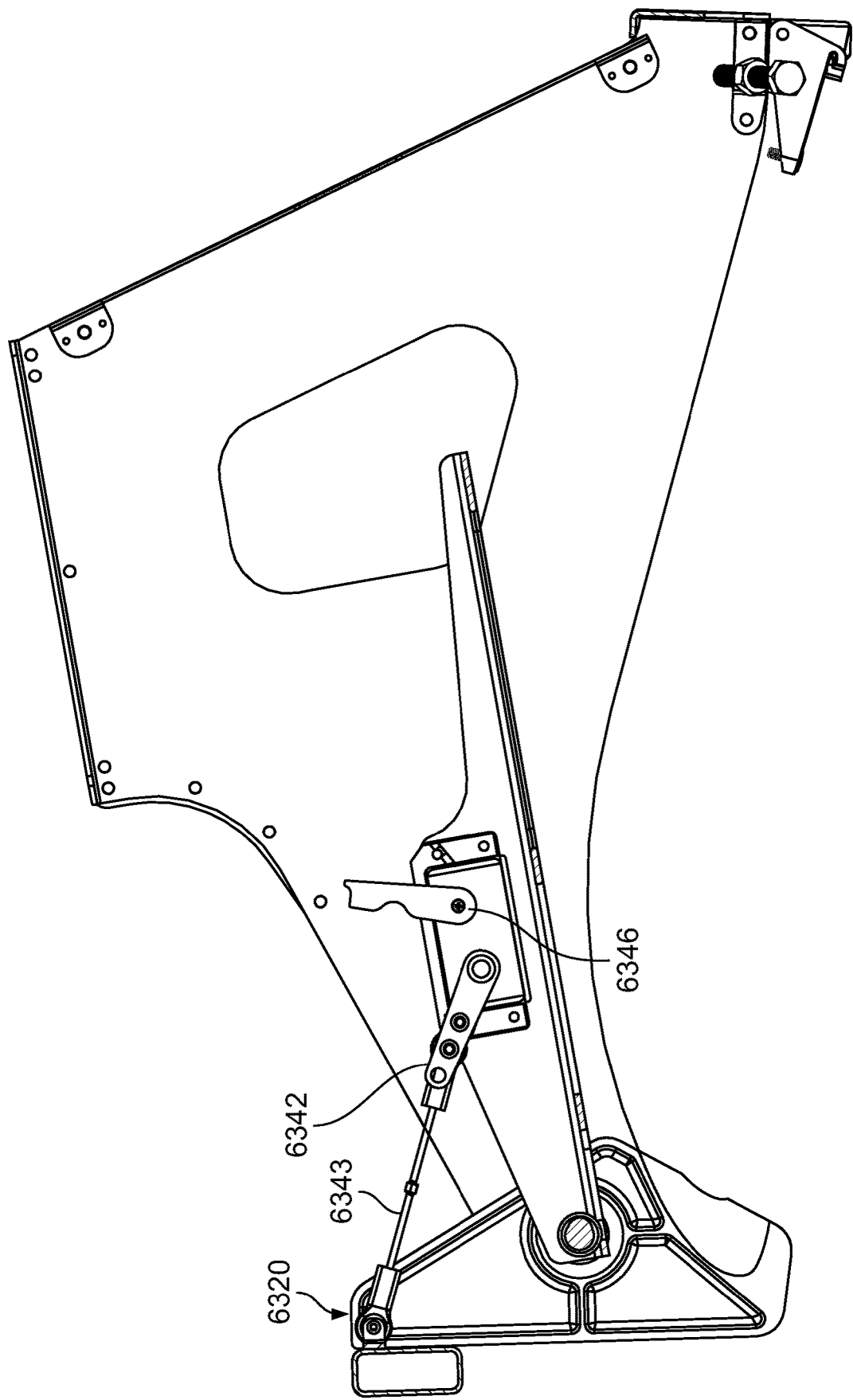
Figure 4I:
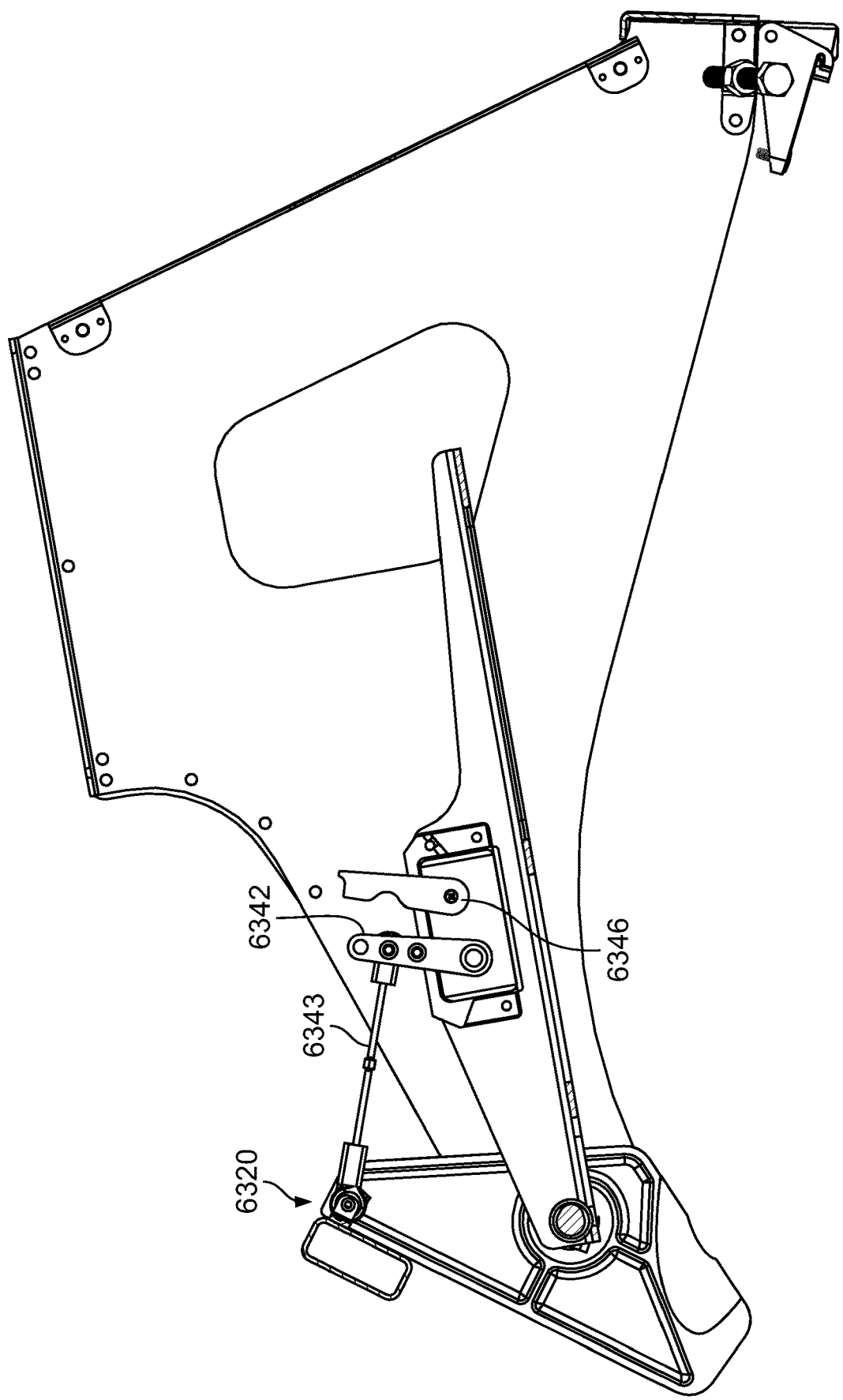

The lock servo motor 6341 controls rotation of the lock arm 6346 between a front engager rotation-preventing rotational position-shown in FIG. 4G—and a front engager rotation-enabling rotational position-shown in FIGS. 4H and 4I. When the front engager 6320 is in the attached rotational position and the lock arm 6346 is in the front engager rotation-preventing rotational position, the locking extension 6346a engages the front engager arm lock device 6342a of the front engager arm 6342. This prevents the front engager servo motor 6345 from rotating the front engager 6320 clockwise (from the viewpoint shown in FIGS. 4G-4I) from the attached rotational position to the release rotational position. As best shown in FIG. 4G, the servo spacer 6344 prevents counter-clockwise rotation (from the viewpoint shown in FIGS. 4G-4I) of the front engager arm 6342.

FIGS. 4G-4I show how the front engager servo motor 6345 and the lock servo motor 6341 cooperate to rotate the front engager 6320 from the attached rotational position to the release rotational position. Initially, the front engager arm 6342 is in the attached rotational position and the lock arm 6346 is in the front engager rotation-preventing rotational position. Here, the locking extension 6346a on the end of the lock arm 6346 engages the front engager arm lock device 6342a of the front engager arm 6342.

Since the locking extension 6346a engages the front engager lock device 6342a of the front engager arm 6342, the front engager servo motor 6345 cannot rotate the front engager 6320 from the attached rotational position to the release rotational position (clockwise from this viewpoint). And as indicated above, the servo spacer 6344b prevents counter-clockwise rotation of the front engager arm 6342 (from this viewpoint).

Rotating the front engager 6320 from the attached rotational position to the release rotational position is a two-step process. As shown in FIG. 4H, the operator first operates the lock servo motor 6341 to rotate the lock arm 6346 into the front engager rotation-enabling rotational position (clockwise from this viewpoint). Second, as shown in FIG. 4I, the operator operates the front engager servo motor 6345 to rotate the front engager 6320 from the attached rotational position to the release rotational position (clockwise from this viewpoint).

As shown in FIG. 4B, separate (but in this embodiment, identical) rear engagers 6360 (here, trailing-edge engagers) are attached to the first and second saddle side brackets 6312 and 6314. As best shown in FIGS. 4D and 4E, the rear engager 6360 includes a body 6362 and a pivotable portion 6364 pivotably connected to the body 6362 via a suitable pivot shaft (not shown). The body 6362 includes a trailing edge engaging surface 6362a. The pivotable portion 6364 includes multiple surfaces that define a trailing edge receiving channel 6364a sized and shaped to receive the trailing edge of a wing of the fixed-wing aircraft 20a. Fasteners 6366 are threadably received in the pivotable portion 6364. The fasteners 6366 engage the top surface of the wing of the fixed-wing aircraft 20a, and can be threaded further into or further out of the pivotable portion 6364 as desired to adjust clearance between the pivotable portion 6364 and the exterior upper surface of the wing. In one embodiment, the fasteners are formed from a relatively soft material, such as Teflon, and the pivotable portion is formed from a relatively harder material, such as aluminum.

The body 6362 is fixedly attached to the appropriate saddle side bracket via suitable fasteners (not shown for clarity) such that the trailing edge engaging surface 6362a and the pivotable portion 6364 extend below the body 6362.

In operation, to launch the fixed-wing aircraft 20a an operator first attaches the hub module 100 to the fixed-wing aircraft 20a, assembles the aircraft-launch apparatus 10, hoists the fixed-wing aircraft 20a using the rotorcraft 30 and the aircraft-launch apparatus 10 and brings it to a desired airspeed, and releases the fixed-wing aircraft 20a from the aircraft-launch apparatus 10, as described below.

More specifically, the operator attaches the hub module 100 to the fixed-wing aircraft 20a by: (1) operating the front engager servo motor 6345 (either manually or remotely via the R/C controller) to rotate the front engager 6320 to the release rotational position; (2) inserting the trailing edges of the wings of the fixed-wing aircraft 20a into the trailing edge receiving channels 6364a of the pivotable portions 6364 of the rear engagers 6360; (3) positioning the saddle 300 relative to the fixed-wing aircraft 20a such that the leading edge engaging surfaces 6323b and 6326b of the front engager 6320 are adjacent the leading edges of the wings of the fixed-wing aircraft 20a; (4) operating the front engager servo motor 6345 (either manually or remotely via the R/C controller) to rotate the front engager 6320 to the attached rotational position such that the leading edge engaging surfaces 6323b and 6326b of the front engager 6320 contact the leading edges of the wings of the fixed-wing aircraft 20a; and (5) operating the lock servo motor 6341 (either manually or remotely via the R/C controller) to rotate the lock arm 6346a into the front engager rotation-preventing rotational position so the locking extension 6346a on the end of the lock arm 6346 engages the front engager arm lock device 6342a of the front engager arm 6342.

At this point the fixed-wing aircraft 20a is attached to the saddle 300 (and the aircraft-launch apparatus 10) because the front engager 6320 and the rear engagers 6360 engage the wings of the fixed-wing aircraft 20a therebetween. The pivotable portions 6364 of the rear engagers 6360 are rotationally positioned relative to the bodies 6362 of the rear engagers 6360 such that the trailing-edge engaging surfaces 6362a are not within the trailing-edge receiving channels of the pivotable portions 6364. The positioning of the servo spacer 6344b and the fact that the locking extension 6346a is engaged to the front engager arm lock device 6342a of the front engager arm 6342 ensure the front engager servo motor 6345 cannot rotate the front engager 6320 from the attached rotational position to the release rotational position. This prevents undesired release of the fixed-wing aircraft 20a from the saddle 300 (and the aircraft-launch apparatus 10).

Releasing the fixed-wing aircraft 20a from the saddle 300 while the aircraft-launch apparatus 10 is airborne is a two-step process shown in FIGS. 4H and 4I. To release the fixed-wing aircraft 20a from the saddle 300 (and the aircraft-launch apparatus 10), the operator first remotely controls the lock servo motor 6341 (via the R/C controller) to rotate the lock arm 6346 into the front engager rotation-enabling rotational position, as shown in FIG. 4H. Second, the operator remotely controls the front engager servo motor 6345 (via the R/C controller) to rotate the front engager 6320 from the attached rotational position to the release rotational position, as shown in FIG. 4I. As the front engager servo motor 6345 rotates the front engager 6320 from the attached rotational position to the release rotational position, the first and second leading edge engaging surfaces 6323b and 6326b of the front engager 6320 rotate away from and begin to lose contact with the leading edge of the wing of the fixed-wing aircraft 20a. As the front engager 6320 continues to rotate clear of the wings of the fixed-wing aircraft 20a, the pivotable portions 6364 of the rear engagers 6360 enable the fixed-wing aircraft 20a to freely pivot relative to the saddle base bracket 6310, the first and second saddle side brackets 6312 and 6314, and the bodies 6362 of the rear engagers 6360 as gravity pulls the fixed-wing aircraft 20a downward. The center of gravity of the fixed-wing aircraft 20a is positioned forward of the rear engagers. As this occurs, the trailing edge engaging surfaces 6362a of the bodies 6362 of the rear engagers 6360 gradually enter the trailing-edge receiving channels of the pivotable portions 6364. As this occurs, the trailing-edge engaging surfaces 6362a contact the trailing edge of the wings and force them out of the trailing edge receiving channels, thus releasing the fixed-wing aircraft 20a from the saddle 300 (and the aircraft-launch apparatus 10) into free flight.

As the fixed-wing aircraft 20a rotates downward, its empennage rises relative to the aircraft-launch apparatus 10 as the nose of the fixed-wing aircraft 20a drops. The rear engagers are configured such that the trailing edges of the wings of the fixed-wing aircraft 20a are forced out of the trailing edge receiving channels before the empennage of the fixed-wing aircraft 20a contacts the aircraft-launch apparatus 10.

In another embodiment, the rear engagers include an ejector device (not shown) having an ejector plate movable from a loaded position to an eject position (and vice-versa). The ejector plate is biased to the eject position via a spring or other suitable biasing element. In this embodiment, the act of clamping the wings of the fixed-wing aircraft between the front and rear engagers causes the trailing edges of the wings of the fixed-wing aircraft to contact the ejector plate and overcome the biasing force of the biasing element to move the ejector plate to the loaded position, and hold it there while the wings are clamped. During release, once the front engager rotates clear of the wings, the biasing element moves the ejector plate from the loaded position to the eject position. While this occurs, the ejector plate contacts the trailing edges of the wings and forces them away from the saddle 300.

In the embodiment described above with respect to FIGS. 4A-4I, the leading edge engagers of the front engager rotate in a plane generally parallel to a longitudinal axis of the fuselage of the fixed-wing aircraft to attach the fixed-wing aircraft to the saddle 300 and to release the fixed-wing aircraft from the saddle 300. In another embodiment, the leading edge engagers of the front engager rotate in a plane generally perpendicular to the longitudinal axis of the fuselage of the fixed-wing aircraft to attach the fixed-wing aircraft to the saddle 300 to and release the fixed-wing aircraft from the saddle 300. For example, the free ends of the leading edge engagers may rotate inward, toward the fuselage, to move from the release rotational position to the attached rotational position and may rotate outward, away from the fuselage, to move from the attached rotational position to the release rotational position.

In certain embodiments, the leading-edge engagers (and particularly the leading-edge engaging surfaces) are sized, shaped, arranged, and otherwise configured to force the nose of the fixed-wing aircraft downward during release.

As noted above, this embodiment of the saddle 300 may be sized, shaped, arranged, and otherwise configured to attach to and release any suitable fixed-wing aircraft by clamping its wings between front and rear engagers. An operator could—without changing any other components of the aircraft-launch apparatus 10—swap out one saddle base bracket, front engager, and rear engager combination (or the entire saddle including those components) configured for one type of aircraft with another saddle base bracket, front engager, and rear engager combination (or the entire saddle including those components) configured for a different type of aircraft. This adds yet another layer of modularity to the aircraft-launch apparatus 10 and enables it to carry many different types of fixed-wing aircraft without requiring any modification of those fixed-wing aircraft.

In other embodiments, the saddle may be the saddle described in U.S. Patent Application Publication No. 2017/0158318, the entire contents of which are incorporated herein by reference. That saddle is configured to attach to the fixed-wing aircraft 20b via a hook of the fixed-wing aircraft 20b (or any other fixed-wing aircraft including a suitable hook).

1.2 Arm Modules

The arm modules 400a to 400d are mechanically attachable to and mechanically lockable to the hub module 200 and include locking assemblies that lock the arm modules 400a to 400d to the hub module 100. FIGS. 5A-5E show the first arm module 400a and components thereof. The other arm modules 400b, 400c, and 400d are similar to the first arm module 400a and are therefore not separately shown or described.

Figure 5A:
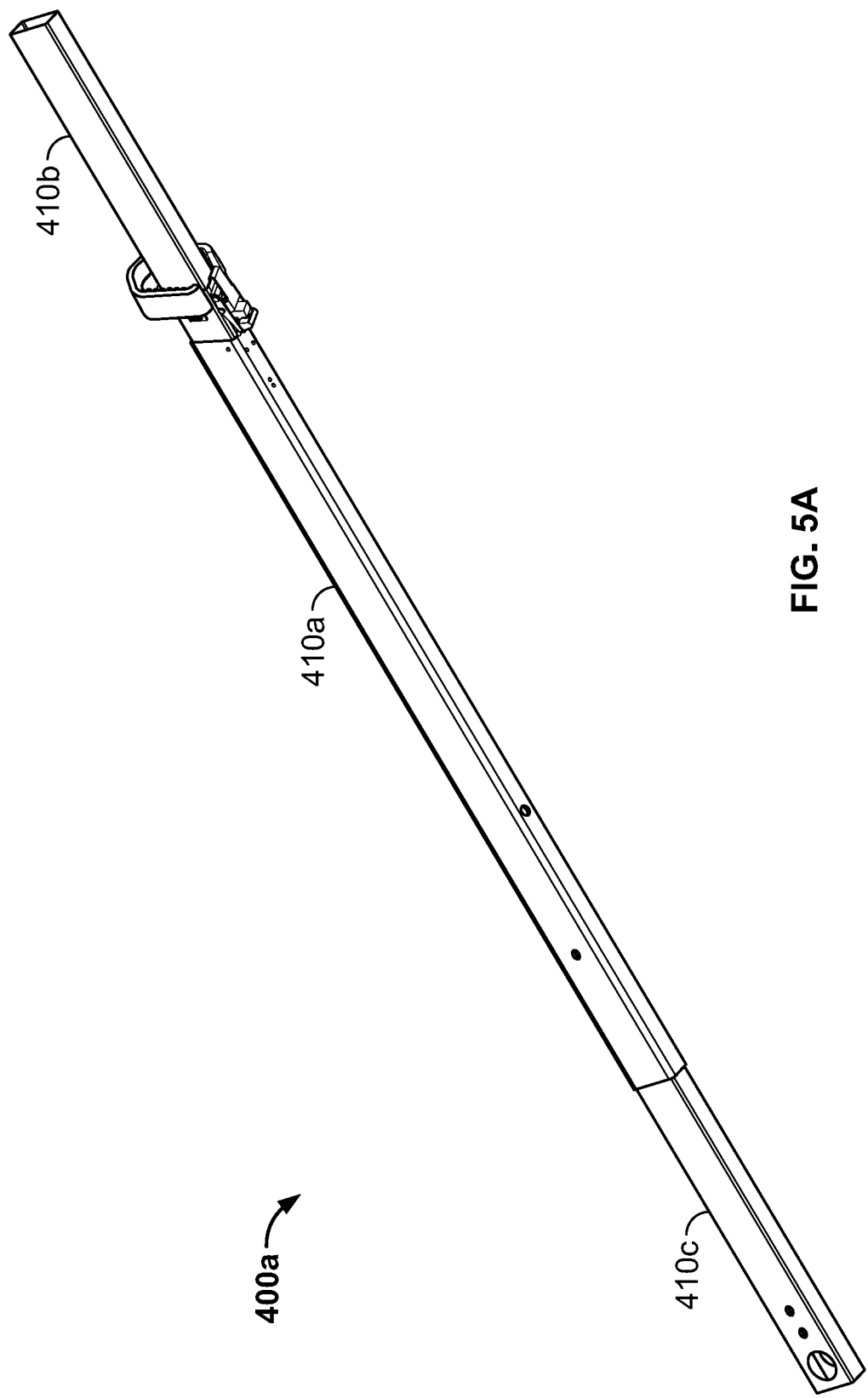
FIG. 5A is a perspective view of one of the arm modules of the aircraft launch apparatus of FIG. 1A.

As best shown in FIG. 5A, the first arm module 400a includes a generally rectangular elongated tubular arm 410a, a generally rectangular tubular first arm extension 410b, a generally rectangular second arm extension 410c, a locking assembly 420, and a male blind mate connector 431.

The first arm extension 410b is attached to the arm 410a such that part of the first arm extension 410b is disposed within the arm 410a and the remainder of the first arm extension 410b extends from the arm 410a. Similarly, the second arm extension 410c is attached to the arm 410a such that part of the second arm extension 410c is disposed within the arm 410a and the remainder of the arm extension 410c extends from the arm 410a. The locking assembly 420 is attached to the underside of the arm 410a near the end of the arm 410a from which the first arm extension 410b extends. The male blind mate connector 431 is attached to the end of the arm 410a from which the arm extension 410b extends.

Figure 5B:
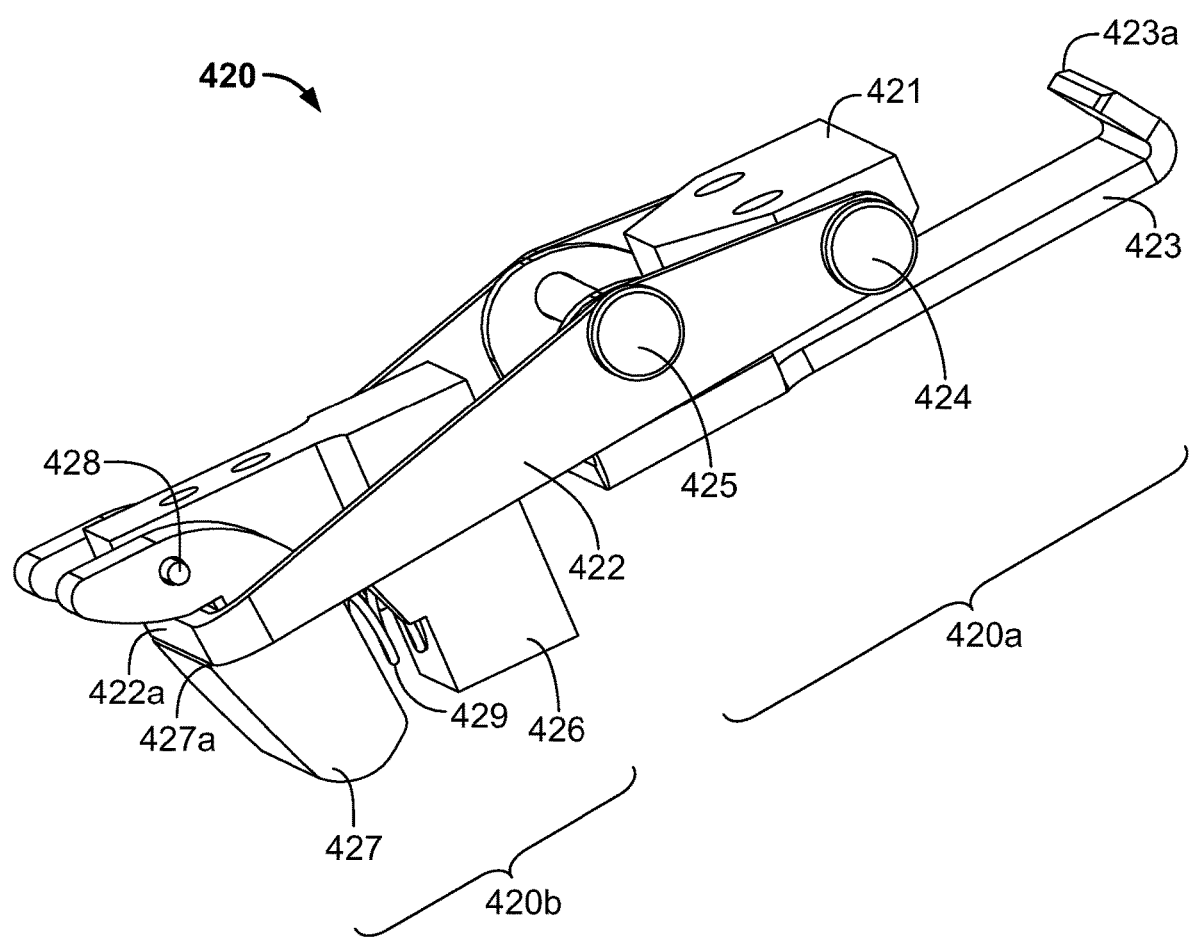
FIG. 5B is perspective view of the locking assembly of the arm module of FIG. 5A.
Figure 5C:
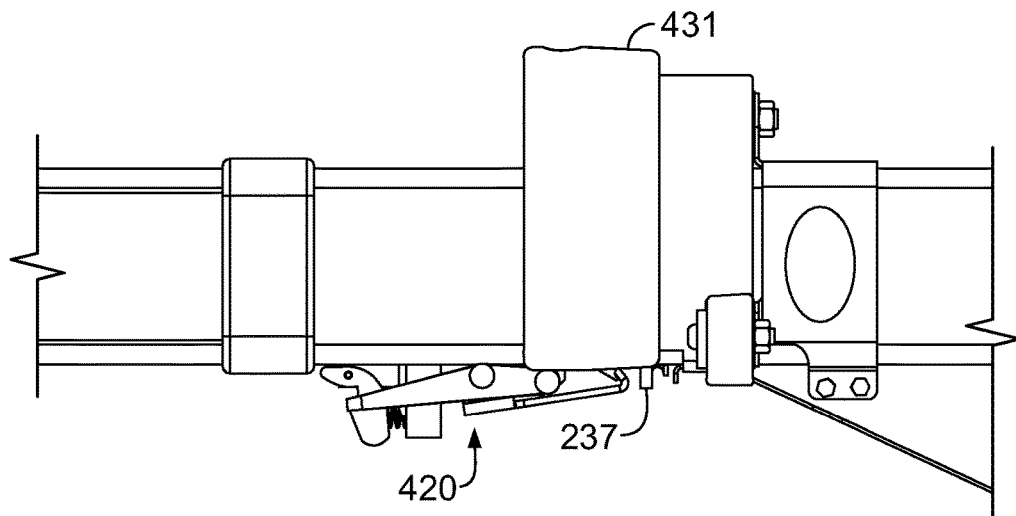
FIGS. 5C, 5D, and 5E are side elevational views of the arm module of FIG. 5A detaching from the hub module of FIG. 2 via the locking assembly of FIG. 5B.
Figure 5D:
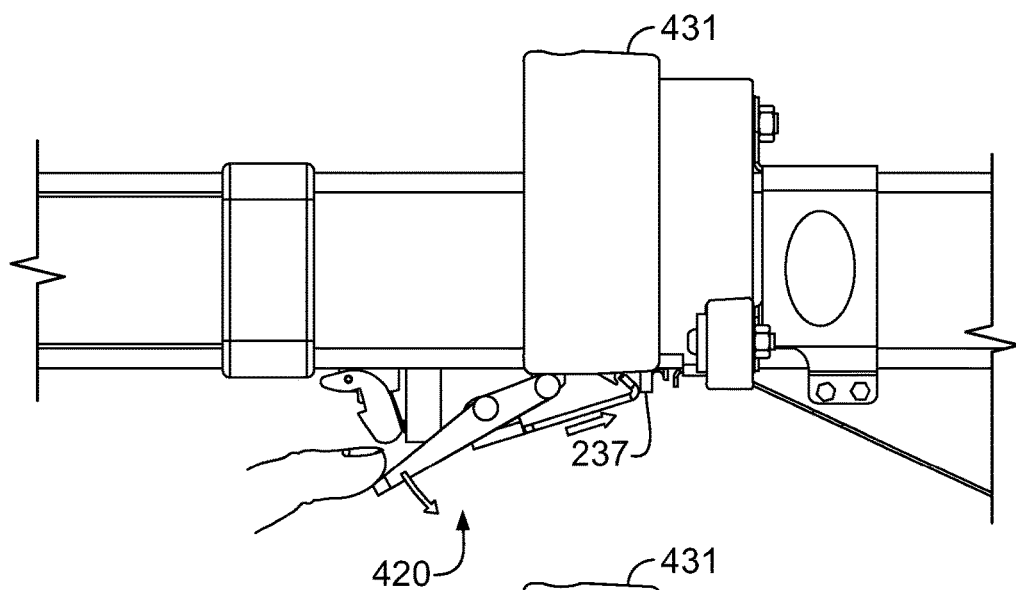
Figure 5E:
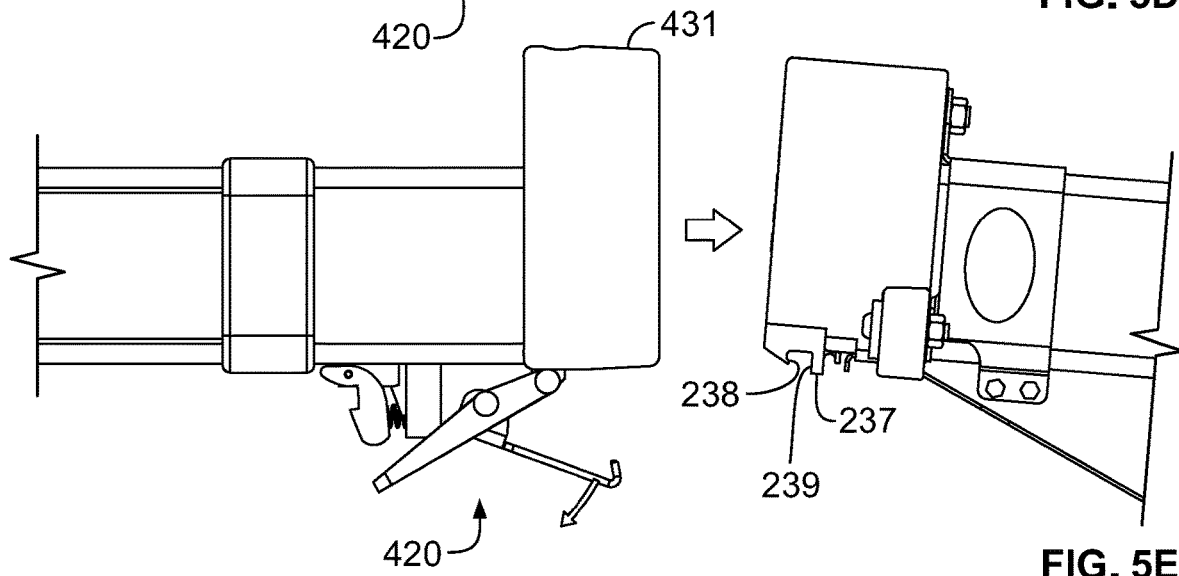

As best shown in FIGS. 5C-5E, the male blind mate connector 431—along with its counterpart female blind mate connector 231a of the hub module 100—facilitate mechanical attachment of the first arm module 400a to the hub module 100. The male blind mate connector 431 includes a plurality of pins 431a configured to mate with the pin receptacles of the female blind mate connector 231a.

To attach the first arm module 400a to the hub module 100, an operator inserts the arm extension 410b into the first arm module receiving socket 214a of the hub module 100 and slides the first arm module 400a toward the hub module 100 with enough force to mate the pins of the male blind mate connector 431 with the pin receptacles of the female blind mate connector 231a of the hub module 100.

As best shown in FIGS. 5B-5E, the locking assembly 420 includes a drawcatch 420a and a drawcatch lock 420b that facilitate attaching the first arm module 400a to the hub module 100, lock the first arm module 400a to the hub module 100, and facilitate detaching the first arm module 400a from the hub module 100.

As best shown in FIG. 5B, the drawcatch 420a includes a base 421, a lever 422, a claw 423, a first fastener 424 (such as a clevis pin or other suitable fastener), and a second fastener 425 (such as a clevis pin or other suitable fastener). The drawcatch lock 420b includes a base 426, a lock/release device 427 having a locking shelf 427a, a pin 428 (or other suitable connector), and a compression spring 429 (or other suitable biasing element).

The base 421 is attached to the underside of the arm 410a. The lever 422 is pivotably connected at one end to the base 421 via the first fastener 424. The other end of the lever 422 includes a handle 422a. The claw 423 is pivotably connected at one end to the lever 422 via the second fastener 425. The other end of the claw includes a latch plate engager 423a.

The base 426 is attached to the underside of the arm 410a. The lock/release device 427 is pivotably connected to the base 426 via the pin 428. The compression spring 429 is disposed between the base 426 and the lock/release device 427 and retained in place via cavities and/or projections defined in or extending from these components (not shown).

The lock/release device 427 is rotatable about the pin 428 from a lock rotational position to a release rotational position. The compression spring 429 biases the lock/release device 427 to the lock rotational position. To rotate the lock/release device 427 from the lock rotational position to the release rotational position, the operator pushes the lock/release device 427 inward with enough force to overcome the spring-biasing force and compress the compression spring 429.

The operator uses the locking assembly 420 to lock the male blind mate connector 431 with the female blind mate connector 231a as follows. The operator rotates the handle 422a of the lever 422 around the first fastener 424 toward the latch plate 237 on the hollow support 210a of the hub module 100 and engages the claw engager 238 of the latch plate 237 with the latch plate engager 423a of the claw 423. The operator then rotates the handle 422a around the first fastener 424 and toward the lock/release device 427 until the handle 422a contacts the lock/release device 427. Continued rotation of the lever 422 forces the lock/release device 427 inward, which overcomes the spring-biasing force and begins compressing the compression spring 429. This causes the lock/release device 427 to being rotating to the release rotational position. Once the handle 422 rotates past the locking shelf 427a, the spring-biasing force of the compression spring 429 causes the lock/release device 427 to rotate back to the lock rotational position. At this point, the locking shelf 427a prevents the handle 422 from rotating back toward the latch plate 237, and the first arm module 400a and the hub module 100 are locked together.

In addition to using the locking assembly 420 to lock the first arm module 400a to the hub module 100, the operator can use the locking assembly 420 to facilitate mating the male blind mate connector 431 with the female blind mate connector 231a. If the male blind mate connector 431 and the female blind mate connector 231a are only partially mated (or not mated at all) and the latch plate engager 423a of the claw 423 is engaged to the claw engager 238 of the latch plate 237, rotating the handle 422a of the lever 422 around the first fastener 424 toward the lock/release device 427 to lock the handle 422a will pull the first arm module 400a and the hub module 100 toward one another and cause the male blind mate connector 431 to mate with the female blind mate connector 231a.

As shown in FIGS. 5C-5E, the operator reverses this process to unlock the first arm module 400a from the hub module 100. The operator pushes the lock/release device 427 inward with enough force to overcome the spring-biasing force and to compress the compression spring 429, which causes the lock/release device 427 to rotate to the release rotational position. This frees the handle 422a to rotate. Once the handle 422a rotates past the locking shelf 427a, the operator rotates the handle 422a of the lever 422 around the first fastener 424 toward the latch plate 237 and disengages the latch plate engager 423a of the claw 423 from the claw engager 238 of the latch plate 237.

At this point, the operator can either physically pull the first arm module 400a and the hub module 100 apart to separate the male and female blind mate connectors 431 and 231a or use the locking assembly 420 to aid in detachment. When using the locking assembly 420 to aid in detachment, as shown in FIG. 5D, after disengaging the latch plate engager 423a from the claw engager 238, the operator continues rotating the handle 422a toward the latch plate 237 until the latch plate engager 423a contacts the backstop 239 of the latch plate 237. Afterward, continued rotation of the handle 422a toward the latch plate 237 causes the latch plate engager 423a to impose a pushing force against the backstop 239, which forces the first arm module 400a and the hub module 100 apart.

1.3 Front Landing Gear Modules

Figure 6:
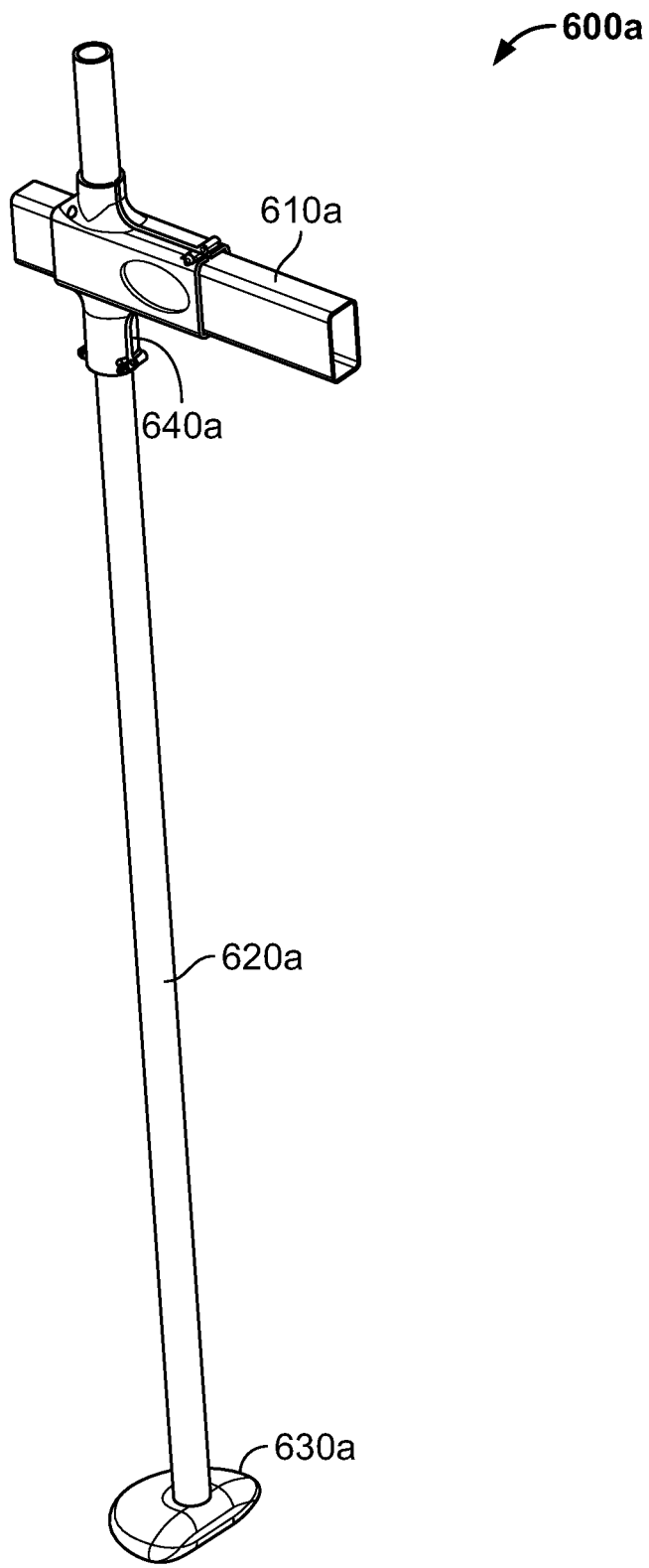
FIG. 6 is a perspective view of one of the front landing gear modules of the aircraft launch apparatus of FIG. 1A.

FIG. 6 shows the first front landing gear module 600a. The front landing gear modules (along with the rear landing gear modules, described below) support the aircraft launch apparatus 10 when assembled but not flying, and facilitate launch and landing of the aircraft launch apparatus 10 without damaging the aircraft launch apparatus 10. The second front landing gear module 600b is similar to the first front landing gear module 600a and is therefore not separately shown or described.

The first front landing gear module 600a includes a base 640a, a generally cylindrical leg 620a attached to and extending from the base 640a, and a generally rectangular tubular arm module receiving arm 610a attached to and extending from the base 640a. The leg 620a terminates in a generally semicircular foot 630a. The arm module receiving arm 610a defines an arm module receiving socket (not labeled) sized to receive the first arm module 400a.

The operator attaches the first front landing gear module 600a to the first arm module 400a by inserting the free end of the second arm extension 410c into the arm module receiving socket of the arm module receiving arm 610a of the first front landing gear module 600a. The operator then locks these two modules together, such as via suitable fasteners.

1.4 Rear Landing Gear Modules

Figure 7:
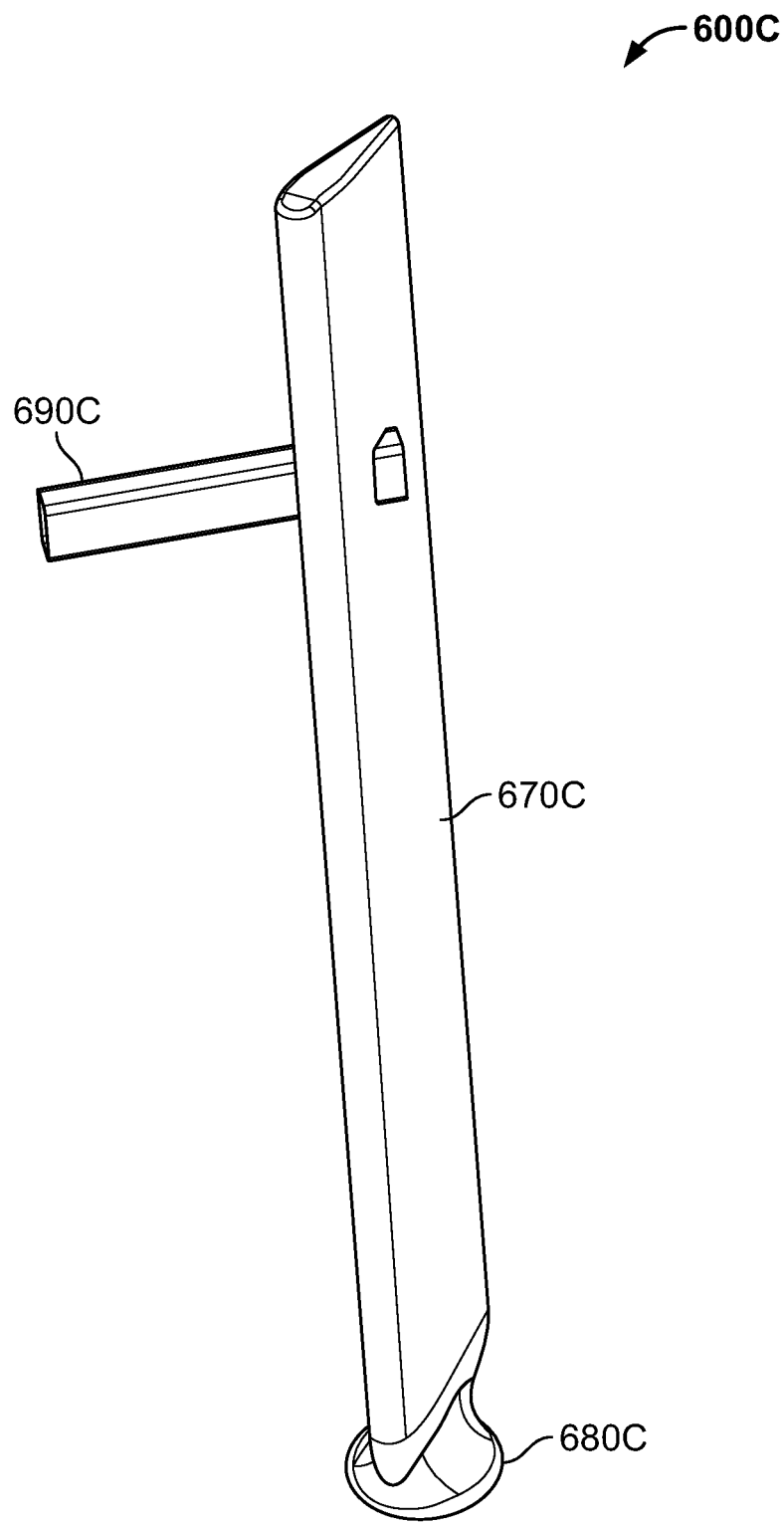
FIG. 7 is a perspective view of one of the rear landing gear modules of the aircraft launch apparatus of FIG. 1A.
Figure 8A:
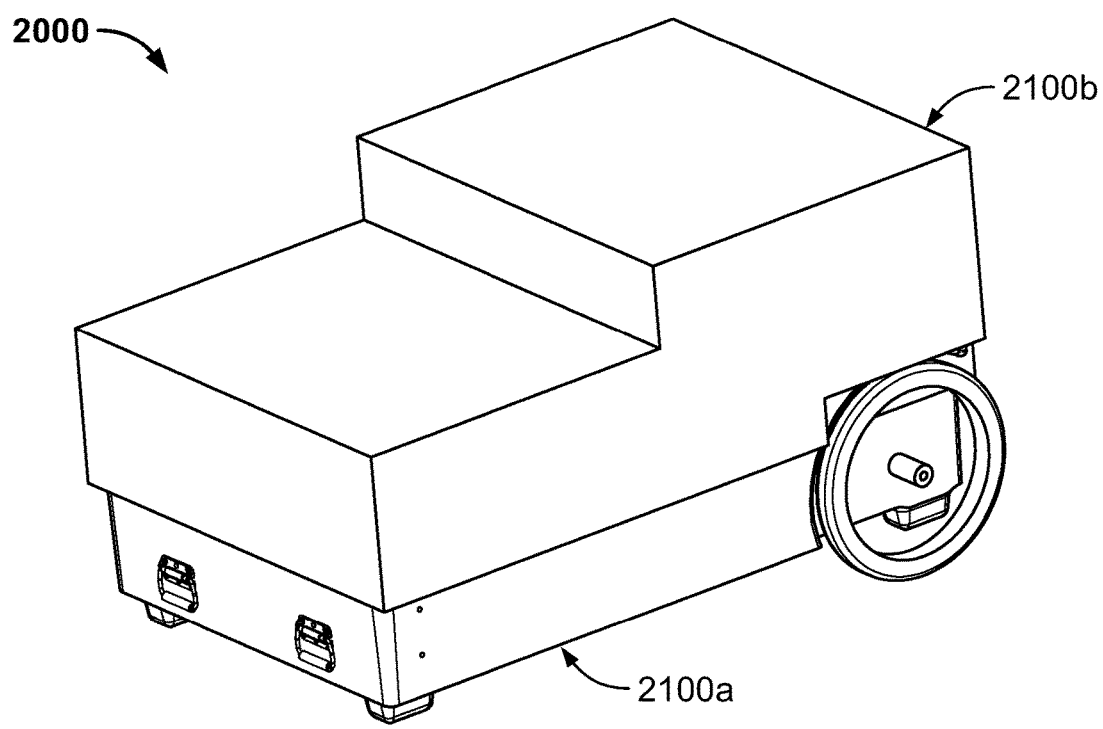
FIG. 8A is a perspective view of a storage and launch system of the present disclosure in an assembled configuration.
Figure 8B:
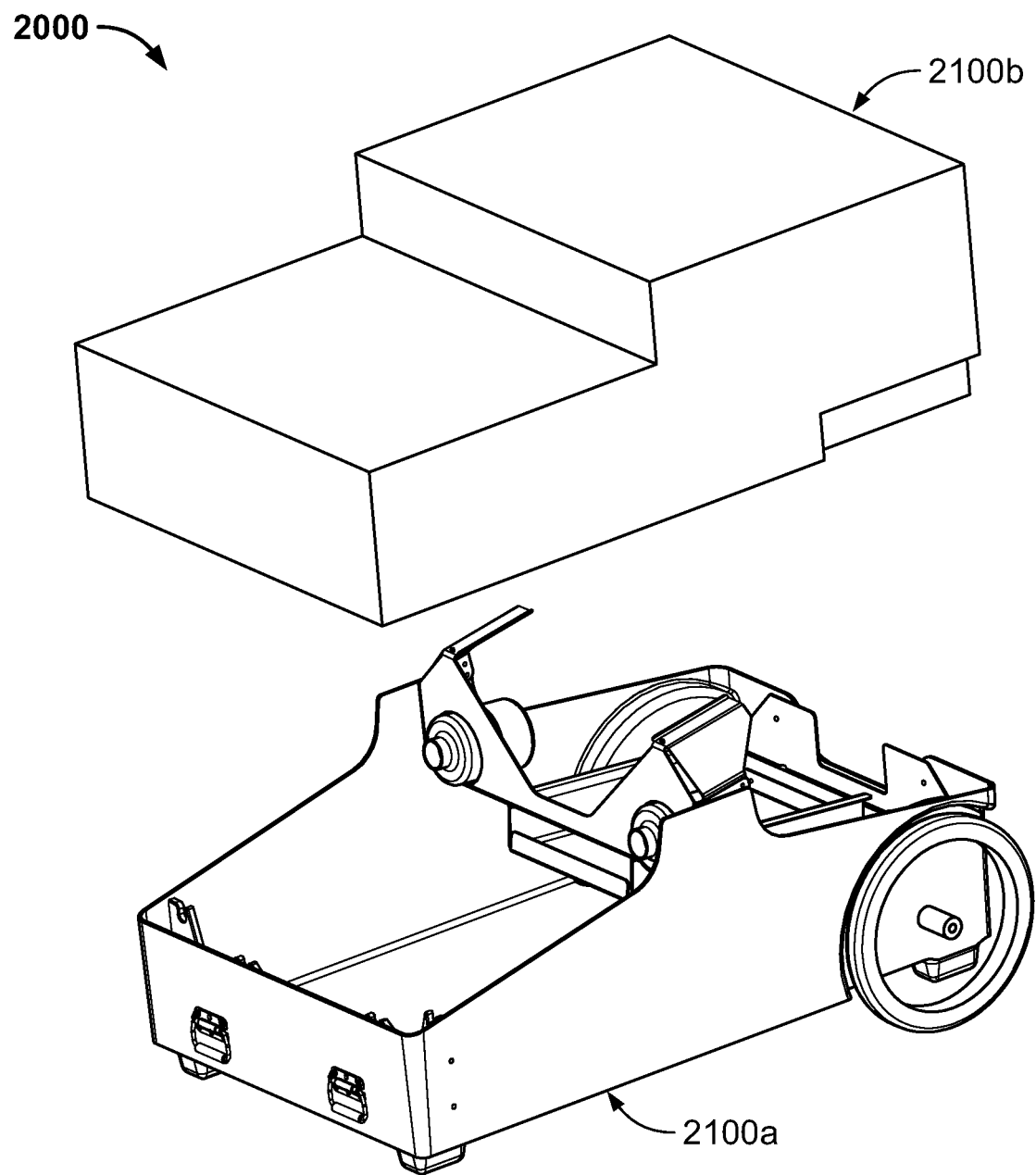
FIG. 8B is a perspective view of the storage and launch system of FIG. 8A in a partially exploded configuration.
Figure 8C:
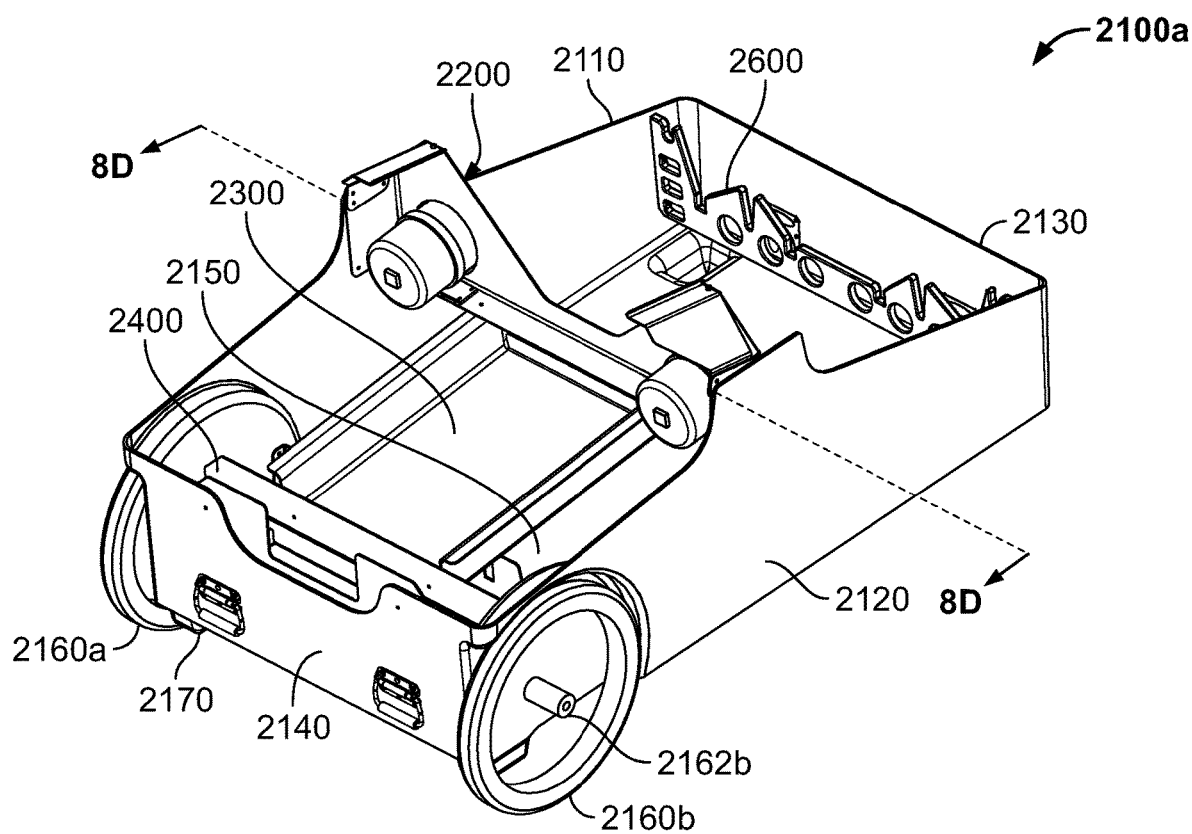
FIG. 8C is a perspective view of the storage and launch system of FIG. 8A with certain components removed.
Figure 8D:
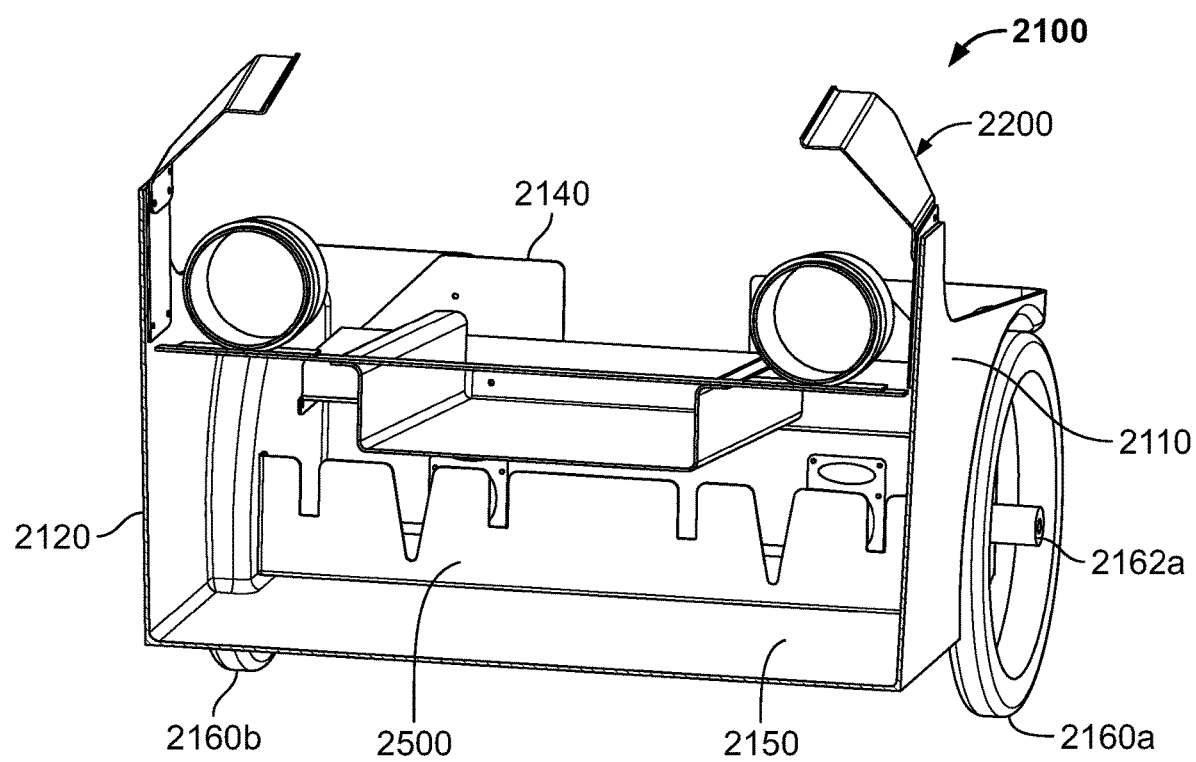
FIG. 8D is a cross-sectional view of the storage and launch system of FIG. 8A with certain components removed and taken substantially along line 8D-8D of FIG. 8C.
Figure 8E:
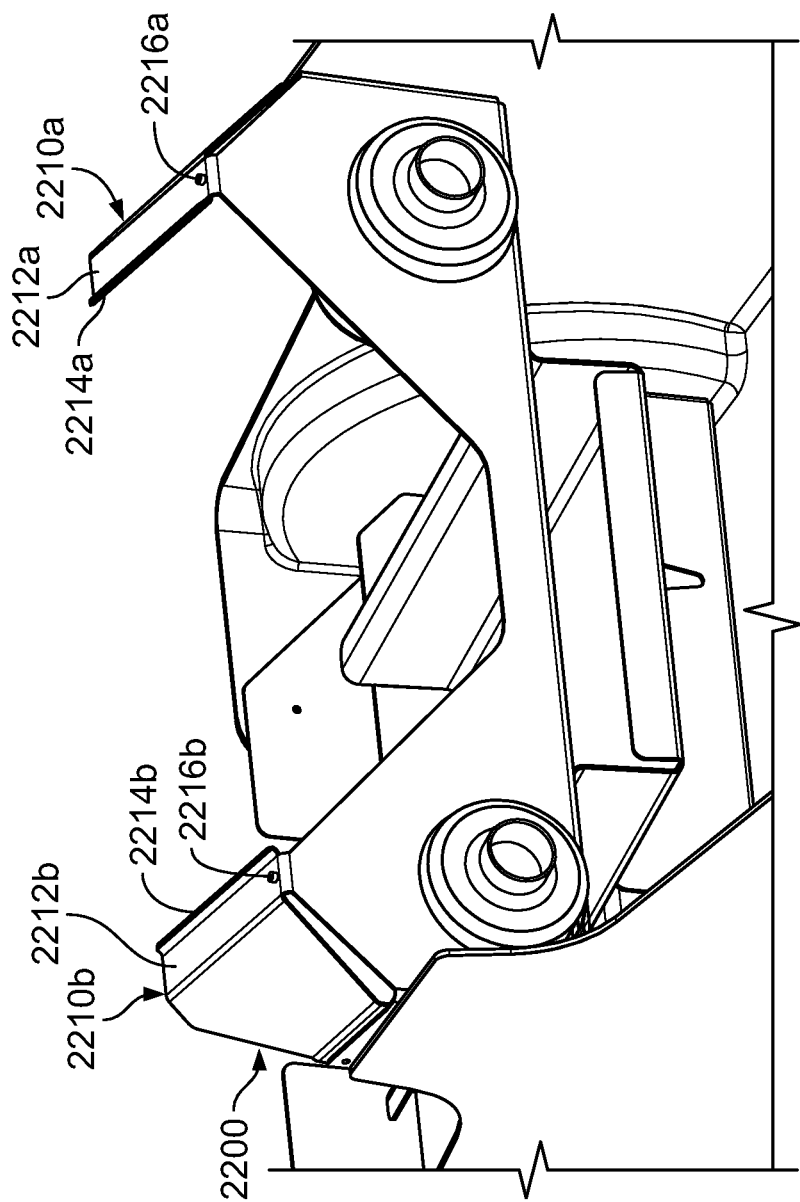
FIG. 8E is a perspective view of the storage and launch system of FIG. 8A with certain components removed.

FIG. 7 shows the first rear landing gear module 600c. The rear landing gear modules (along with the front landing gear modules, described above) support the aircraft launch apparatus 10 when assembled but not flying, and facilitate launch and landing of the aircraft launch apparatus 10 without damaging the aircraft launch apparatus 10. The rear landing gear modules are shaped such that they act as vertical stabilizers (or fins) during flight, ensuring that the front of the aircraft launch apparatus 10 (and the nose of the fixed-wing aircraft 20, if attached thereto) points generally into the airflow when in flight. The second rear landing gear module 600d is similar to the first rear landing gear module 600c and is therefore not separately shown or described.

The first rear landing gear module 600c includes a body 670c having a streamlined cross-section that tapers from front to back. The body 670c transitions at its bottom into a generally circular foot 680c. A generally rectangular tubular arm module receiving arm 690c is attached to and extends through the body 670c.

The operator attaches the first rear landing gear module 600c to the third arm module 400c by inserting the free end of the third arm extension into the arm module receiving socket of the arm module receiving arm 690a of the first rear landing gear module 600c. The operator then locks these two modules together, such as via suitable fasteners.

Once attached, the rear landing gear modules are oriented such that the side surfaces of the bodies of the rear landing gear modules are substantially aligned with the saddle side brackets 612 and 614 of the saddle 300. When the fixed-wing aircraft 20a is attached to the aircraft launch apparatus 10, these side surfaces of the rear landing gear modules are substantially parallel to a plane containing the roll axis of the fuselage of the fixed-wing aircraft 20a. The relatively long length of these side surfaces of the rear landing gear modules cause the rear landing gear module to act as fins in flight. This weather vane effect ensures that the nose of the fixed-wing aircraft 20a is oriented into the airflow when airborne.

The landing gear height is chosen to maintain clearance between the ground and the belly of the fixed-wing aircraft after an aborted launch sequence.

2. Storage and Launch System

The storage and launch system 2000 is shown in FIGS. 8A-8E. The storage and launch system 2000 is usable to compactly store the modular aircraft launch apparatus 10 after disassembly into the nine modules and to facilitate launch of the fixed-wing aircraft 20a into free, wing-borne flight by acting as a launch mount for the fixed-wing aircraft 20a.

The storage and launch system 2000 includes a container bottom 2100a to which several mounting brackets are attached and a container top 2100b configured to removably attach to the container bottom 2100a (such as via latches or in any other suitable manner) to enclose the mounting brackets.

The container bottom 2100a includes a first side wall 2110; a second side wall 2120 opposite the first side wall 2110; a front wall 2130 extending between the first and second side walls 2110 and 2120; a back wall 2140 opposite the front wall 2130 and extending between the first and second side walls 2110 and 2120; and a bottom wall 2150 extending between the first and second side walls 2110 and 2120, respectively, and the front and back walls 2130 and 2140, respectively. Together these walls define a cavity.

A first wheel 2160a is mounted to the first side wall 2110 near the back wall 2140 via an axle 2162a and one or more bearings (not shown) such that the first wheel 2160a is rotatable relative to the container bottom 2100a. Similarly, a second wheel 2160b is mounted to the second side wall 2120 near the back wall 2140 via an axle 2162b and one or more bearings (not shown) such that the second wheel 2160b is rotatable relative to the container bottom 2100a. Several feet 2170 extend from the bottom wall 2150.

A launch-assist bracket 2200 is attached to the container bottom 2100a and facilitates launch of the fixed-wing aircraft 20a by orienting the fixed-wing aircraft 20a in a desired launch orientation and retaining the fixed-wing aircraft 20a in that orientation until the operator desires to launch the fixed-wing aircraft 20a.

More specifically, the launch-assist bracket 2200 is attached to and extends between the first and second side walls 2110 and 2120 of the container bottom 2100a. The launch-assist bracket 2200 facilitates launch of the fixed-wing aircraft 20a by serving as a mount for the fixed-wing aircraft 20a and constraining its movement once mounted to the launch-assist bracket 2200. To this end, the launch-assist bracket 2200 includes a first aircraft engager 2210a and a second aircraft engager 2210b spaced apart from the first aircraft engager 2210a.

The first aircraft engager 2210a includes a first aircraft-engaging wall 2212a, a second aircraft-engaging wall 2214a, and a slide-preventing device 2216a. The first aircraft-engaging wall 2212a is generally planar and is downwardly angled relative to the bottom wall 2150 of the container bottom 2100a in the direction of the back wall 2140 of the container bottom 2100a to the front wall 2130 of the container bottom 2100a. The second aircraft-engaging wall 2214a is connected to (such as integrally formed with) and generally perpendicular to the first aircraft-engaging wall 2212a. The slide-preventing device 2216a, here a screw, extends through the first aircraft-engaging wall 2212a such that part of the slide-preventing device 2216a protrudes above a top surface (not labeled) of the first aircraft-engaging wall 2212a.

Similarly, the second aircraft engager 2210b includes a first aircraft-engaging wall 2212b, a second aircraft-engaging wall 2214b, and a slide-preventing device 2216b. The first aircraft-engaging wall 2212b is generally planar and is downwardly angled relative to the bottom wall 2150 of the container bottom 2100a in the direction of the back wall 2140 of the container bottom 2100a to the front wall 2130 of the container bottom 2100a. The second aircraft-engaging wall 2214b is connected to (such as integrally formed with) and generally perpendicular to the first aircraft-engaging wall 2212b. The slide-preventing device 2216b, here a screw, extends through the first aircraft-engaging wall 2212b such that part of the slide-preventing device 2216b protrudes above a top surface (not labeled) of the first aircraft-engaging wall 2212b.

In preparation for launch, the operator rests first and second launch-assist elements that extend below the wings of the fixed-wing aircraft 20a on the first aircraft-engaging walls 2212a and 2212b of the first and second aircraft engagers 2210a and 2210b, respectively. The operator then enables the fixed-wing aircraft 20a to slide down the first aircraft-engaging walls 2212a and 2212b (due to their sloped orientation) until the first and second launch-assist elements engage the slide-preventing devices 2216a and 2216b of the first and second aircraft engagers 2210a and 221b, respectively. The slide-preventing devices 2216a and 2216b prevent the fixed-wing aircraft 20a from sliding off of the first aircraft-engaging walls 2212a and 2212b, and thus retain the fixed-wing aircraft 20a in the desired launch orientation.

To facilitate storage of the aircraft launch apparatus 10 in a single container (including the container top 2100b and the container bottom 2100a), the container bottom 2100a includes first, second, third, and fourth mounting brackets 2300, 2400, 2500, and 2600 at least partially positioned within the cavity defined by the container bottom 2100a. The arm modules 400a-400d and the front and rear landing gear modules 600a-600d are mounted to these mounting brackets for storage.

The storage and launch apparatus includes an engine cooling module configured to force cooling airflow into the front of the aircraft engine during preflight. This enables the fixed-wing aircraft operator to perform complete engine run-up health checks and achieve thermal equilibrium of the fixed-wing aircraft engine prior to lift off.

3. Anchor System

The anchor system 3000 and components thereof is shown in FIGS. 9A-9H and 10A-10D. The anchor system 3000 is usable along with the rotorcraft 30, the flexible capture member 5000 (described below), and the aircraft-landing device 8000 (described below) to retrieve the fixed-wing aircraft 20a from free, wing-borne flight. Generally, the components of the anchor system 3000 operate together to impose a regulated force on the flexible capture member 5000 during the fixed-wing aircraft retrieval process. This means that the anchor system 3000 is configured to regulate—i.e., maintain substantially constant—the tension in the flexible capture member 5000 while the rotorcraft 30 is station-keeping relative to the anchor system 3000 in preparation for retrieval of the fixed-wing aircraft 20a. This simplifies the rotorcraft operation during the fixed-wing aircraft retrieval process by eliminating the need for the rotorcraft operator to control the tension in the flexible capture member 5000. The rotorcraft operator simply climbs and maintains a constant hover height, that is deliberately less than the length of the paid out flexible capture member.

The anchor system 3000 includes an anchor system base 3100, a first mounting bracket 3200, a second mounting bracket 3300, a separator bracket 3400, and a flexible capture member payout and retract system (not labeled). The flexible capture member payout and retract system includes a drum assembly 3500, a level wind system 3600, a transition assembly 3700, and a hydraulic system 7300.

3.1 Anchor System Base and Brackets

Figure 9A:
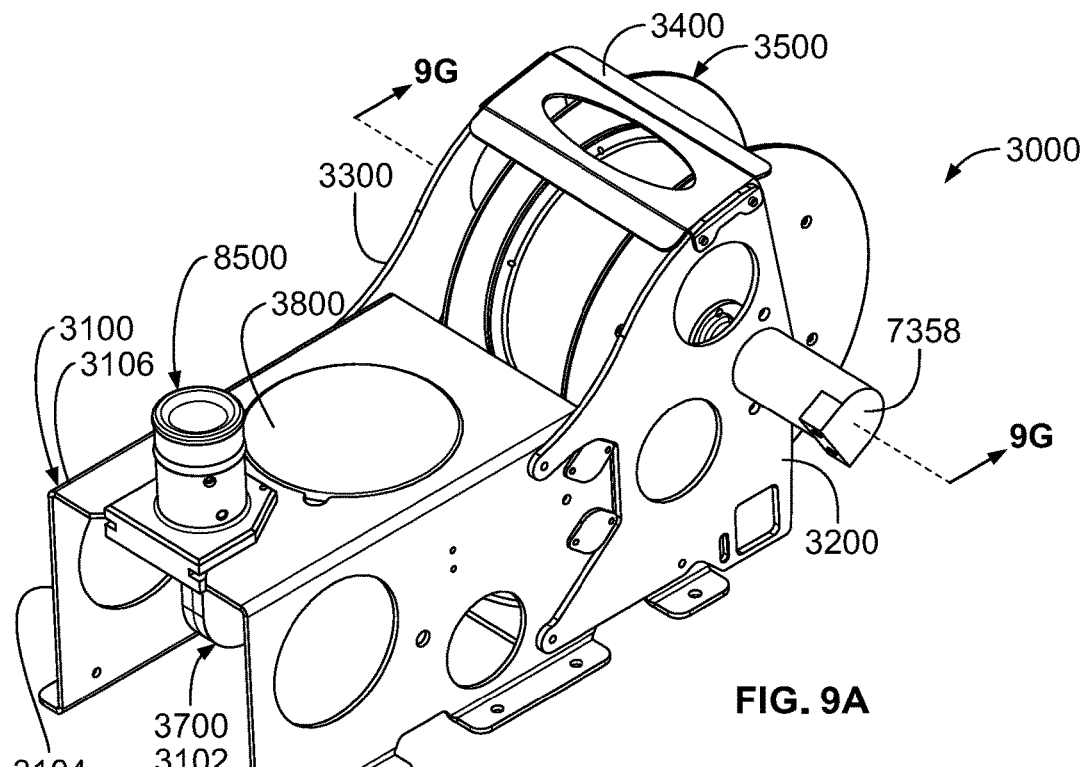
FIGS. 9A and 9B are a top perspective views of one example embodiment of the anchor system of the present disclosure.
Figure 9B:
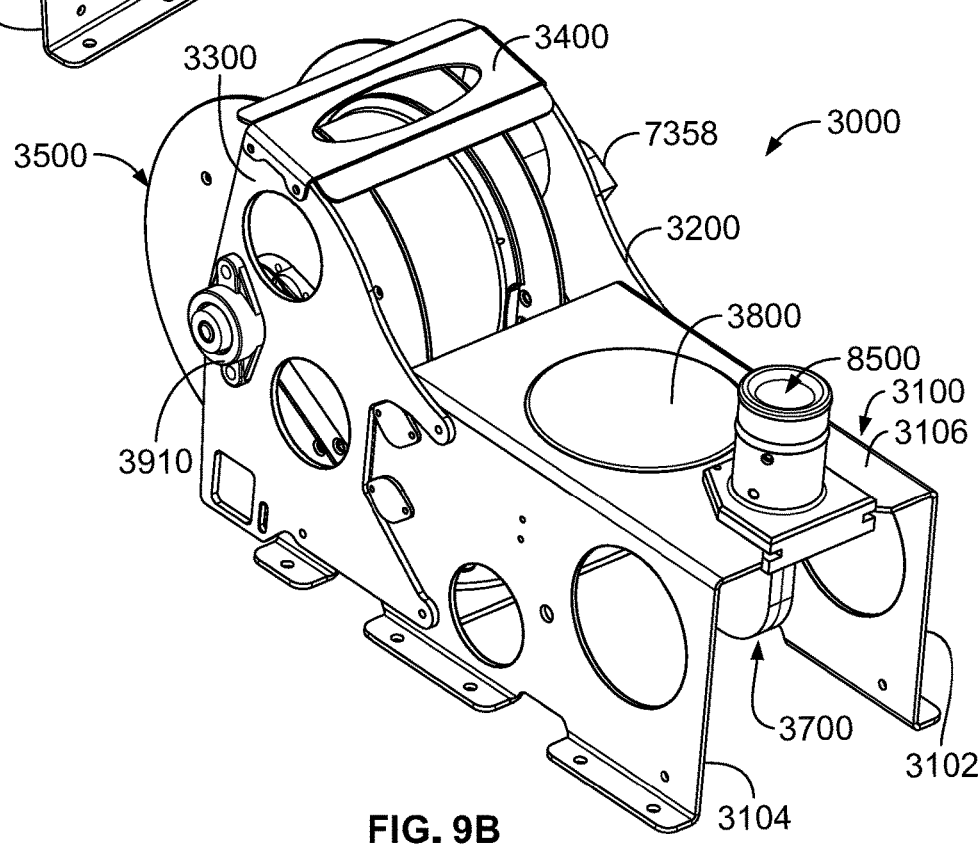
Figure 9C:
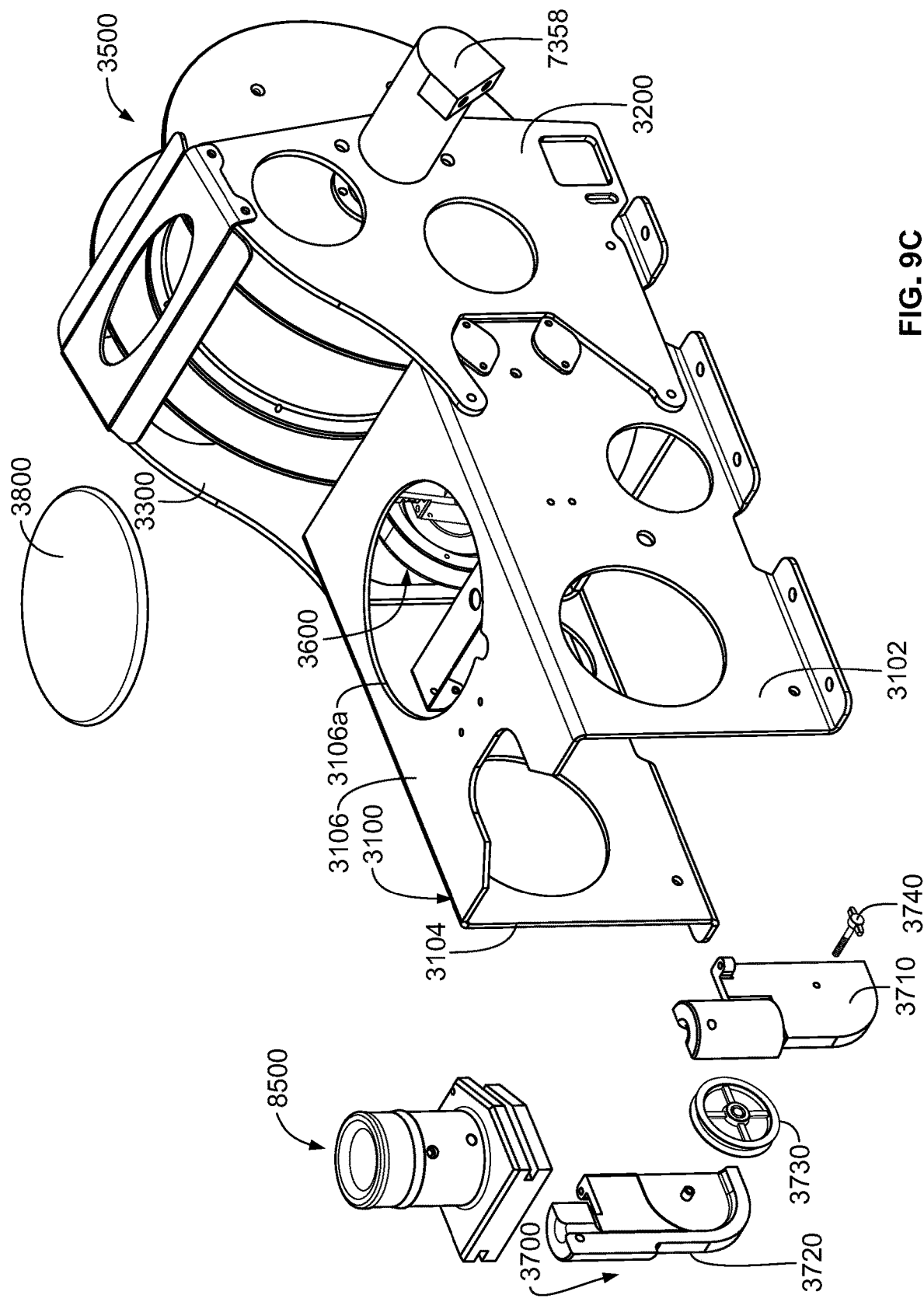
FIG. 9C is a partially exploded top perspective view of the anchor system of FIGS. 9A and 9B.

The anchor system base 3100 serves as a mount for certain other elements of the anchor system 3000. As best shown in FIGS. 9A-9E, the anchor system base 3100 includes two spaced-apart, generally parallel sides 3102 and 3104 and a top 3106 transverse (such as generally perpendicular) to, extending between, and connecting the sides 3102 and 3104. As best shown in FIG. 9C, the top 3106 includes a surface 3106a that defines a GPS antenna mounting opening through the top 3106 and a surface 3106b that defines a lower sealing and mounting component opening through the top 3106. The GPS antenna 3800 is attached to a mounting bracket (not labeled) that extends between the sides 3102 and 3104 such that the GPS antenna 3800 extends through the GPS antenna mounting opening of the top 3106. As described below, a lower sealing and mounting component 8500 of the aircraft-landing device 8000 is attachable to the top 3106 of the anchor system base 3100 via the lower sealing and mounting component mounting opening to attach the aircraft-landing device 8000 to the anchor system base 3100.

Figure 9D:
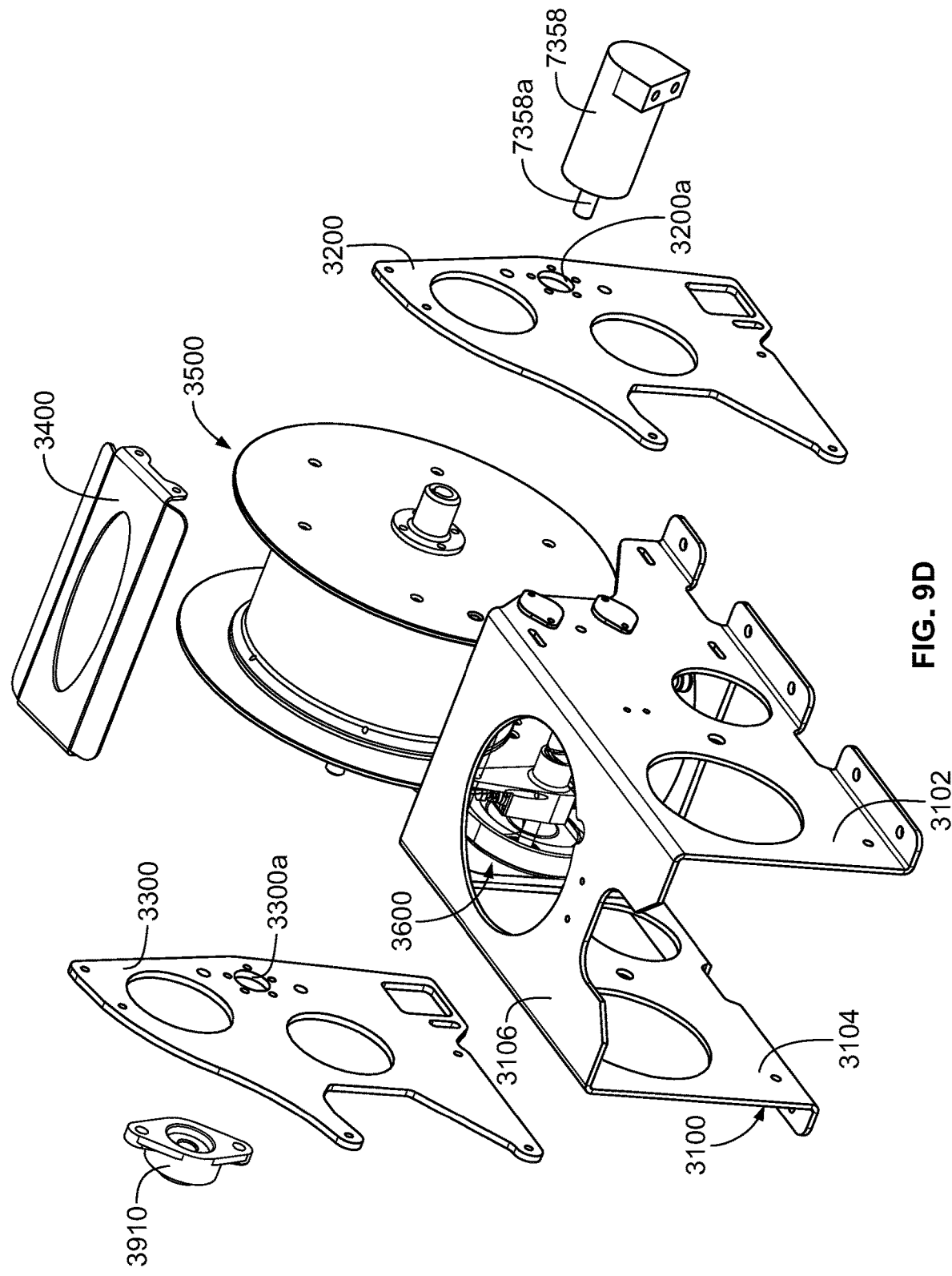
FIGS. 9D and 9E are partially exploded top perspective views of the anchor system of FIGS. 9A and 9B with some components removed.
Figure 9E:
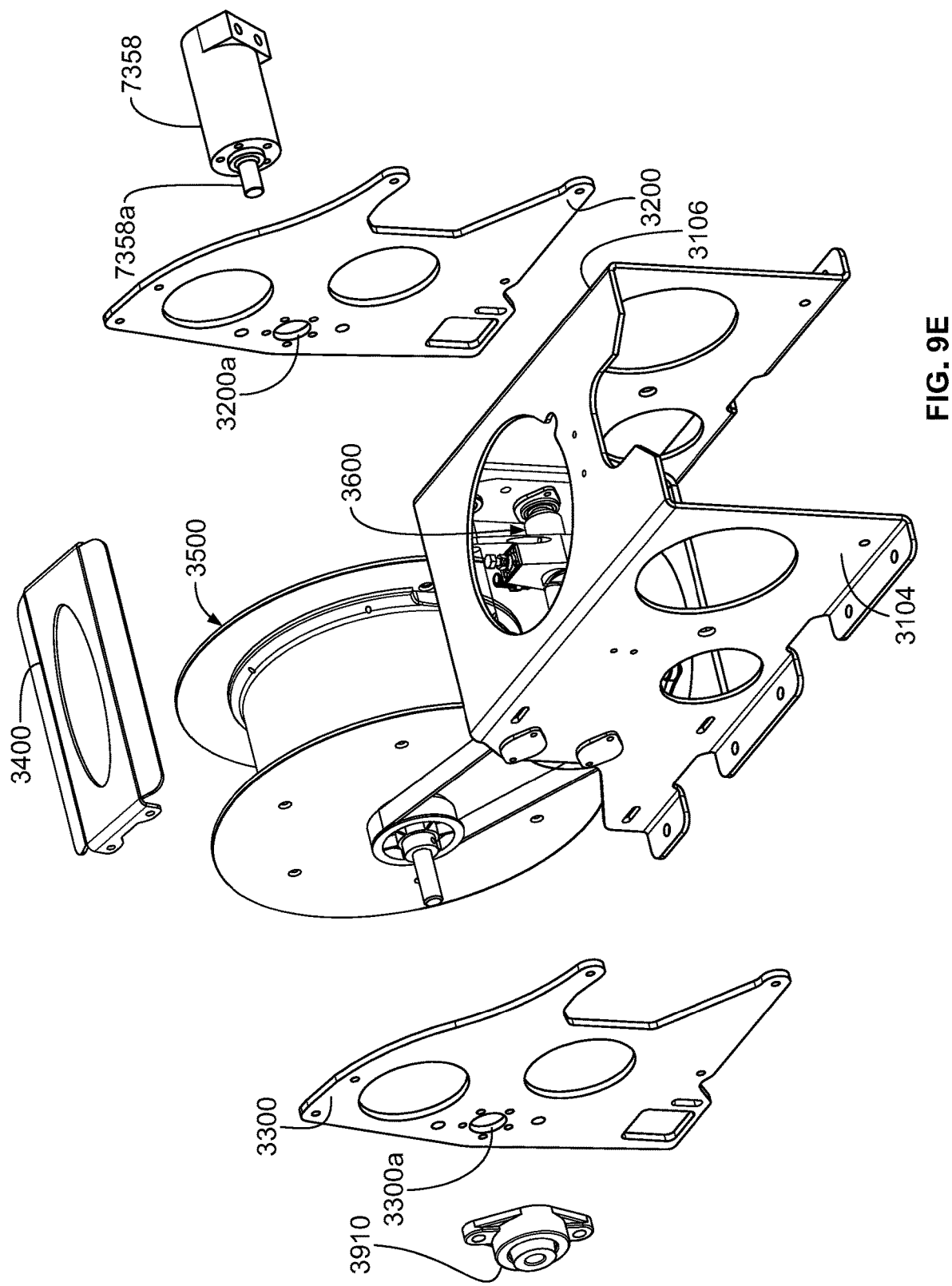

The first and second mounting brackets 3200 and 3300 serve as mounts for the drum assembly 3500 and part of the hydraulic system 7300. As best shown in FIGS. 9D and 9E, the first and second mounting brackets 3200 and 3300 are generally planar and include respective cylindrical surfaces 3200a and 3300a that respectively define first and second mounting openings through the first and second mounting brackets 3200 and 3300. The first mounting bracket 3200 is attached to the first side 3102 of the anchor system base 3100 via suitable fasteners (not shown), and the second mounting bracket 3300 is attached to the second side 3104 of the anchor system base 3100 via suitable fasteners (not shown). The separator bracket 3400 is attached to and extends between the first and second mounting brackets 3200 and 3300 via suitable fasteners (not shown) to maintain the spacing between these components.

3.2 Drum Assembly

Figure 9F:
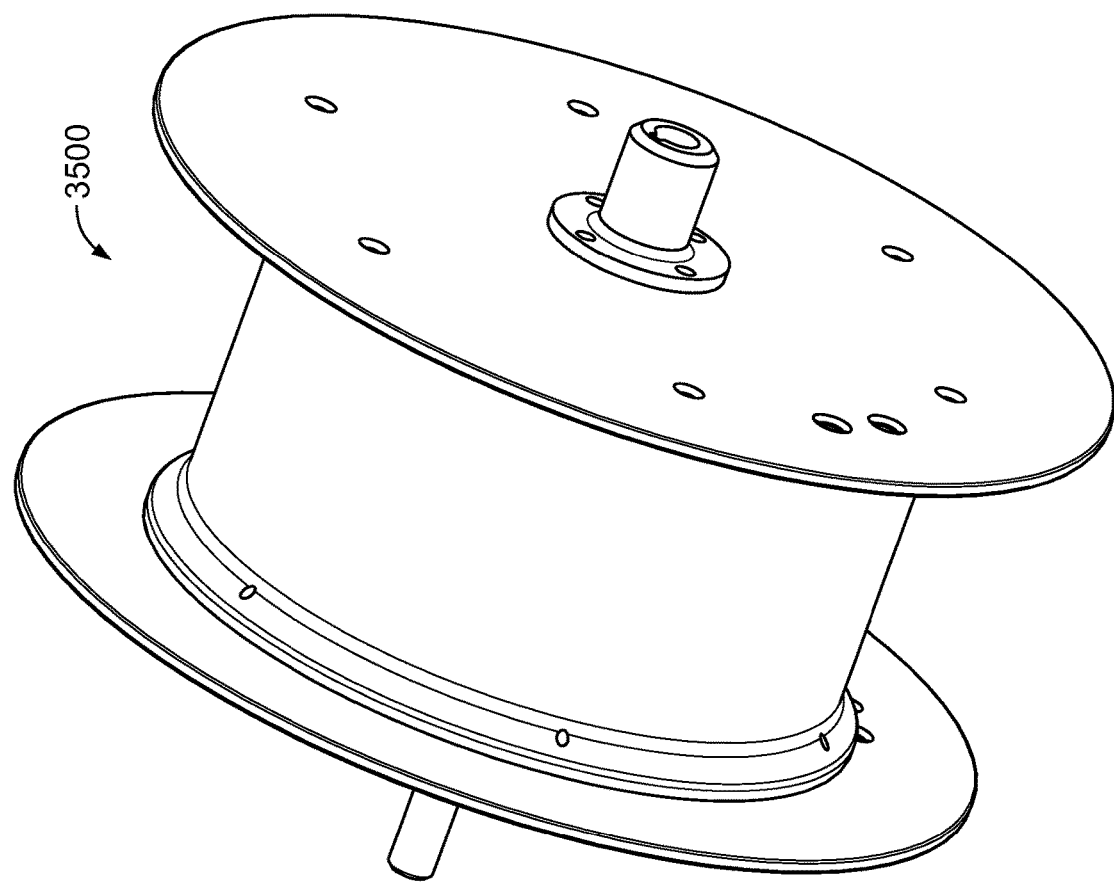
FIG. 9F is a partially exploded top perspective view of the drum assembly and the level wind system of the anchor system of FIGS. 9A and 9B.
Figure 9F:
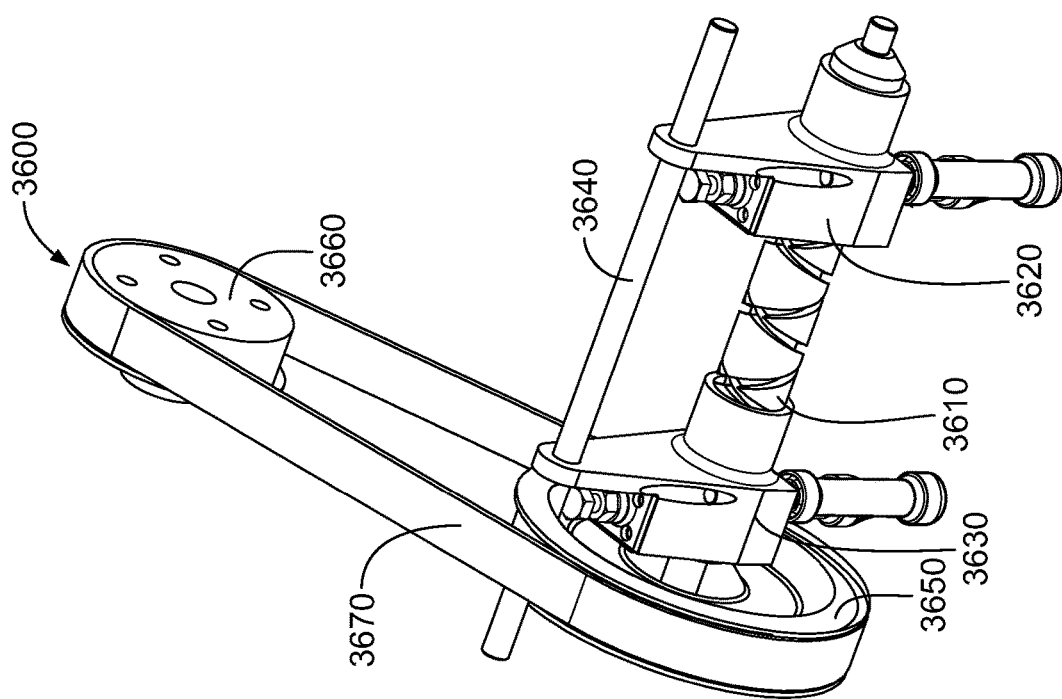
Figure 9G:
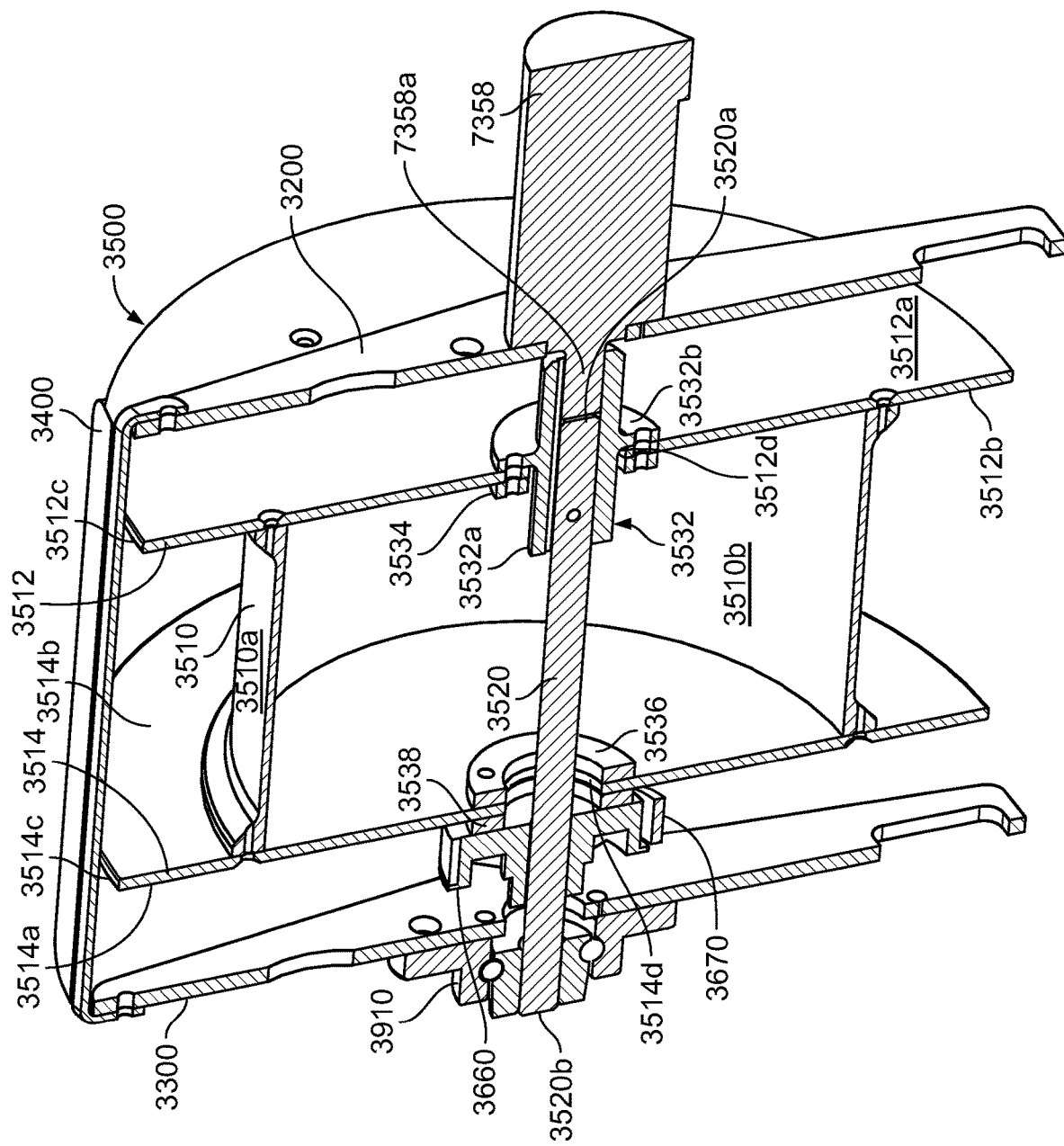
FIG. 9G is a cross-sectional top perspective view of the anchor system of FIGS. 9A and 9B taken substantially along line 9G-9G of FIG. 9A.

The flexible capture member 5000 may be wound onto and off of the drum assembly 3500. As best shown in FIG. 9G, the drum assembly 3500 includes a drum 3510 having a cylindrical exterior surface 3510a and a cylindrical interior surface 3510b; a first drum flange 3512 having a circular exterior surface 3512a, a circular interior surface 3512b, a cylindrical perimeter surface 3512c, and a cylindrical mounting surface 3512d that defines a mounting opening through the first flange 3512; a second drum flange 3514 having a circular exterior surface 3514a, a circular interior surface 3514b, a cylindrical perimeter surface 3514c, and a cylindrical mounting surface 3514d that defines a mounting opening through the second flange 3514; a drum shaft 3520; a coupler 3532 including a tubular coupler shaft 3532a defining a shaft-receiving bore therethrough and a coupler flange 3532b extending radially outwardly from the coupler shaft 3532a; a first annular flange 3534; a second annular flange 3536; and a third annular flange 3537.

The first and second drum flanges 3512 and 3514 are fixedly attached to opposing longitudinal ends (not labeled) of the drum 3510 via fasteners (not shown) such that the interior surface 3510b of the drum 3510 and the interior surfaces 3512b and 3514b of the first and second drum flanges 3512 and 3514 define a cylindrical inner drum cavity (not labeled).

The coupler flange 3532b and the first annular flange 3534 are fixedly attached to one another and to the first drum flange 3512 via fasteners (not shown) such that: (1) the coupler flange 3532b contacts the exterior surface 3512a of the first drum flange 3512; (2) the first annular flange 3534 is within the inner drum cavity and contacts the interior surface 3512b of the first drum flange 3512; (3) the coupler flange 3532b and the first annular flange 3534 sandwich part of the first drum flange 3512 therebetween; and (4) a first portion of the coupler shaft 3532a is within the inner drum cavity while a second portion of the coupler shaft 3532a is outside of the inner drum cavity.

The second annular flange 3536 and the third annular flange 3538 are fixedly attached to one another and to the second drum flange 3514 via fasteners (not shown) such that: (1) the third annular flange 3538 contacts the exterior surface 3514a of the second drum flange 3514; (2) the second annular flange 3536 is within the inner drum cavity and contacts the interior surface 3514b of the second drum flange 3514; and (3) the second annular flange 3536 and the third annular flange 3538 sandwich part of the second drum flange 3514 therebetween.

The drum shaft 3520 extends across the inner drum cavity such that a first end 3520a of the drum shaft 3520 is received in the shaft-receiving bore defined through the coupler shaft 3532a and a second end 3520b of the drum shaft 3520 is outside of the inner drum cavity. The drum shaft 3520 is coupled to the coupler 3532 in any suitable manner such that the drum shaft 3520 is substantially axially fixed (i.e., cannot substantially move axially) relative to the coupler 3532 and such that the drum shaft 3520 and the coupler 3532 rotate together about the longitudinal axis of the drum shaft 3520. That is, the drum shaft 3520 and the coupler 3532 are coupled such that rotation of the drum shaft 3520 causes the coupler 3532 to rotate, and vice-versa. In this embodiment, this coupling is achieved via a fastener (not shown) threadably received by the coupler 3532 and the drum shaft 3520. This fixedly attaches the coupler 3532 and the drum shaft 3520. In other embodiments, the drum shaft is keyed to the coupler (or vice-versa) such that they rotate together. In other embodiments, retaining rings, pins, clips, or other elements axially fix the drum shaft relative to the coupler.

The drum shaft 3520 is mounted to the second mounting bracket 3300. Specifically, the second end 3520b of the drum shaft 3520 extends through the second mounting opening defined through the second mounting bracket 3300 and is received in a drum shaft flange bearing 3910 attached to the second mounting bracket 3300. This enables the drum shaft 3520 to rotate about its longitudinal axis relative to the second mounting bracket 3300. The drum shaft 3520 is mounted to the first mounting bracket 3200 via the below-described coupling of the coupler 3532 and a motor output shaft 7358*a* of a hydraulic motor 7358 of the hydraulic system 7300.

3.3 Level Wind System

The level wind system 3600 ensures that the flexible capture member 3600 is wound onto (and off of) the drum 3510 in a generally uniform manner. As best shown in FIG. 9F, the level wind system 3600 includes a level wind shaft 3610, a first traveler 3620, a second traveler 3630, a guide shaft 3640, a first pulley 3650, a second pulley 3660, and a belt 3670.

The first and second travelers 3620 and 3630 are slidably mounted to the level wind shaft 3610 in a spaced-apart fashion such that their respective guide elements (not shown) are received in channels (not labeled) defined in the exterior surface of the level wind shaft 3610 around its circumference. The arrangement and shape of these grooves define how far and how fast the first and second travelers 3620 and 3630 slide back and forth relative to the level wind shaft 3610 as the level wind shaft 3610 rotates. The first and second travelers 3620 and 3630 are also slidably mounted to the guide shaft 3640 to prevent the first and second travelers 3620 and 3630 from about the longitudinal axis of the level wind shaft 3610.

The level wind shaft 3610 is mounted to the sides 3102 and 3104 of the anchor system base 3100. More specifically, the ends of the level wind shaft 3610 are received in respective level wind shaft flange bearings (not labeled) attached to the sides 3102 and 3104 of the anchor system base 3100 such that the level wind shaft 3610 can rotate about its longitudinal axis relative to the sides 3102 and 3104 of the anchor system base 3100. Similarly, the guide shaft 3400 is mounted to the sides 3102 and 3104 of the anchor system base 3100. More specifically, the ends of the guide shaft 3640 are received in respective guide shaft flange bearings (not labeled) attached to the sides 3102 and 3104 of the anchor system base 3100 such that the guide shaft 3640 can rotate about its longitudinal axis relative to the sides 3102 and 3104 of the anchor system base 3100.

The first pulley 3650 is mounted to and coupled to the level wind shaft 3610 in any suitable manner such that the first pulley 3650 is substantially axially fixed (i.e., cannot substantially move axially) relative to the level wind shaft 3610 and such that the first pulley 3650 and the level wind shaft 3610 rotate together about the longitudinal axis of the level wind shaft 3610. That is, the first pulley 3650 and the level wind shaft 3610 are coupled such that rotation of the first pulley 3650 causes the level wind shaft 3610 to rotate, and vice-versa. In this embodiment, this coupling is achieved via a fastener (not shown) threadably received by the first pulley 3650 and the level wind shaft 3610. This fixedly attaches the first pulley 3650 to the level wind shaft 3610. In other embodiments, the level wind shaft is keyed to the first pulley (or vice-versa) such that they rotate together. In other embodiments, retaining rings, pins, clips, or other elements axially fix the first pulley relative to the level wind shaft.

As best shown in FIG. 9G, the second pulley 3660 is mounted to and coupled to the drum shaft 3520 in any suitable manner such that the second pulley 3660 is substantially axially fixed (i.e., cannot substantially move axially) relative to the drum shaft 3520 and such that the second pulley 3660 and the drum shaft 3520 rotate together about the longitudinal axis of the drum shaft 3520. That is, the second pulley 3660 and the drum shaft 3520 are coupled such that rotation of the drum shaft 3520 causes the second pulley 3660 to rotate, and vice-versa. In this embodiment, this coupling is achieved via a fastener (not shown) threadably received by the second pulley 3660 and the drum shaft 3520. This fixedly attaches the second pulley 3660 to the drum shaft 3520. In other embodiments, the drum shaft is keyed to the second pulley (or vice-versa) such that they rotate together. In other embodiments, retaining rings, pins, clips, or other elements axially fix the second pulley relative to the drum shaft.

The belt 3670 fits around and operatively connects the first and second pulleys 3650 and 3660 such that rotation of one of the pulleys causes the other to rotate.

In operation, as the drum shaft 3520 of the drum assembly 3500 rotates, the second pulley 3660 rotates therewith. Rotation of the second pulley 3660 causes the first pulley 3650 to rotate due to their connection via the belt 3670. Rotation of the first pulley 3650 causes the level wind shaft 3610 to rotate. Rotation of the level wind shaft 3610 causes the first and second travelers 3620 and 3630 to slide relative to the level wind shaft 3610 due to their guide elements being received in the grooves defined in the level wind shaft 3610. This sliding of the first and second travelers 3620 and 3630 (which is keyed to rotation of the drum shaft 3520) guides placement of the flexible capture member 5000 as it is wound onto (or off of) the drum 3510.

3.4 Transition Assembly

The transition assembly 3700 is configured to route the flexible capture member 5000 from the aircraft-landing device 8000 to the level wind system 3600. As best shown in FIG. 9C, the transition assembly 3700 includes a first transition assembly housing portion 3710, a second transition assembly housing portion 3720, a transition pulley 3730, and a fastener 3740. The first and second transition assembly housing portions 3710 and 3720 are attachable to one another via the fastener 3740, and together define a transition pulley cavity and a flexible capture member receiving bore in fluid communication with the transition pulley cavity. The transition pulley 3730 is rotatably mounted on a spindle (not labeled) within the transition pulley cavity such that the transition pulley 3730 can rotate relative to the first and second transition assembly housing portions 3710 and 3720. As described in detail below, the transition assembly 3700 is attachable to the lower sealing and mounting component 8500, which in turn is slidably receivable on the anchor system base 3100.

3.5 Hydraulic System

The hydraulic system 7300 is configured to regulate the tension in the flexible capture member 5000 during the fixed-wing aircraft retrieval process. As best shown in FIGS. 10A-10D, the hydraulic system 7300 includes an electric hydraulic pump 7350 (such as one of the PU-Series Hydraulic Economy Electric Pumps sold by Enerpac) having an inlet port and an outlet port, an accumulator 7352 (such as the Piston-Style Hydraulic Accumulator #6716K51 sold by McMaster-Carr) having an inlet/outlet port, a pressure relief valve 7356 (such as the Adjustable Stainless Steel Relief Valve #5027K11 sold by McMaster-Carr) having an inlet port and an outlet port, the hydraulic motor 7358 (such as the Pilot Flange Mount J Series Hydraulic Motor #5PZL3 sold by Grainger) having an inlet port and an outlet port, a hydraulic fluid tank 7362 (such as that included in one of the PU-Series Hydraulic Economy Electric Pumps sold by Enerpac) having an inlet port and an outlet port, and a pressure switch 7364 (such as the Extended-Life Pressure Switch #4735K46 sold by McMaster-Carr).

The hydraulic motor 7358 is attached to the first mounting bracket 3200 such that the motor output shaft 7358*a* extends through the first mounting opening defined through the first mounting bracket 3200 and is received in the shaft-receiving bore defined through the coupler shaft 3532a of the coupler 3532. The motor output shaft 7358a is coupled to the coupler 3532 in any suitable manner such that the motor output shaft 7358a and the coupler 3532 rotate together. That is, the motor output shaft 7358a and the coupler 3532 are coupled such that rotation of the motor output shaft 7358a causes the coupler 3532 to rotate, and vice-versa. In this embodiment, the motor output shaft 7358a is keyed to the coupler 3532.

The remaining components of the hydraulic system 7300 are attached to each other; the container housing the anchor system 3000; and/or the anchor base 3100, the first mounting bracket 3200, or the second mounting bracket 3300.

The inlet port of the electric hydraulic pump 7350 is in fluid communication with the outlet port of the tank 7362, and the outlet port of the electric hydraulic pump 7350 is in fluid communication with the inlet/outlet port of the accumulator 7352, the inlet port of the pressure relief valve 7356, and the inlet port of the hydraulic motor 7358. The inlet port of the hydraulic motor 7358 is in fluid communication with the inlet port of the pressure relief valve 7356. The outlet port of the hydraulic motor 7358 is in fluid communication with the outlet port of the pressure relief valve 7356 and the inlet port of the tank 7362. In this embodiment, these components are in fluid communication with one another via suitable flexible or rigid tubing (not shown), though any suitable lines, hoses, or tubing may be used to fluidically connect these components. The hydraulic system 7300 also includes various fittings and connectors (not shown) that facilitate fluidically connecting these components. These fittings and connectors are well-known in the art and are not described herein for brevity.

When electrically connected to a power source and powered on, the electric hydraulic pump 7350 draws hydraulic fluid (such as oil or any other suitable fluid) from the tank 7362 and through its inlet port and pumps the hydraulic fluid out of its outlet port at a pump outlet pressure (800 psi in this example embodiment).

In certain situations, as explained below, the accumulator 7352 receives hydraulic fluid at its inlet/outlet and stores hydraulic fluid at a particular pressure to reduce pressure switch chatter (as described below). The accumulator gas charge is preloaded to the pressure switch lower set point (650 psi in this example embodiment, as described below) to minimize pressure switch chatter frequency.

The pressure switch is configured to measure the pressure of hydraulic fluid at the accumulator 7352. The pressure switch 7364 selectively connects the electric hydraulic pump 7350 to a power source 7400 based on the pressure P1 of hydraulic fluid at the accumulator 7352. The pressure switch measures P1 and: (1) electrically connects the power source 7400 and the electric hydraulic pump 7350 when P1 is less than a pressure switch lower set point (650 psi in this example embodiment); and (2) electrically disconnects the power source 7400 and the electric hydraulic pump 7350 when P1 is greater than or equal to a pressure switch upper set point (800 psi in this example embodiment). The combination of the accumulator 7352 and the pressure switch 7364 ensures that the electric hydraulic pump 7350 only operates as needed to maintain the pressure of the hydraulic fluid in the accumulator 7352.

The pressure relief valve 7356 receives hydraulic fluid at its inlet port and prevents the hydraulic fluid from exiting its outlet port until the pressure of the hydraulic fluid reaches a pressure relief valve set point (850 psi in this example embodiment). In other words, the pressure relief valve 7356 is movable between a closed configuration in which the pressure relief valve 7356 prevents the hydraulic fluid from flowing from its inlet port to its outlet port and an open configuration in which the pressure relief valve 7356 enables the hydraulic fluid to flow from its inlet port to its outlet port. The pressure relief valve 7356 is biased to the closed configuration, and moves to the open configuration when the pressure of the hydraulic fluid reaches the pressure relief valve set point.

Depending on the scenario, the hydraulic motor 7358 receives hydraulic fluid at either its inlet port from the electric hydraulic pump 7350 or its outlet port from the pressure relief valve 7356. When the hydraulic motor 7358 receives hydraulic fluid at its inlet port from the electric hydraulic pump 7350, the hydraulic fluid flows through the hydraulic motor 7358 and exits its outlet port. The flow of the hydraulic fluid in this direction causes the output shaft of the hydraulic motor 7358 to rotate in a direction that, as described below, causes the flexible capture member to wrap around the drum 3510. On the other hand, when excessive force on the flexible capture member 5000 forces the drum 3510 to rotate in a manner that enables flexible capture member payout, the hydraulic motor 7358 receives hydraulic fluid at its outlet port from the pressure relief valve 7356, and the hydraulic fluid flows through the hydraulic motor 7358 and exits its inlet port. The flow of the hydraulic fluid in this direction is intentionally lossy, forming an energy sink for the kinetic energy of the aircraft being captured.

3.5.1 Flexible Capture Member Haul-in Phase

Figure 10A:
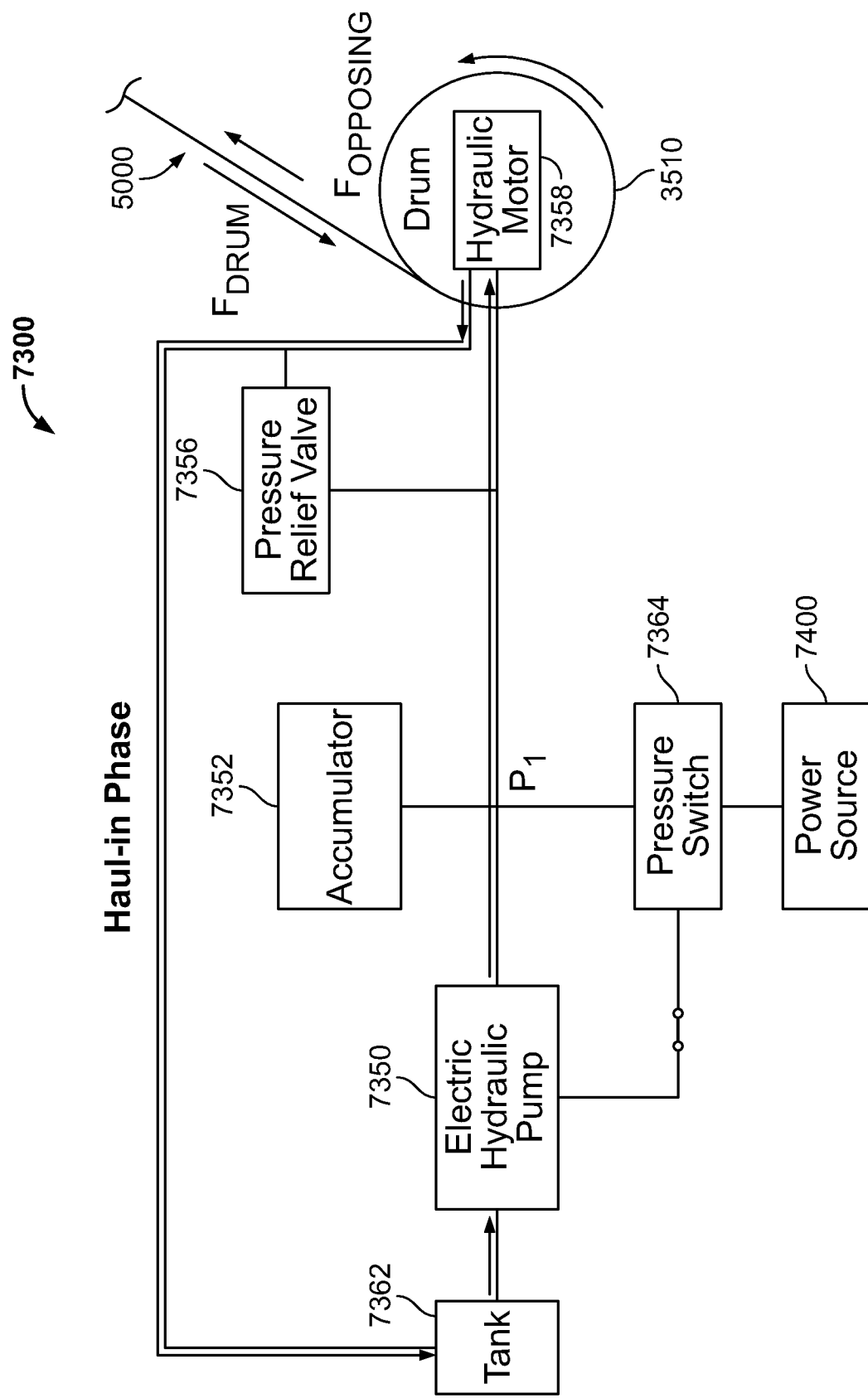
FIG. 10A is a schematic block diagram of a hydraulic system of the anchor system of FIGS. 9A and 9B during a flexible capture member haul-in phase of the fixed-wing aircraft retrieval process.

FIG. 10A is a schematic block diagram of part of the hydraulic system 7300 during the flexible capture member haul-in phase (sometimes called the "haul-in phase" for brevity) of the fixed-wing aircraft retrieval process. The haul-in phase is defined for the purposes of this section as occurring when the force $F_{DRUM}$ the drum 3510 imposes on the flexible capture member (via the torque the hydraulic motor 7358 exerts on the coupler 3532) exceeds any force $F_{OPPOSING}$ imposed on the flexible capture member 5000 that opposes $F_{DRUM}$ (such as when the flexible capture member is slack below a recently captured fixed-wing aircraft or when the multicopter is descending following capture of the fixed-wing aircraft).

During the haul-in phase, the pressure P1 of the hydraulic fluid at the accumulator 7352 is or falls below the 650 psi pressure switch lower set point. Accordingly, the pressure switch 7364 electrically connects the electric hydraulic pump 7350 to the power source 7400. The electric hydraulic pump 7350 draws hydraulic fluid from the tank 7362 and pumps the hydraulic fluid at the pump outlet pressure to the inlet/outlet port of the hydraulic accumulator 7352, the inlet port of the pressure relief valve 7356, and the inlet port of the hydraulic motor 7358.

Since at this point the pressure P1 of the hydraulic fluid at the accumulator 7352 is less than the 800 psi pressure switch upper set point, the pressure switch 7364 continues electrically connecting the electric hydraulic pump 7350 to the power source 7400 throughout the haul-in phase.

Since the pressure P1 at the accumulator 7352 is less than the 850 psi pressure relief valve set point, the pressure relief valve 7356 prevents the hydraulic fluid from flowing through it.

The hydraulic fluid instead flows through the hydraulic motor 7358 and exits the outlet port of the hydraulic motor 7358. The flow of the hydraulic fluid through the hydraulic motor 7358 in this direction (i.e., from inlet port to outlet port) causes the output shaft of the hydraulic motor 7358 to exert a counter-clockwise (from the viewpoint of FIG. 10A)

torque on the coupler 3532, which transmits that torque to the drum shaft 3520, which transmits that torque to the drum flanges 3512 and 3514, which transmits that torque to the drum 3510. This torque imposes a force $F_{DRUM}$ on the flexible capture member 5000 via the drum 3510. Since the force $F_{OPPOSING}$ on the flexible capture member 5000 is less than $F_{DRUM}$, the torque the hydraulic motor 7358 exerts on the coupler 3532 causes the drum 3510 to rotate counter-clockwise (from the viewpoint of FIG. 10A) relative to the anchor system base 3100. This causes the flexible capture member 5000 to wrap around the drum 3510 (and decrease the amount of flexible capture member 5000 extending between the drum 3510 and the multicopter 10)).

The hydraulic fluid flows from the outlet port of the hydraulic motor 7358 to the inlet port of the tank 7362.

In this example embodiment, the components and set points are sized, shaped, arranged, set, or otherwise configured such that $F_{DRUM}$ is about 80 pounds during the haul-in phase.

3.5.2 Neutral Phase

Figure 10B:
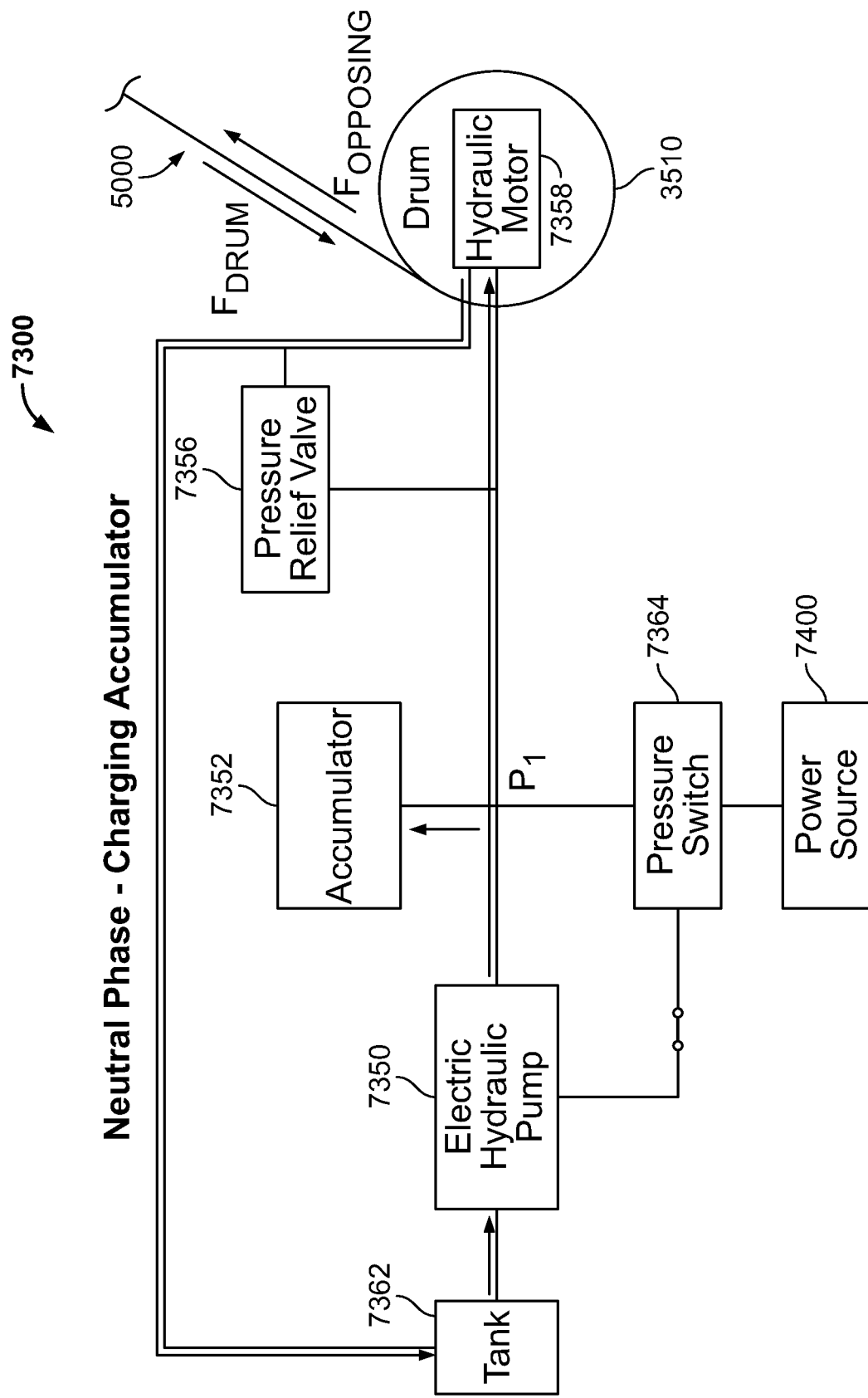
FIG. 10B is a schematic block diagram of the hydraulic system of FIG. 10A during a neutral phase of the fixed-wing aircraft retrieval process while the accumulator is charging.
Figure 10C:
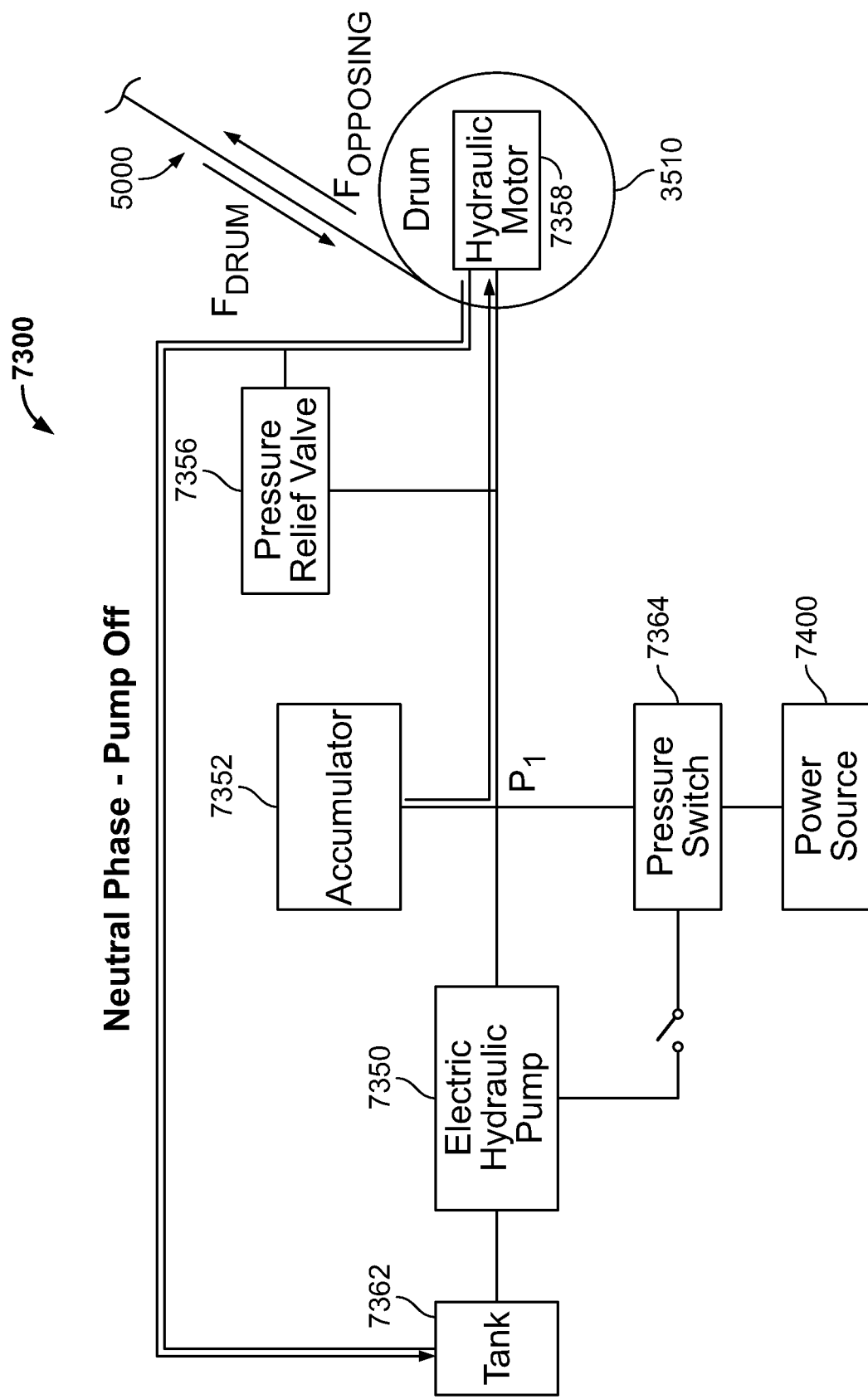
FIG. 10C is a schematic block diagram of the hydraulic system of FIG. 10A during a neutral phase of the fixed-wing aircraft retrieval process after the accumulator has been charged and the pump is powered off.

FIGS. 10B and 10C are schematic block diagrams of part of the hydraulic system 7300 during the flexible capture member neutral phase (sometimes referred to as the "neutral phase" for brevity) of the fixed-wing aircraft retrieval process. The neutral phase is defined for the purposes of this section as occurring when the force $F_{DRUM}$ the drum 3510 imposes on the flexible capture member (via the torque the hydraulic motor 7358 exerts on the coupler 3532) equals a force $F_{OPPOSING}$ imposed on the flexible capture member 5000 that opposes $F_{DRUM}$ (such as when the multicopter is station-keeping above the anchor system in preparation for fixed-wing aircraft retrieval).

During the neutral phase, the drum 3510 does not rotate relative to the anchor system base 3100. Even so, hydraulic fluid leaks through the hydraulic motor 7358 and drains into the tank 7362. The accumulator 7352 eliminates the need to constantly run the electric hydraulic pump 7350 during the neutral phase in response to this leakage and ensure $F_{DRUM}$ remains constant to regulate the tension in the flexible capture member 5000.

As shown in FIG. 10B, once $F_{OPPOSING}$ equals $F_{DRUM}$, the electric hydraulic pump 7350 continues to operate because P1 is less than the 650 psi pressure switch lower set point. But since hydraulic fluid flow through the hydraulic rotor 7358 has been reduced to mere leakage, pressure P1 begins to build and the accumulator 7352 begins charging. As shown in FIG. 10C, once the pressure P1 reaches the 800 psi pressure switch upper set point, the accumulator 7352 is charged and the pressure switch 7364 electrically disconnects the electric hydraulic pump 7350 from the power source 7400. The accumulator 7352 begins discharging to replenish the hydraulic fluid leaking through the hydraulic motor 7358. Once the pressure P1 falls below the 650 psi pressure switch lower set point, the pressure switch 7364 electrically connects the electric hydraulic pump 7350 to the power source 7400 to again charge the accumulator 7352. The use of the accumulator 7352 and the pressure switch 7364 therefore ensures that leakage through the hydraulic motor 7358 is accounted for and that $F_{DRUM}$ will not decrease as hydraulic fluid leaks through the hydraulic motor 7358.

In this example embodiment, the components and set points are sized, shaped, arranged, set, or otherwise configured such that $F_{DRUM}$ is about 80 pounds during the neutral phase.

3.5.3 Flexible Capture Member Payout Phase

Figure 10D:
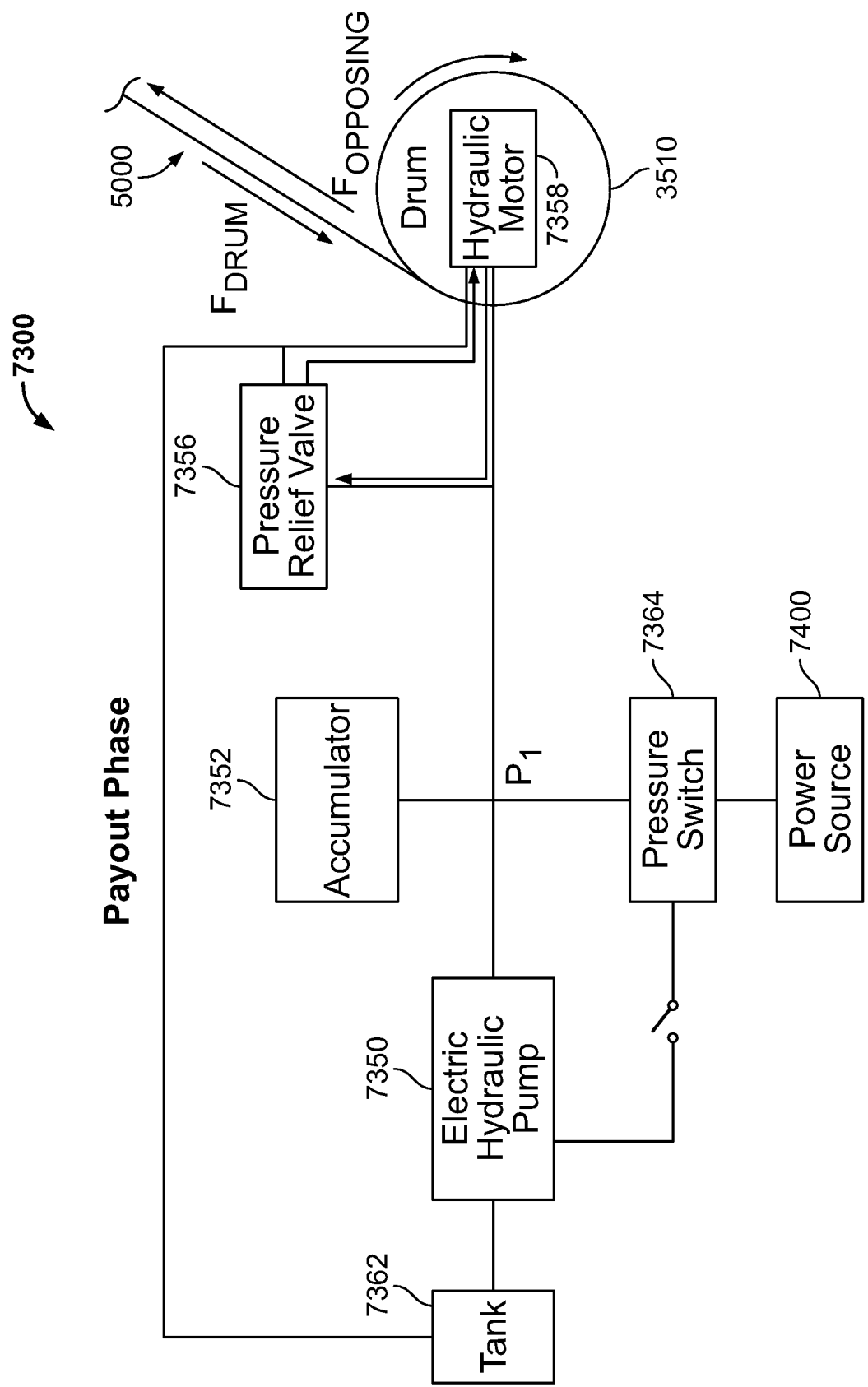
FIG. 10D is a schematic block diagram of the hydraulic system of FIG. 10A during a flexible capture member payout phase of the fixed-wing aircraft retrieval process.

FIG. 10D is a schematic block diagram of part of the hydraulic system 7300 during the flexible capture member payout phase (sometimes referred to as the "payout phase" for brevity) of the fixed-wing aircraft retrieval process. The payout phase is defined for the purposes of this section as occurring when the force $F_{DRUM}$ the drum 3510 imposes on the flexible capture member (via the torque the hydraulic motor 7358 exerts on the coupler 3532) is less than a force $F_{OPPOSING}$ imposed on the flexible capture member 5000 that opposes $F_{DRUM}$ (such as when the multicopter is climbing to prepare for fixed-wing aircraft retrieval or just after the fixed-wing aircraft captures and begins to deflect the flexible capture member).

During the payout phase, $F_{OPPOSING}$ causes the drum 3510 to spin clockwise (from the viewpoint of FIG. 10D) and pay out flexible capture member 5000 wrapped around the drum 3510 (and increase the amount of flexible capture member 5000 extending between the drum 3510 and the multicopter 10). This clockwise spinning of the drum 3510 forces hydraulic fluid to flow into the outlet port of the hydraulic motor 7358, through the hydraulic motor 7358, and exit the inlet port of the hydraulic motor 7358. Since hydraulic fluid cannot enter the outlet port of the electric hydraulic pump 7350, this causes the pressure P1 of the hydraulic fluid at the accumulator 7352 to increase. Once the pressure P1 reaches the 850 psi pressure relief valve set point, the pressure relief valve 7356 enables hydraulic fluid to flow through it. This causes hydraulic fluid to flow from the inlet port of the hydraulic motor 7358 to the inlet port of the pressure relief valve 7356 and from the outlet port of the pressure relief valve 7356 to the outlet port of the hydraulic motor 7358 until the drum 3510 stops rotating clockwise (from the viewpoint of FIG. 10D) and P1 drops below the 850 psi pressure relief valve set point.

During the payout phase, hydraulic fluid does not necessarily drain to the tank 7362, and the electric hydraulic pump 7350 thus doesn't need to replenish any drained hydraulic fluid. This means that P1 will not drop below the 650 psi pressure switch lower set point, and the pressure switch 7364 electrically disconnects the electric hydraulic pump 7350 from the power source 7400 during most (if not all) of the payout phase.

Accordingly, the relative positioning and configuration of the components of the hydraulic system enable the hydraulic motor to spin in either direction while maintaining torque on the drum shaft in the desired direction (counter-clockwise in the embodiment show in FIGS. 10A-10D) to maintain $F_{DRUM}$ on the flexible capture member.

In this example embodiment, $F_{DRUM}$ is controlled by the pressure relief valve set point (the higher the set point, the higher FORUM) and friction. In this example embodiment, FORUM is about 85 pounds during the payout phase (i.e., greater than FORUM in the haul-in and neutral phases).

4. Aircraft-Landing Device

Controlling the multicopter 10 post-capture to lower the fixed-wing aircraft 20a to the ground (or another non-compliant structure) risks damaging the fixed-wing aircraft 20a. For instance, the multicopter 10 could descend too quickly or stall while descending and drop, causing the fixed-wing aircraft 20a to impact the ground at high speed. Even a slow and well-controlled descent of the multicopter 10 could coincide with poorly timed pendulum swing of the fixed-wing aircraft 20a, resulting in damage when the fixed-wing aircraft 20a touches down on the surface.

In certain situations, a compliant aircraft-landing device 8000 is employed to gently receive the fixed-wing aircraft 20a post-capture and hold it in place above the ground (or other non-compliant surface) in a generally secure manner to facilitate retrieval at a later point. The use of this compliant aircraft-landing device 8000 minimizes potential impact damage to the fixed-wing aircraft 20a and enables the multicopter 10 to land the fixed-wing aircraft 20a on the aircraft-landing device 8000 and then land itself a safe distance away.

FIGS. 11A-11M illustrate one example embodiment of the aircraft-landing device 8000 and its components, which include: an inflatable aircraft-supporting body 8100; multiple gussets 8105; a tubular spacer guide 8110; spaced-apart cylindrical inflatable supports 8200a, 8200b, 8200c, and 8200d; a guiding assembly 8300 including a spacer 8310 and an upper guiding component 8400 and an intermediate guiding component 8500 attached to the spacer 8310; an inflation device 8600; a deflation device 8700; and a lower guiding and mounting component 8800.

The aircraft-supporting body 8100 is formed from one or more pieces of fabric material (such as nylon, polyester, dacron, vinyl, or other composite laminate sheets) that are stitched, adhered, or otherwise fastened together in an airtight manner to generally form a frustoconical shape when inflated. The gussets 8105 and the tubular spacer guide 8110 are made of similar material. As best shown in FIGS. 11E-11G, the tubular spacer guide 8110 is attached to the aircraft-supporting body 8100 in a suitable manner (such as via stitching or adhesive) near its top and extends from there into the interior of the aircraft-supporting body 8100. The gussets 8105 are attached to and extend radially between the spacer guide 8110 and an inner surface 8100a of the aircraft-supporting body 8100. These gussets 8105 and the spacer guide 8110 assist in maintaining the guiding assembly 8300 upright when the aircraft-supporting body 8100 is inflated.

Each support 8200a-8200d is formed from one or more pieces of material (such as any of those listed above) that are stitched, adhered, or otherwise fastened together in an airtight manner to generally form cylinders when inflated. The supports are attached to the underside of the aircraft-supporting body 8100 via stitching, adhesive, or any other suitable manner. The interiors of the supports 8200a-8200d are in fluid communication with the interior of the aircraft-supporting body 8100 to enable fluid (e.g., air) to flow among these components. This enables the aircraft-supporting body 8100 and the supports 8200a-8200d to be inflated via a single inflator attached to the inflation device 8600. The supports 8200a-8200d have ballast weights, also referred to herein as dumbbells 8205a-8025d respectively attached thereto. The dumbbells 8205a-8205d add weight to the supports 8200a-8200d to help maintain the aircraft-landing device 8000 upright as the fixed-wing aircraft 20a contacts the flexible capture member 5000, as described below. The dumbbells may be replaced with any suitable components that add weight to the supports. In one embodiment, the supports are partially filled with material, such as sand, to weigh them down. In other embodiments, stakes are used to anchor the supports to the ground instead of or in addition to weighted elements.

As best shown in FIGS. 11E-11G, the spacer 8310 of the guiding assembly 8300 extends through the spacer guide 8110 such that a first end 8310a of the spacer 8310 is external to the aircraft-supporting body 8100 and an opposing second end 8310b of the spacer 8310 is inside of the interior of the aircraft-supporting body 8100. Hose clamps (not labeled) or any other suitable devices clamp the upper portion 8100a of the aircraft-supporting body 8100 and the spacer guide 8110 to the exterior cylindrical surface 8310c of the spacer 8310 to attach these components to one another. The spacer 8310 includes a cylindrical interior surface 8310d that defines a flexible capture member receiving bore. The upper guiding component 8400 is attached to the first end 8310a of the spacer 8310 via suitable fasteners, and the intermediate guiding component 8500 is attached to the second end 8310b of the spacer 8310 via suitable fasteners.

Figure 11A:
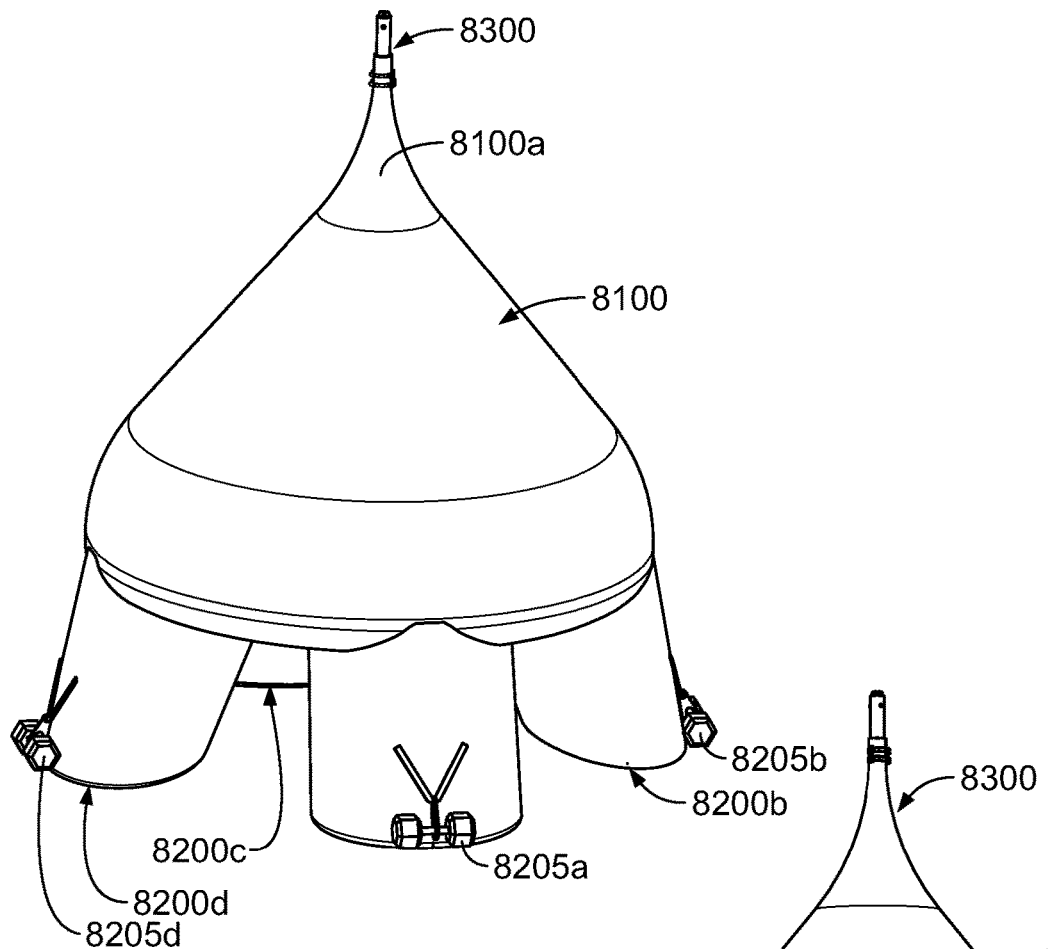
FIG. 11A is a top perspective view of an aircraft-landing device of the present disclosure.
Figure 11B:
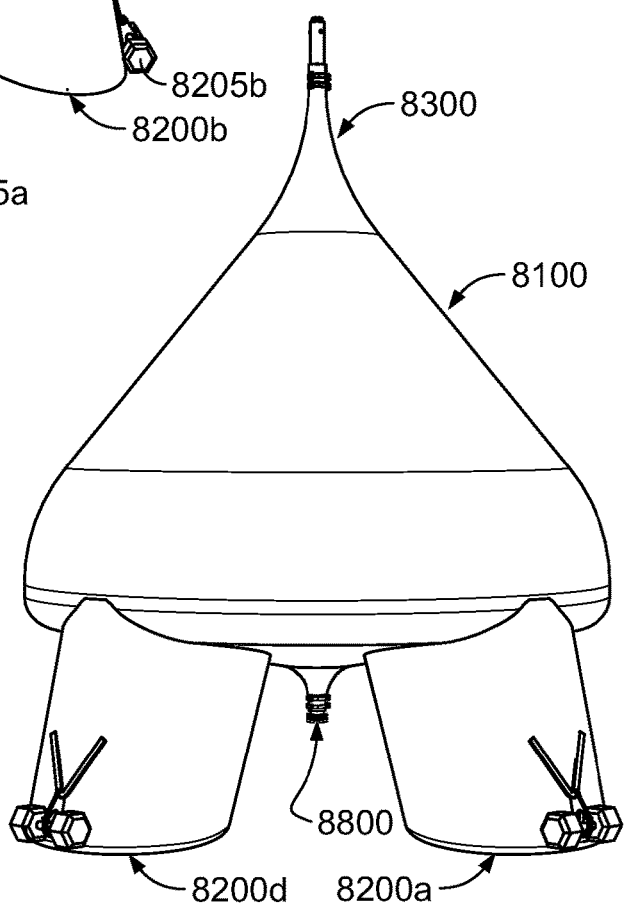
FIG. 11B is a front elevational view of the aircraft-landing device of FIG. 11A.
Figure 11C:
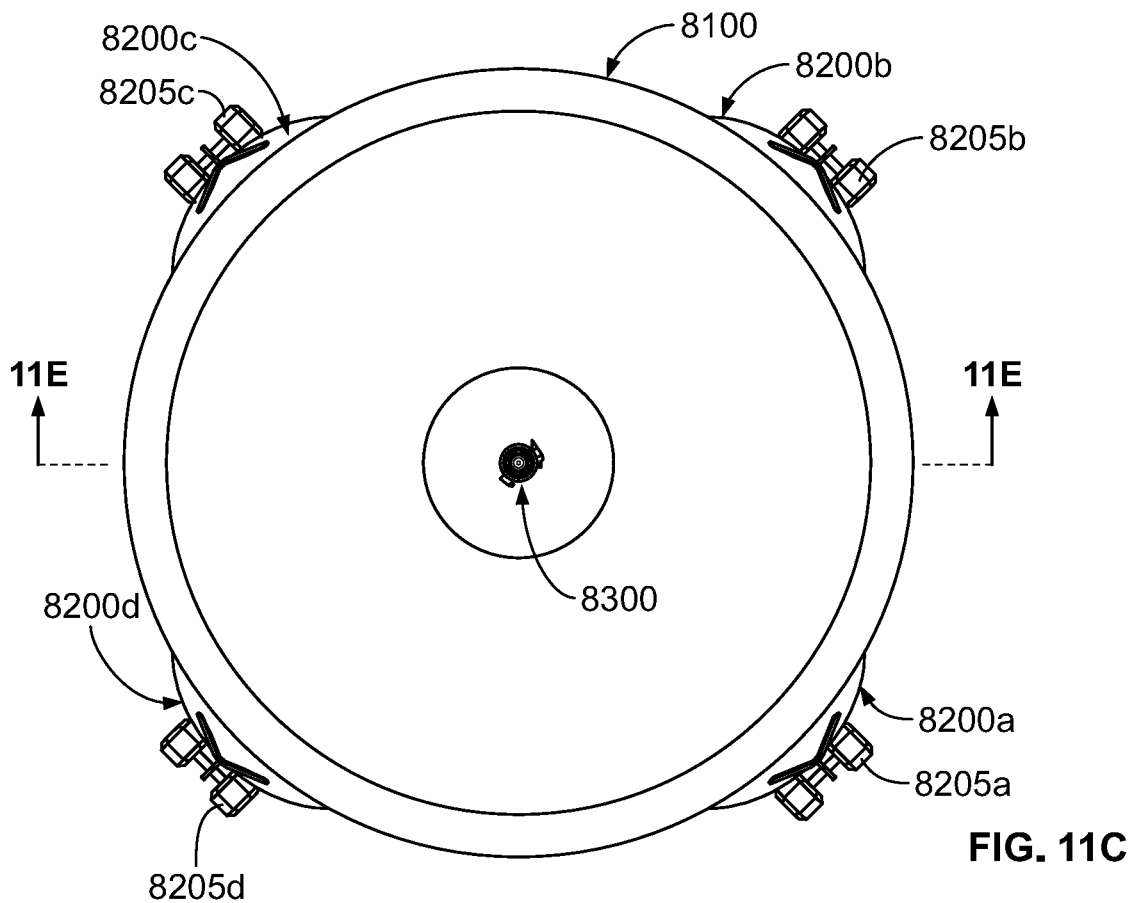
FIG. 11C is a top plan view of the aircraft-landing device of FIG. 11A.
Figure 11D:
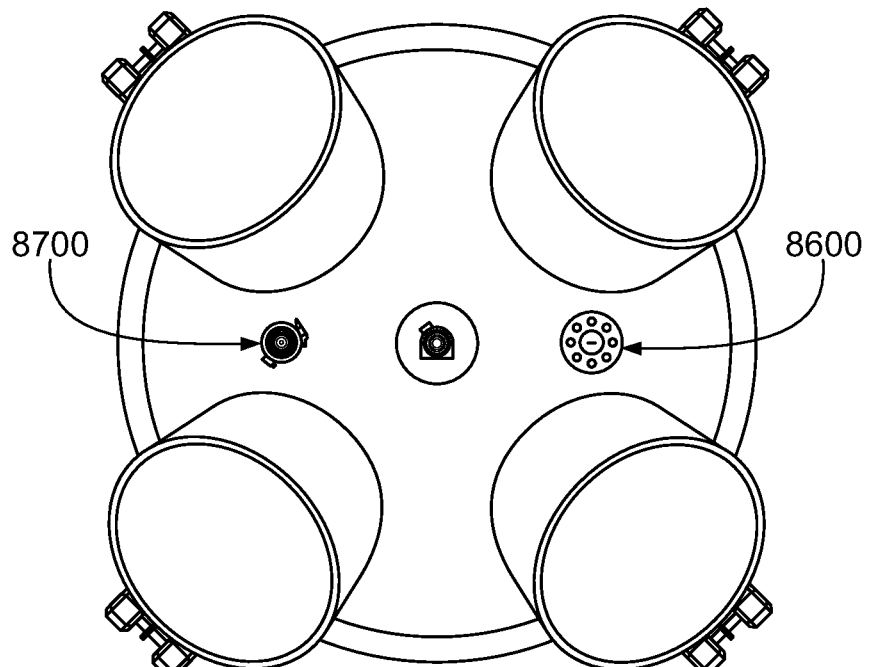
FIG. 11D is a bottom plan view of the aircraft-landing device of FIG. 11A.
Figure 11E:
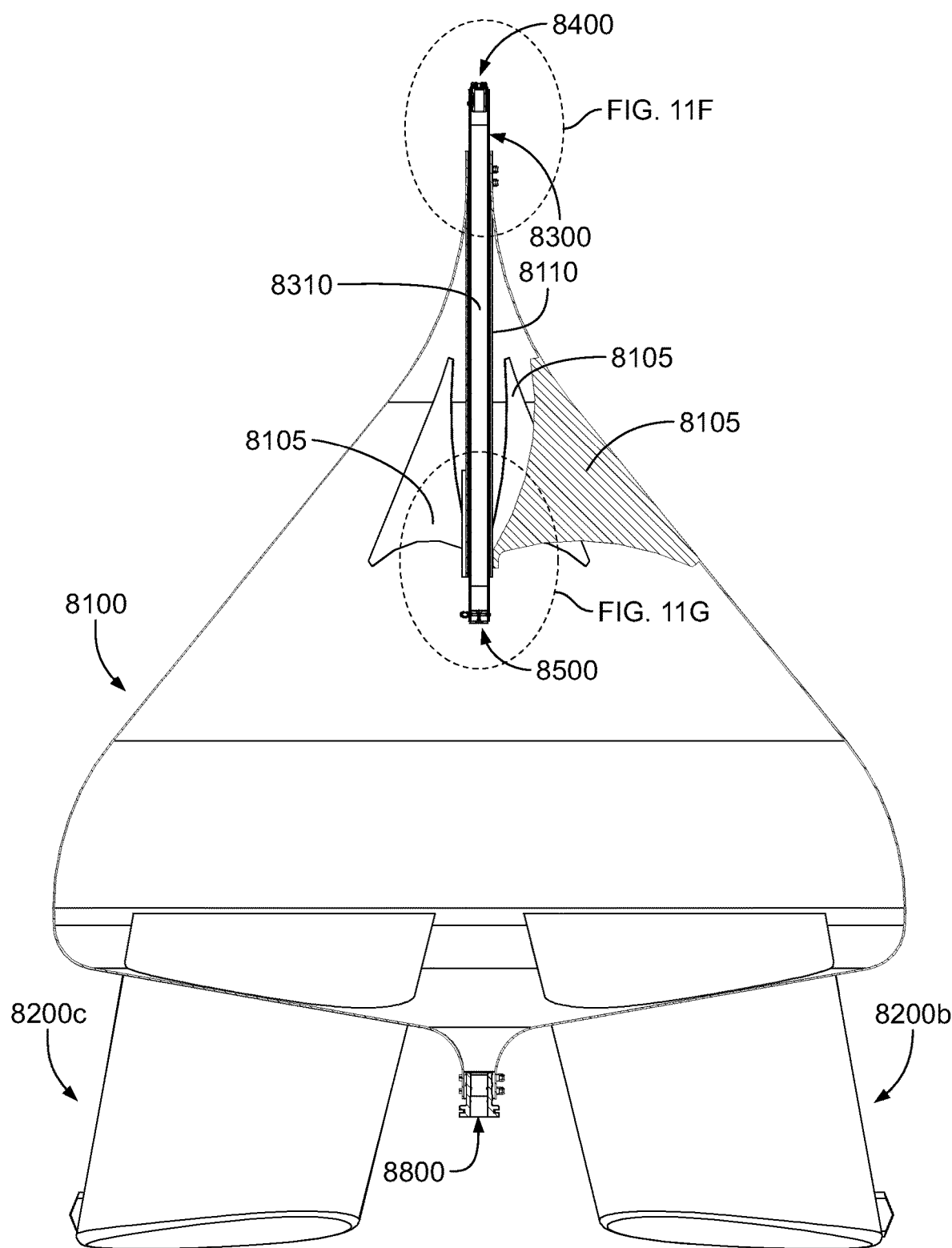
FIG. 11E is a cross-sectional side elevational view of the aircraft-landing device of FIG. 11A taken substantially along line 11E-11E of FIG. 11C.
Figure 11F:
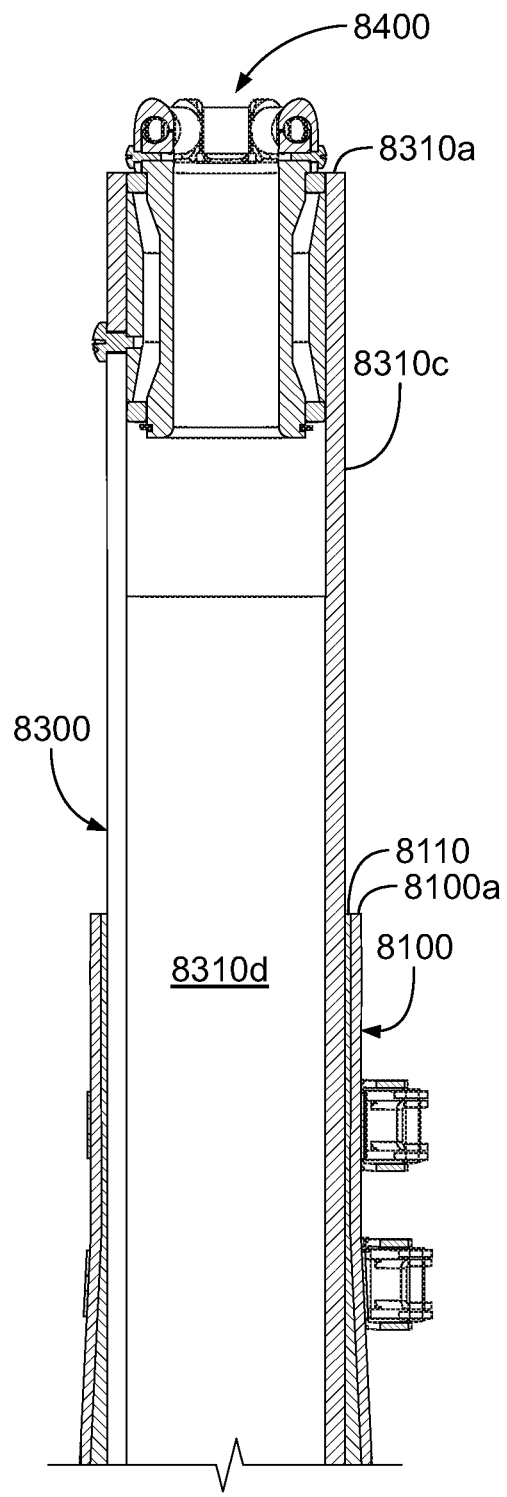
FIG. 11F is a cross-sectional side elevational view of an upper portion of the aircraft-landing device of FIG. 11A taken substantially along line 11E-11E of FIG. 11C.
Figure 11G:
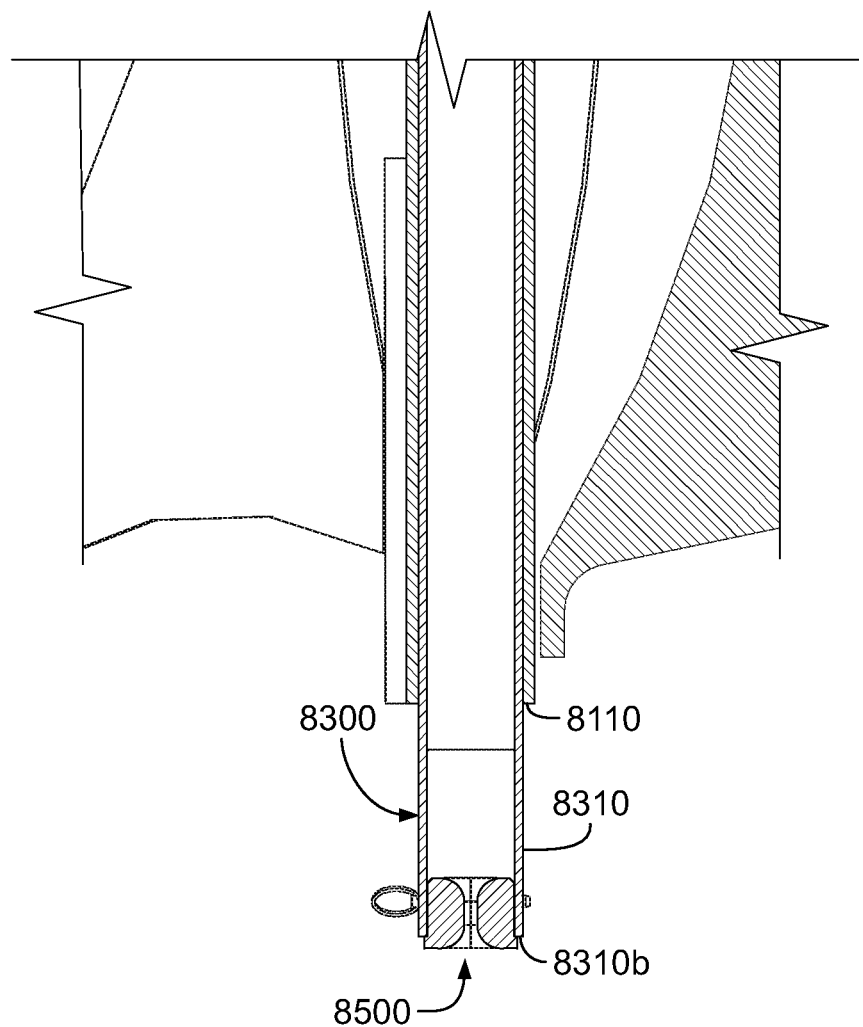
FIG. 11G is a cross-sectional side elevational view of an intermediate portion of the aircraft-landing device of FIG. 11A taken substantially along line 11E-11E of FIG. 11C.
Figure 11I:
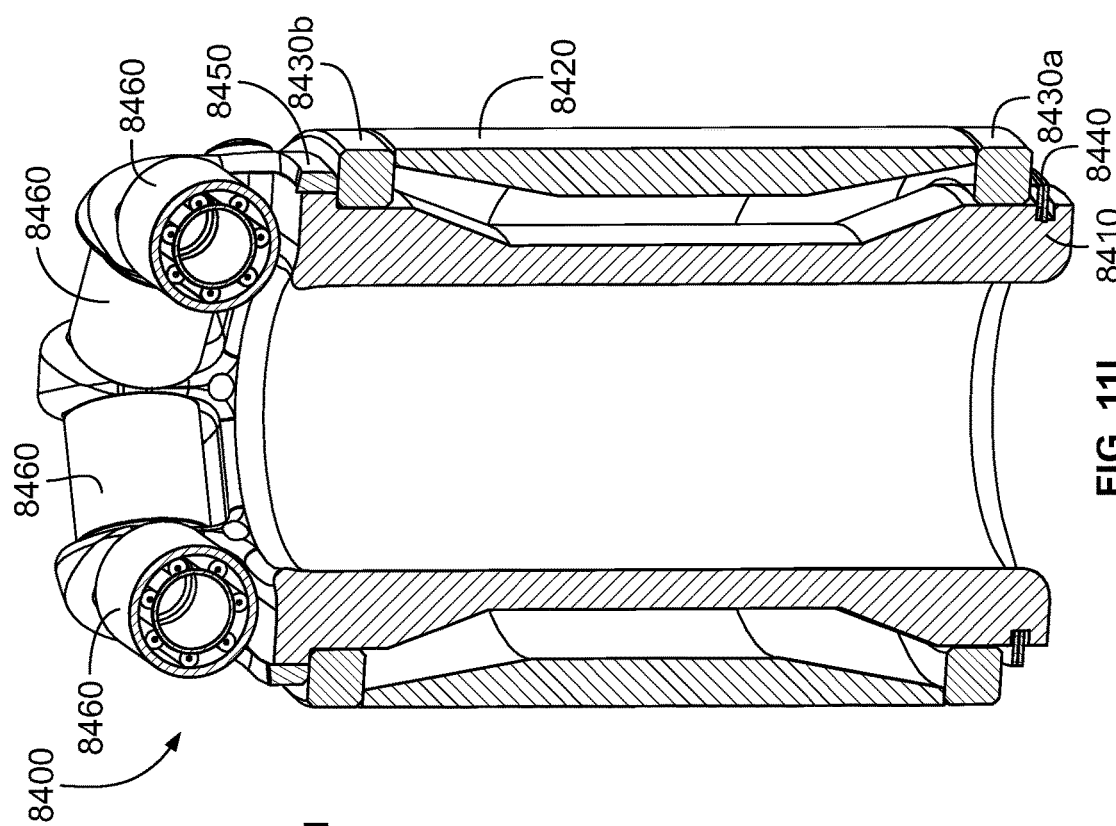
FIG. 11I is a cross-sectional side elevational view of the upper guiding component of FIG. 11H taken substantially along line 11I-11I of FIG. 11H.
Figure 11H:
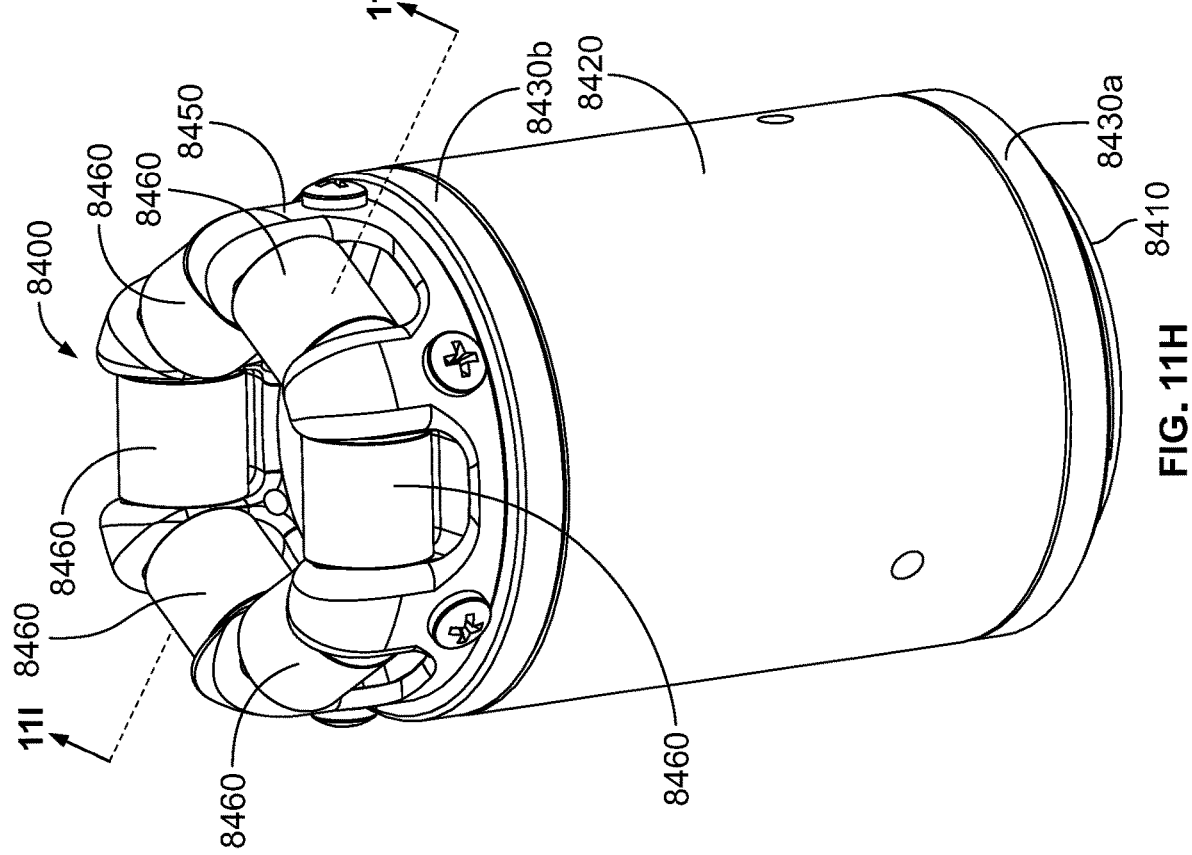
FIG. 11H is a top perspective view of an upper guiding sealing component of the aircraft-landing device of FIG. 11A.

As best shown in FIGS. 11H and 11I, the upper guiding component 8400 includes a tubular body 8410, a tubular mounting element 8420, lower and upper roller bearings 8430a and 8430b, a retaining element 8440, a needle bearing supporter 8450, and multiple needle bearings 8460.

The body 8410 defines a cylindrical interior surface 8412 that forms a flexible capture member receiving bore therethrough. The mounting element 8420 surrounds part of the body 8410. The upper roller bearing 8430b surrounds part of the body 8410 and is positioned between an upper surface (not labeled) of the mounting element 8420 and a lip (not labeled) of the body 8410. The lower roller bearing 8430a surrounds part of the body 8410 and is positioned between a lower surface (not labeled) of the mounting element 8420 and the retaining element 8440, which is disposed within a channel defined around the circumference of the body 8410. The retaining element 8440 retains the body 8410, the mounting element 8420, and the roller bearings 8430a and 8430b in place relative to one another. The needle bearing supporter 8450 is attached to the body 8410 via fasteners, and the needle bearings 8460 are rotatably attached to the needle bearing supporter 8450 such that they can rotate relative to the needle bearing supporter 8450.

The mounting element 8420 of the upper guiding component 8400 is fixedly attached to the first end 8310a of the spacer 8310 of the guiding assembly 8300 via one or more fasteners. After attachment, the roller bearings 8430a and 8430b enable the body 8410 and the attached needle bearing supporter 8450 and needle bearings 8460 to rotate together about the longitudinal axis of the body 8410 relative to the mounting element 8430 and the guiding assembly 8300.

Figure 11J:
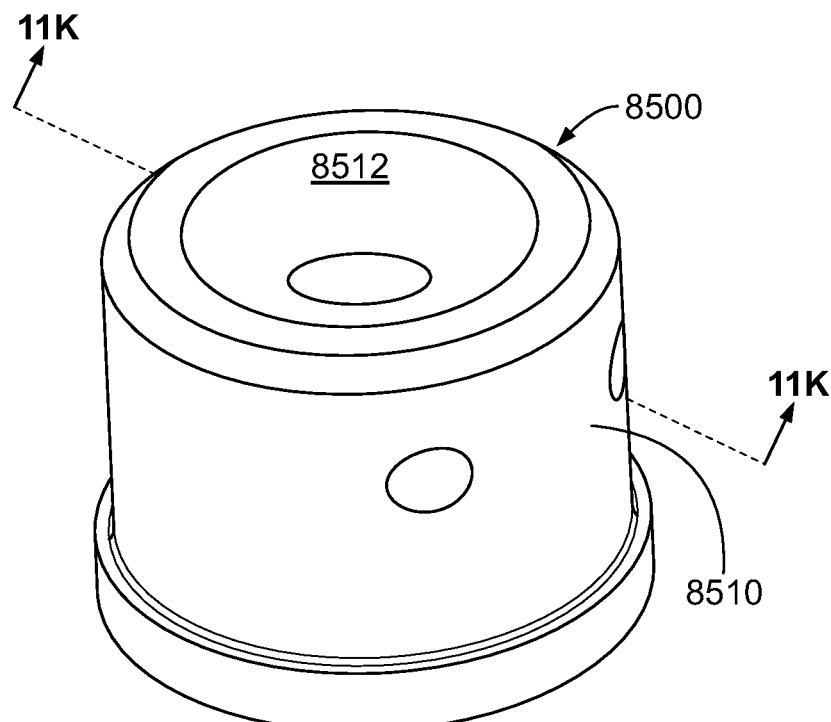
FIG. 11J is a top perspective view of the intermediate guiding component of the aircraft-landing device of FIG. 11A.
Figure 11K:
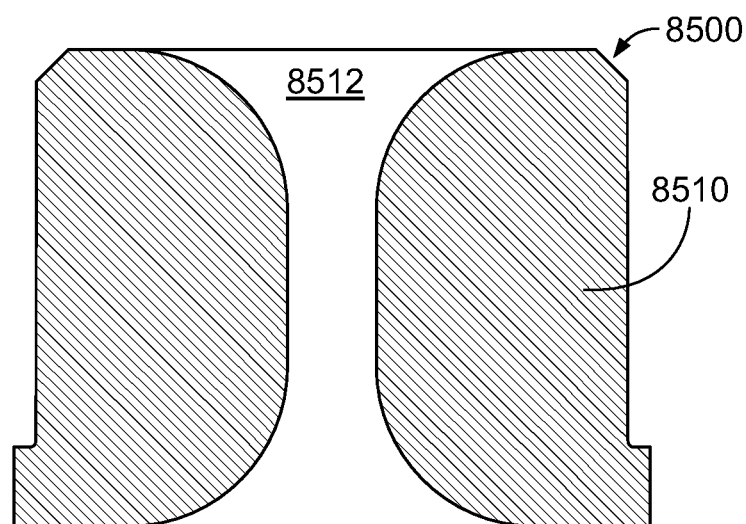
FIG. 11K is a cross-sectional side elevational view of the intermediate guiding component of FIG. 11J taken substantially along line 11K-11K of FIG. 11J.

As best shown in FIGS. 11J and 11K, the intermediate guiding component 8500 includes a body 8510 having an inner surface 8512. Moving from top to bottom in FIG. 11K, the inner surface 8512 tapers radially inwardly into a cylindrical shape and then tapers back radially outwardly. The inner surface 8512 defines a flexible capture member receiving bore. The body 8510 is fixedly attached to the second end 8310b of the spacer 8310 of the guiding assembly 8300 via one or more fasteners.

Figure 11L:
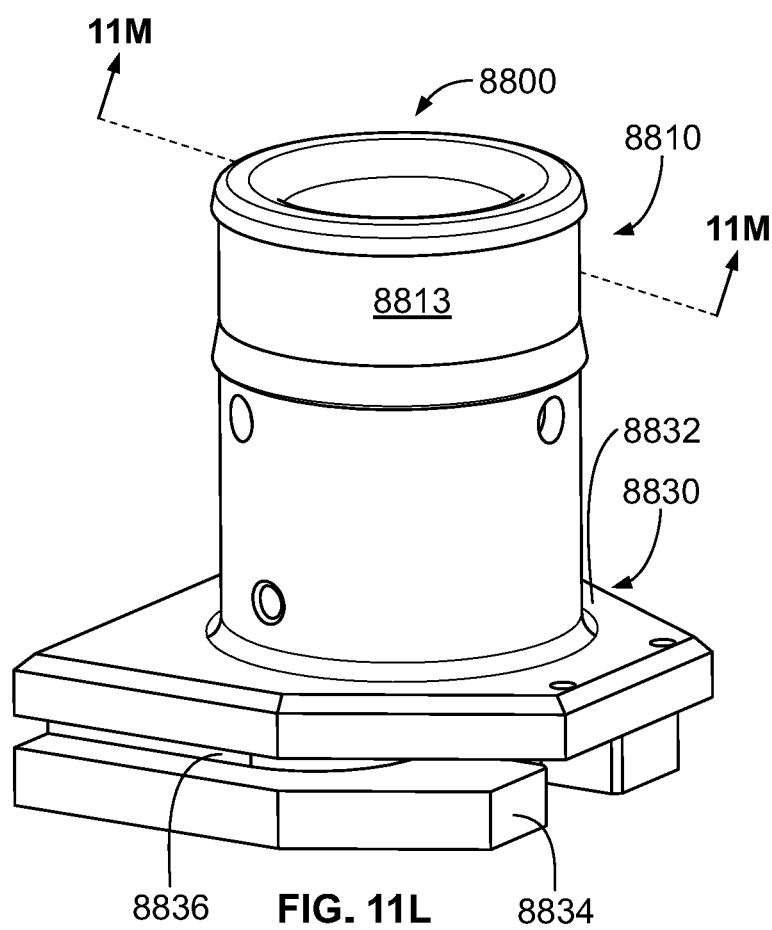
FIG. 11L is a top perspective view of the lower guiding and mounting component of the aircraft-landing device of FIG. 11A.
Figure 11M:
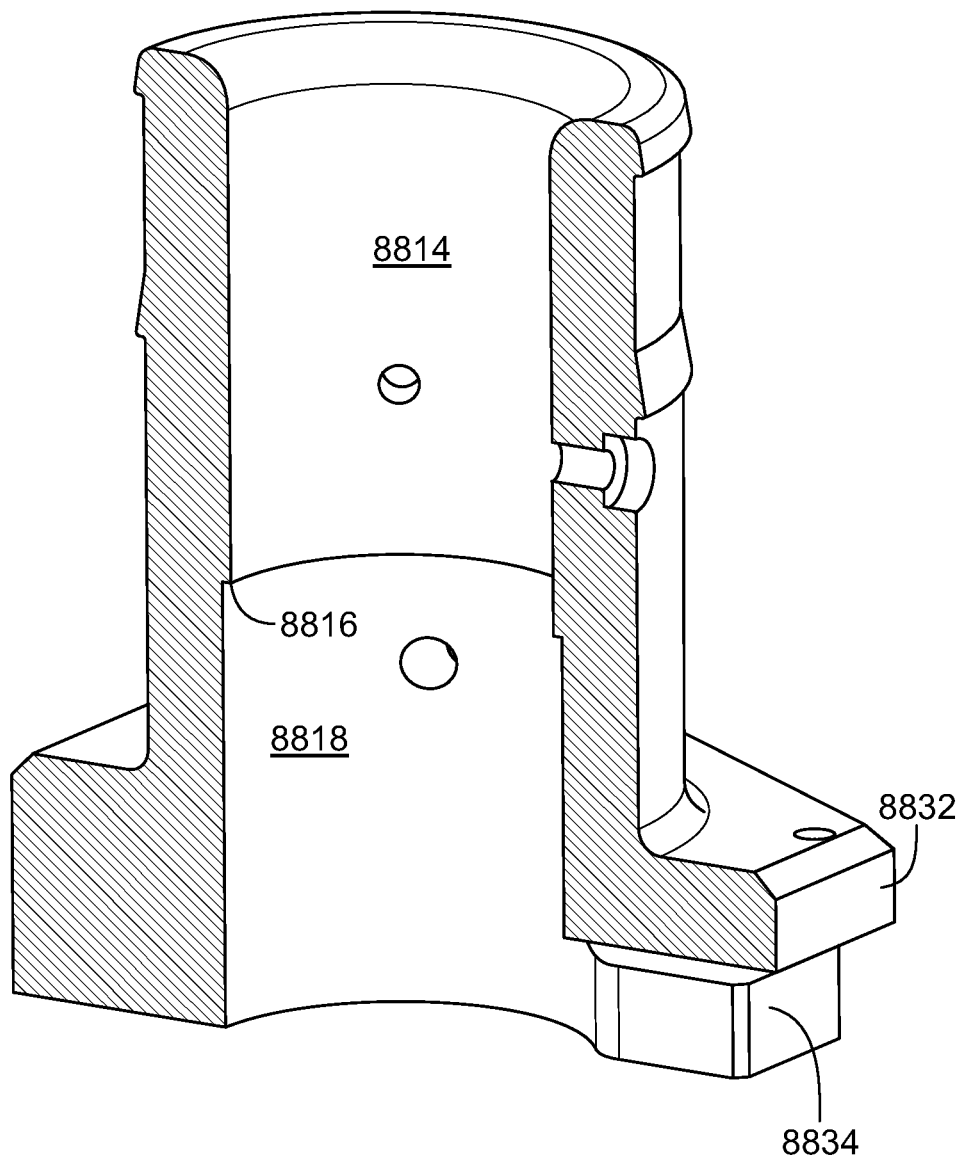
FIG. 11M is a cross-sectional side elevational view of the lower guiding and mounting component of FIG. 11L taken substantially along line 11M-11M of FIG. 11L.

As best shown in FIGS. 11L and 11M, the lower guiding and mounting component 8800 includes a transition assembly receiving component 8810 connected to an anchor system base mounting component 8830. The transition assembly receiving component 8810 is generally cylindrical and includes an exterior cylindrical aircraft-landing device attachment surface 8813 and interior cylindrical surfaces 8814 and 8818. An annular lip 8816 that extends radially outwardly from the cylindrical surface 8818 separates the interior cylindrical surfaces 8814 and 8818. The interior cylindrical surface 8814 defines a flexible capture member receiving bore, and the interior cylindrical surface 8818 defines a transition assembly receiving bore.

The anchor system base mounting component 8830 includes an upper portion 8832 and a lower portion 8834 spaced apart by a middle portion 8836. The middle portion 8836 is partially recessed radially inward relative to the upper and lower portions 8832 and 8834. This defines an anchor system base receiving channel (not labeled). As best shown in FIG. 11E, hose clamps (not labeled) clamp a lower portion (not labeled) of the aircraft-supporting body 8100 to the aircraft-landing device attachment surface 8813 of the transition assembly receiving component 8810 to attach these components to one another. The transition assembly receiving bore receives part of the transition assembly 3700 in the transition assembly receiving bore, and a fastener is used to attach the transition assembly 3700 to the transition assembly receiving bore. Once attached, the flexible capture member receiving bore of the lower guiding and mounting component 8800 is in fluid communication with the flexible capture member receiving bore of the transition assembly 3700. The lower guiding and mounting component 8800 is attached to the anchor system base 3100 via the anchor system base receiving channel. That is, the anchor system base 3100 slidably receives the lower guiding and mounting component 8800. A fastener may be used to further secure these elements together.

As best shown in FIG. 11D, the inflation device 8600 is attached to (such as via stitching, adhesive, or in any other suitable manner) and extends downward from the underside of the aircraft-supporting body 8100. The inflation device 8600 is in fluid communication with the interior of the aircraft-supporting body 8100 (which is in fluid communication with the interiors of the supports 8200a-8200d). The inflation device 8600 is sized, positioned, and otherwise configured to be attached to a suitable inflator (such as via a hose clamp or any other suitable manner of attachment) to enable inflation of the aircraft-supporting body 8100 and the supports 8200 and 8300 as described below.

As best shown in FIG. 11D, the deflation device 8700 is located on the underside of the aircraft-supporting body 8100. The deflation device 8700 includes a deflation element, such as a removable cap or a valve, that is switchable between a deflation configuration in which the deflation element enables air to flow out of the aircraft-supporting body 8100 and a sealed configuration in which the deflation element does not enable air to flow out of the aircraft-supporting body 8100. The deflation device 8700 enables an operator to quickly deflate the aircraft-supporting body 8100 and the supports 8200a-8200d with minimal effort, such as by removing a cap or opening a valve.

In another embodiment, the aircraft-landing device does not include the intermediate guiding element. In this embodiment, the upper guiding element and the lower guiding and mounting element are attached to opposing ends of the spacer such that the spacer extends between the upper guiding element and the lower guiding and mounting element.

In another embodiment, the anchor system base threadably receives the lower guiding and mounting component.

In other embodiments, the aircraft-supporting body includes stabilizing ribs extending along its tapered walls. In further embodiments, the bottom of the aircraft-supporting body is stiff in bending.

In another embodiment, a plurality of tension members are attached to and extend between the interior of the aircraft-supporting body and the outer surface of the flexible capture member receiving tube. These tension members help support the weight/tension of the flexible capture member receiving tube and help maintain the apex of the aircraft-landing device erect.

In certain embodiments, tie-downs (such as ropes, bungees, and the like) may be used to secure the aircraft-landing device to the ground or to a suitable base structure, such as the above-described aircraft system base.

In other embodiments, the aircraft-supporting body is formed from compliant rods rather than inflatable tubes.

5. Flexible Capture Member

As best shown in FIGS. 12F-12I, the flexible capture member 5000 is attachable to the rotorcraft 30 and the anchor system 3000 and threadable through the aircraft-landing device 8000 to facilitate retrieval of the fixed-wing aircraft 20a from free, wing-borne flight. The flexible capture member may be a rope (such as a Spectra rope) or other similar element.

In some embodiments, the flexible capture member includes an elastic portion, such as a bungee or similar element, at the end attachable to the rotorcraft. The elastic portion may be rigged such that a portion of the strain energy is directed into a damping element such as a metal ring or a one-way pulley. By rigging the elastic portion as a compliant damper (as opposed to a spring), more energy is absorbed during capture, and undesirable ricochet is minimized.

In some embodiments, the flexible capture member includes a capture portion that is thicker near its ends (such as within 12 feet of each end) that it is in its center. In one embodiment, both ends of the capture portion terminate in a Brummel eye splice in which the buried tails constitute the thicker portion of the capture portion.

In some embodiments in which the flexible capture member includes a rope, the flexible capture member includes an elastic member inside the core of the rope. The elastic member shortens the rope as it slackens and is wound onto the drum. During payout, the elastic member allows the rope to lengthen as it leaves the drum, and a lossy payout device is formed.

6. Accessories Container and Other Components

Figure 9H:
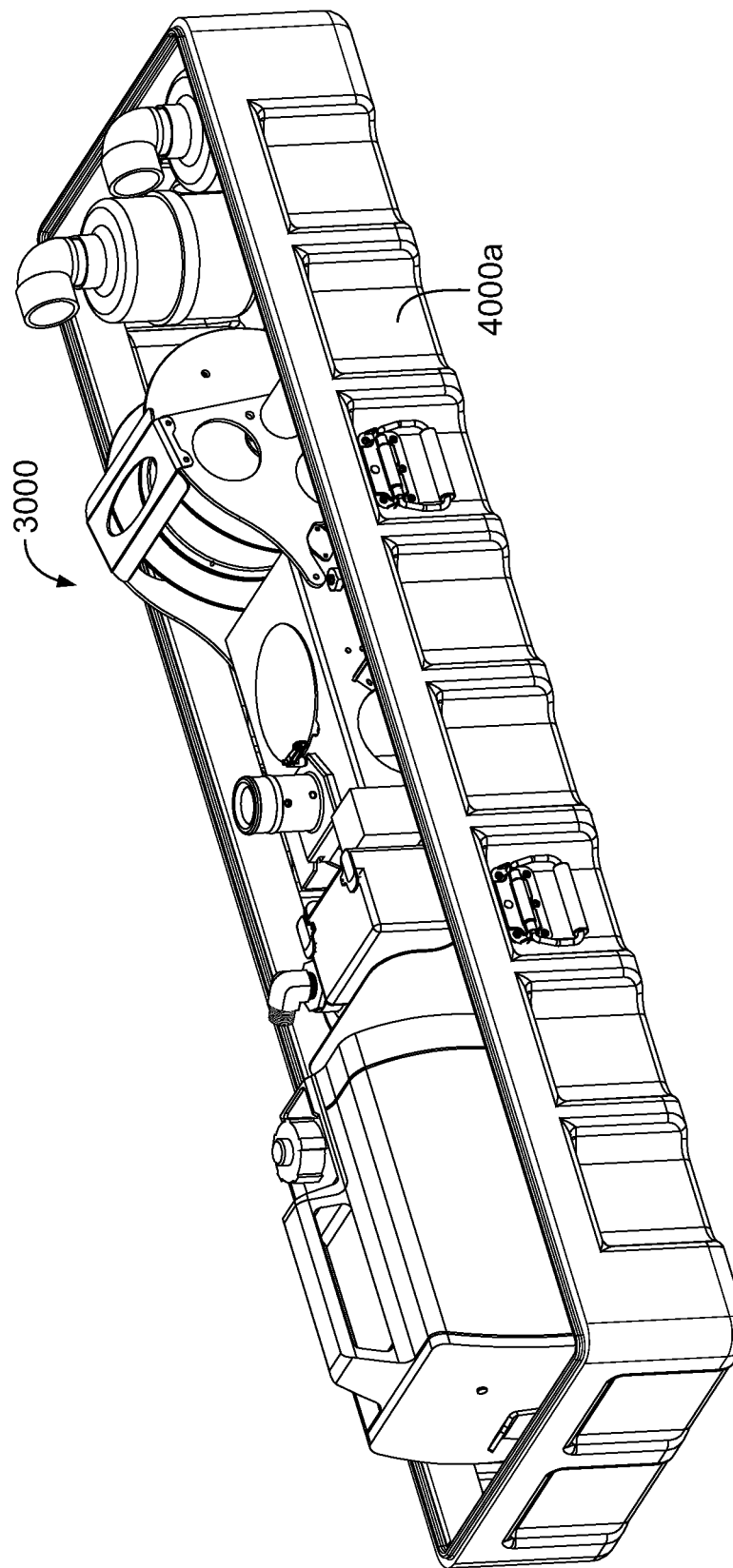
FIG. 9H is a top perspective view of the anchor system of FIGS. 9A and 9B stored in a storage container with other accessories.

As best shown in FIG. 9H, the anchor system 3000 is attached to the container bottom 4000a of an anchor system and accessory storage container to enable easy and compact storage of the anchor system 3000 and various accessories, such as (but not limited to): a generator; the flexible capture member 5000; an R/C transmitter stand that helps enforce geo-referenced joystick commands of the R/C controller; a fire extinguisher; shovels; hard hats. Further, certain components of the hydraulic system 7300 are attached to the container bottom 4000a.

7. Methods of Operation

As described in detail below: (1) the aircraft launch apparatus 10, the rotorcraft 30, and the storage and launch system 2000 are usable to facilitate launch of the fixed-wing aircraft 20a into free, wing-borne flight; and (2) the rotorcraft 30, the anchor system 3000, the flexible capture member 5000, and the aircraft-landing device 8000 are usable to facilitate retrieval of the fixed-wing aircraft 20a from free, wing-borne flight.

7.1 Rotorcraft-Assisted Fixed-Wing Aircraft Launch Method

FIGS. 12A-12E diagrammatically show launch of the fixed-wing aircraft 20a into free, wing-borne flight via use of the aircraft launch apparatus 10, the rotorcraft 30, and the storage and launch system 2000.

Figure 12A:
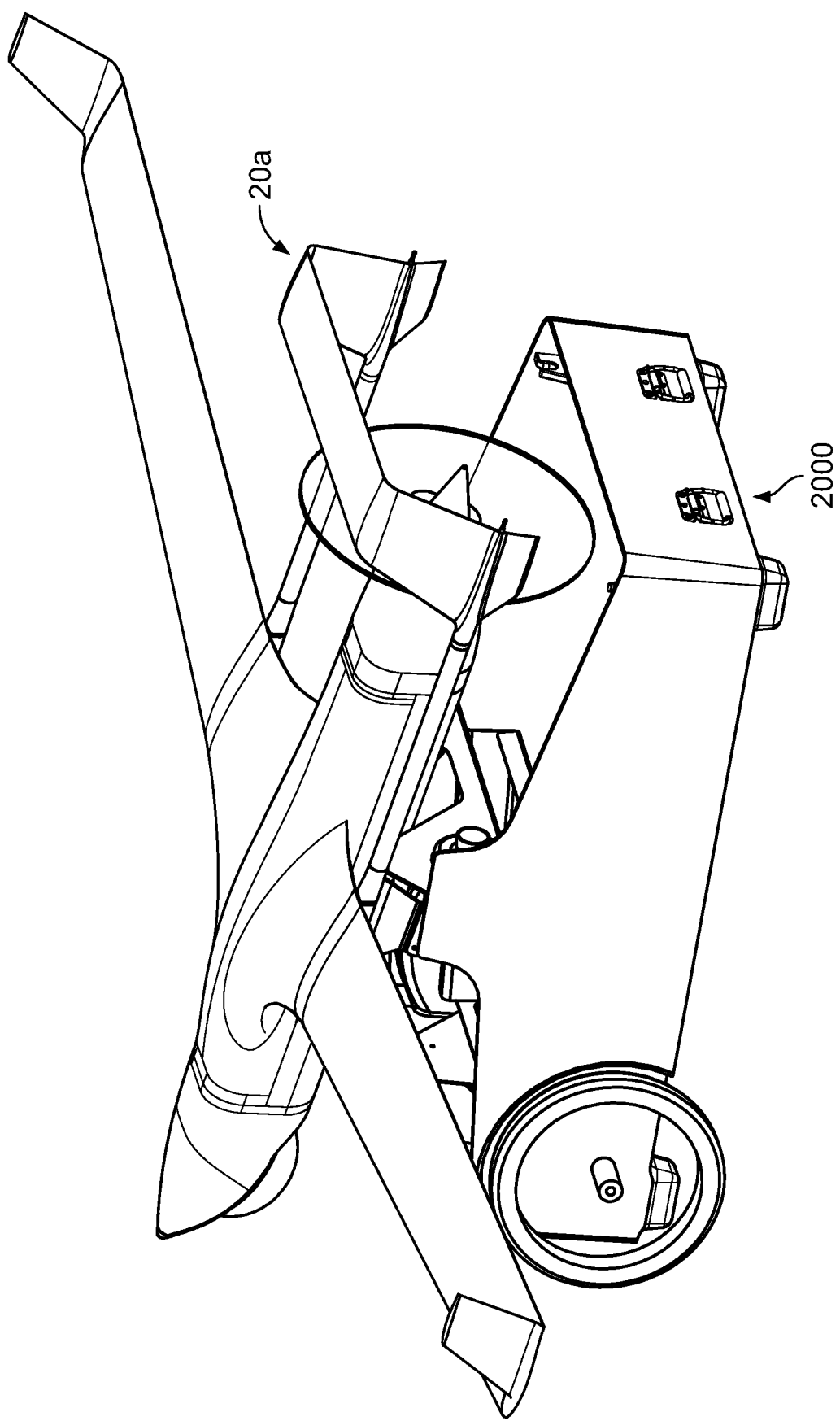
FIG. 12A is a diagrammatic view of the fixed-wing aircraft mounted to the storage and launch assembly.

The rotorcraft-assisted launch method for the fixed-wing aircraft 20a begins with the aircraft launch apparatus 10 disassembled and stored in the storage and launch system 2000. The aircraft launch apparatus operator unpacks the nine modules and then mounts the fixed-wing aircraft 20a to the launch-assist bracket 2200 by: (1) resting the first and second launch-assist elements that extend below the wings of the fixed-wing aircraft 20a on the first aircraft-engaging walls 2212a and 2212b of the first and second aircraft engagers 2210a and 2210b, respectively; and (2) enabling the fixed-wing aircraft 20a to slide down the first aircraft-engaging walls 2212a and 2212b (due to their sloped orientation) until the first and second launch-assist elements engage the slide-preventing devices 2216a and 2216b of the first and second aircraft engagers 2210a and 221b, respectively. At this point, the aircraft launch apparatus operator can release the fixed-wing aircraft 20a because the launch-assist bracket 2200 retains the fixed-wing aircraft 20a in the desired launch orientation. FIG. 12A shows the fixed-wing aircraft 20a mounted to the launch-assist bracket 2200.

The aircraft launch apparatus operator attaches the hub module 100 to the fixed-wing aircraft 20a by: (1) operating the front engager servo motor 6341 (either manually or remotely via the R/C controller) to rotate the front engager 6320 to the release rotational position; (2) inserting the trailing edges of the wings of the fixed-wing aircraft 20a into the trailing edge receiving channels 6364a of the pivotable portions 6364 of the rear engagers 6360; (3) positioning the saddle 300 relative to the fixed-wing aircraft 20a such that the leading edge engaging surfaces 6323b and 6326b of the front engager 6320 are adjacent the leading edges of the wings of the fixed-wing aircraft 20a; (4) operating the front engager servo motor 6341 (either manually or remotely via the R/C controller) to rotate the front engager 6320 to the attached rotational position such that the leading edge engaging surfaces 6323b and 6326b of the front engager 6320 contact the leading edges of the wings of the fixed-wing aircraft 20a; and (5) operating the lock servo motor 6345 (either manually or remotely via the R/C controller) to rotate the lock arm 6346a into the front engager rotation-preventing rotational position so the locking extension 6346a on the end of the lock arm 6346 engages the front engager arm lock device 6342a of the front engager arm 6342.

At this point the fixed-wing aircraft 20a is attached to the saddle 300 because the front engager 6320 and the rear engagers 6360 engage the wings of the fixed-wing aircraft 20a therebetween. The pivotable portions 6364 of the rear engagers 6360 are rotationally positioned relative to the bodies 6362 of the rear engagers 6360 such that the trailing-edge engaging surfaces 6362a are not within the trailing-edge receiving channels of the pivotable portions 6364. The positioning of the servo spacer 6344b and the fact that the locking extension 6346a is engaged to the front engager arm lock device 6342a of the front engager arm 6342 ensure the front engager servo motor 6341 cannot rotate the front engager 6320 from the attached rotational position to the release rotational position. This prevents undesired release of the fixed-wing aircraft 20a from the saddle 300 (and the aircraft launch apparatus 10).

Figure 12B:
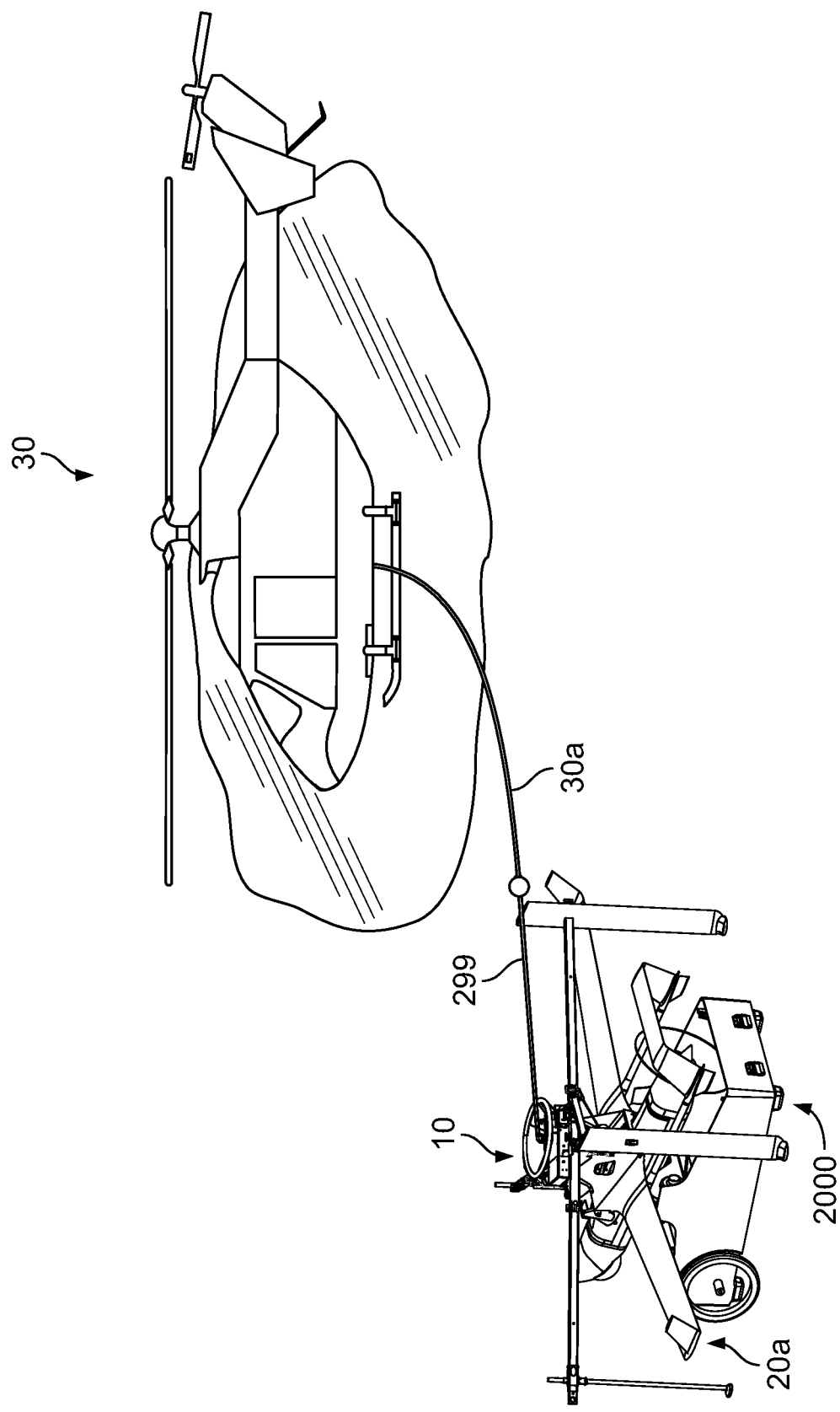
FIG. 12B is a diagrammatic view of the aircraft launch apparatus attached to the fixed-wing aircraft and the rotorcraft.

After the hub module 100 is attached to the fixed-wing aircraft 20a, the aircraft launch apparatus operator attaches the front and rear landing gear modules 600a to 600d to their respective arm modules 400a to 400d and attaches and locks the arm modules 400a to 400d to the hub module 100 to complete assembly of the aircraft launch apparatus 10. The aircraft launch apparatus operator attaches one end of the snag-prevention member 299 to the snag-prevention member attachment device 284 and the other end of the snag-prevention member 299 to a rotorcraft flexible member 30a, such as a suitable rope. The aircraft launch apparatus operator attaches the other end of the rotorcraft flexible member 30a to the rotorcraft 30, such as via a carabiner or other suitable attachment mechanism. The aircraft launch apparatus operator begins the engine start-up procedure for the fixed-wing aircraft 20a. FIG. 12B shows the assembled aircraft launch apparatus 10 attached to the fixed-wing aircraft 20a and to the rotorcraft 30 (via the rotorcraft flexible member 30a). The guard 282 prevents the snag-prevention member 299 from contacting the empennage or propeller of the fixed-wing aircraft 20a, and the snag-prevention member 299 helps keep the rotorcraft flexible member 30a from contacting the empennage or propeller of the fixed-wing aircraft 20a.

The rotorcraft operator controls the rotorcraft 30 to climb from its downwind pre-launch position, travel upwind until the rotorcraft 30 is above the aircraft launch apparatus 10 (and attached fixed-wing aircraft 20a), and ascend a safe altitude (about 700 feet or any other suitable distance) above ground level to lift the aircraft launch apparatus 10 (and attached fixed-wing aircraft 20a) from the launch-assist bracket 2200, as shown in FIG. 12C.

The rotorcraft operator controls the rotorcraft 30 to travel horizontally until reaching about 30 to 40 knots-indicated airspeed (or any other suitable knots-indicated airspeed), as shown in FIG. 12D. As the rotorcraft 30 travels horizontally, the rear landing gear of the aircraft launch apparatus 10 act as vertical stabilizers (or fins), which ensures that the front of the aircraft launch apparatus 10 and the nose of the attached fixed-wing aircraft 20a point generally into the airflow.

At this point, the aircraft launch apparatus operator controls the aircraft launch apparatus 10 to release the fixed-wing aircraft 20a from the saddle 300, as shown in FIG. 12E. Releasing the fixed-wing aircraft 20a from the saddle 300 is a two-step process. Releasing the fixed-wing aircraft 20a from the saddle 300 while the rotorcraft 30 is airborne is a two-step process. To release the fixed-wing aircraft 20a from the saddle 300 (and the aircraft launch apparatus 10), the operator first remotely controls the lock servo motor 6345 (via the R/C controller) to rotate the lock arm 6346 into the front engager rotation-enabling rotational position. Second, the operator remotely controls the front engager servo motor 6341 (via the R/C controller) to rotate the front engager 6320 from the attached rotational position to the release rotational position. As the front engager servo motor 6341 rotates the front engager 6320 from the attached rotational position to the release rotational position, the first and second leading edge engaging surfaces 6323b and 6326b of the front engager 6320 rotate away from and begin to lose contact with the leading edge of the wing of the fixed-wing aircraft 20a. As the front engager 6320 continues to rotate clear of the wings of the fixed-wing aircraft 20a, the pivotable portions 6364 of the rear engagers 6360 enable the fixed-wing aircraft 20a to freely pivot relative to the saddle base bracket 6310, the first and second saddle side brackets 6312 and 6314, and the bodies 6362 of the rear engagers 6360 as gravity pulls the nose of the fixed-wing aircraft 20a downward. As this occurs, the trailing edge engaging surfaces 6362a of the bodies 6362 of the rear engagers 6360 gradually enter the trailing-edge receiving channels of the pivotable portions 6364. As this occurs, the trailing-edge engaging surfaces 6362a contact the trailing edge of the wings and force them out of the trailing edge receiving channels, thus releasing the fixed-wing aircraft 20a from the saddle 300 (and the aircraft launch apparatus) into free flight. The trailing edge disengagement occurs before the empennage rotates into the aircraft launch apparatus support structure.

After release, the rotorcraft operator controls the rotorcraft 30 to travel to an aircraft launch apparatus landing area. The rotorcraft operator controls the rotorcraft 30 to descend until the aircraft launch apparatus 10 lands at the aircraft launch apparatus landing area. Afterwards, a ground crew may detach the snag-prevention member 299 from the rotorcraft flexible member 30a, thereby detaching the aircraft launch apparatus 10 from the rotorcraft 30. In certain embodiments, the aircraft launch apparatus 10 includes flexible members (such as ropes) that the ground crew can catch and hold to stop the aircraft launch apparatus 10 from spinning and/or swinging before it lands. The rotorcraft operator then controls the rotorcraft 30 to land elsewhere at a rotorcraft landing area.

If launch is aborted, the fixed-wing aircraft 30 is held securely by the aircraft launch apparatus 10 and held safely above the landing surface by virtue of the landing gear of the aircraft launch apparatus 10.

In other embodiments in which the saddle is that described in U.S. Patent Application Publication No. 2017/0158318, the fixed-wing aircraft launch method incorporates the procedure for releasing the fixed-wing aircraft from the saddle described in U.S. Patent Application Publication No. 2017/0158318.

7.2 Rotorcraft-Assisted Fixed-Wing Aircraft Retrieval Method

FIGS. 12F-12I diagrammatically show retrieval of the fixed-wing aircraft 20a from free, wing-borne flight via use of the rotorcraft 30, the anchor system 3000, the flexible capture member 5000, and the aircraft-landing device 8000. Although not shown below, a substantially similar process may be used to retrieve the fixed-wing aircraft 20b from free, wing-borne flight. FIG. 12J is a graph 7900 of the pressure P1 of the hydraulic fluid at the accumulator 7352 of the hydraulic system 7300 over time during the fixed-wing aircraft retrieval process. For simplicity, in this example embodiment P1 is assumed to be 0 psi at time T0.

To retrieve the fixed-wing aircraft 20a from free, wing-borne flight, the anchor system operator positions the anchor system 3000 at a retrieval location. Before time T0, while the electric hydraulic pump 7350 is switched off, the anchor system operator pulls some of the flexible capture member 5000 off of the drum 3510 and feeds it through the level wind system 3600 and around the transition pulley 3730 of the transition assembly 3700. From there, the anchor system operator feeds the flexible capture member 5000 through the flexible capture member receiving bores of the transition assembly 3700, the lower guiding and mounting component 8800, the intermediate guiding component 8500, and the upper guiding component 8400 such that the free end of the flexible capture member 5000 exits the upper guiding component 8400. The anchor system operator then attaches the free end of the flexible capture member 5000 to one end of the rotorcraft flexible member 30a attached to the rotorcraft 30. Since the flexible capture member 5000 is slack between the drum 7312 and the rotorcraft flexible member 30a, $F_{OPPOSING}$ is negligible at time T0. The anchor system operator activates a blower (not shown), which inflates the aircraft-landing device 8000.

At time T0, the anchor system operator switches the electric hydraulic pump 7350 on to begin a haul-in phase of the fixed-wing aircraft retrieval process to take up the slack in the flexible capture member 5000. Since P1 is 0 psi—i.e., less than the 400 psi pressure switch lower set point—the pressure switch 7364 electrically connects the power source 7400 and the electric hydraulic pump 7350. As described above, the electric hydraulic pump 7350 pumps hydraulic fluid at the 100 psi pump outlet pressure to drive the hydraulic motor 7358 to rotate the drum 3510 counterclockwise (from the viewpoint in FIG. 10A) and take up the slack in the flexible capture member 5000.

At time T1, all of the slack in the flexible capture member 5000 has wound around the drum 7312, and $F_{OPPOSING}$ equals $F_{DRUM}$. This begins a neutral phase of the fixed-wing aircraft retrieval process before rotorcraft climb. Flow through the hydraulic motor 7358 slows to mere leakage, and electric hydraulic pump 7350 begins charging the accumulator 7352. Once P1 reaches the 550 psi pressure switch upper set point, the pressure switch 7364 electrically disconnects the power source 7400 and the electric hydraulic pump 7350. The accumulator 7352 begins discharging to compensate for the hydraulic fluid leaking through the hydraulic motor 7358. The pressure switch 7364 continues alternating between electrically connecting and electrically disconnecting the power source 7400 and the electric hydraulic pump 7350 during the neutral phase so P1 alternates between 400 and 550 psi.

At time T2, the rotorcraft operator begins controlling the rotorcraft 30 to ascend to a retrieval position above the anchor system 3000. This begins a payout phase of the fixed-wing aircraft retrieval process. The climbing rotorcraft 30 exerts a force $F_{OPPOSING}$ on the flexible capture member 5000 that exceeds $F_{DRUM}$, which causes the drum 7312 to spin clockwise (from the viewpoint in FIG. 12D) and payout the flexible capture member 5000. As described above, this increases P1 to (or even above) the 600 psi pressure relief valve set point. Once the rotorcraft 30 reaches its desired height (just before time T3), the rotorcraft operator controls the rotorcraft 30 to stop climbing and begin station-keeping relative to the anchor system 3000. Since $F_{OPPOSING}$ equals $F_{DRUM}$, P1 decreases to 550 psi.

Figure 12F:
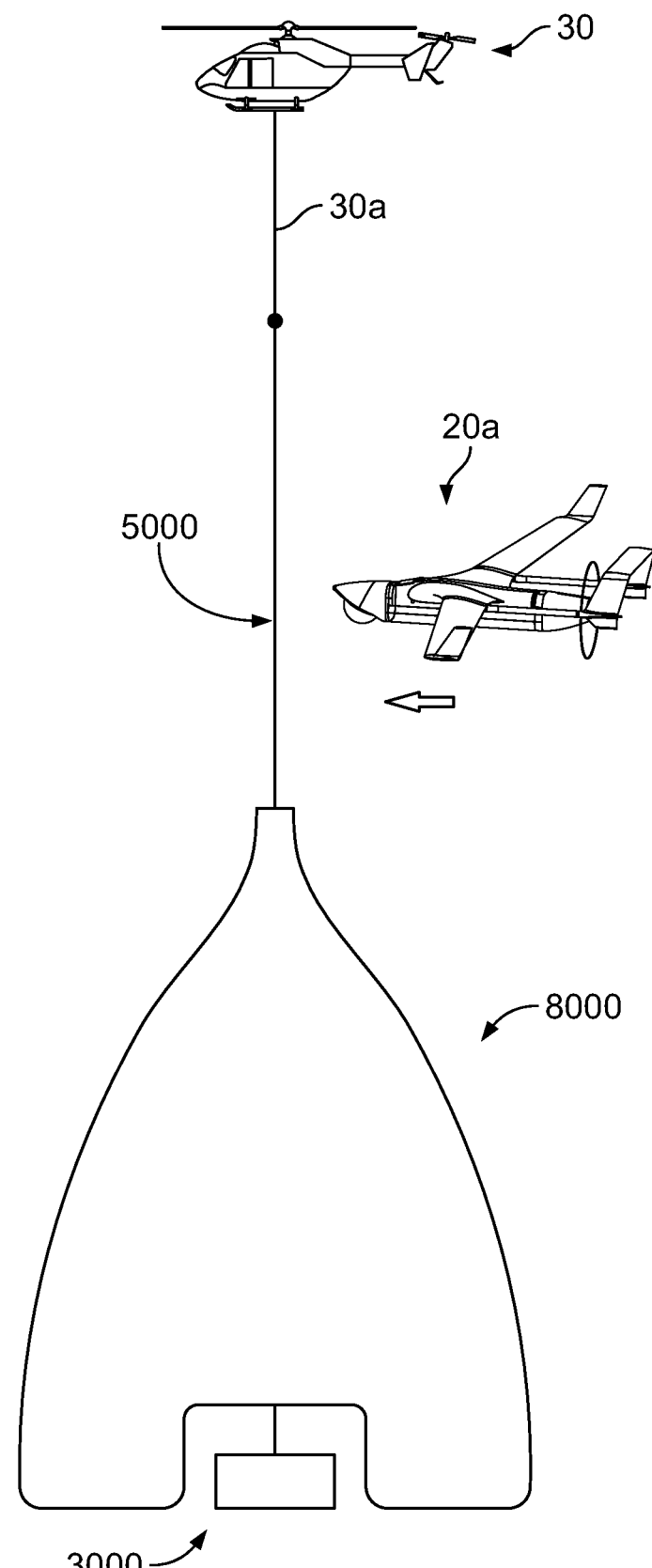
FIG. 12F is a diagrammatic view of the fixed-wing aircraft, the flexible capture member, the aircraft-landing device, and the anchor system just before the fixed-wing aircraft captures the flexible capture member.
Figure 12H:
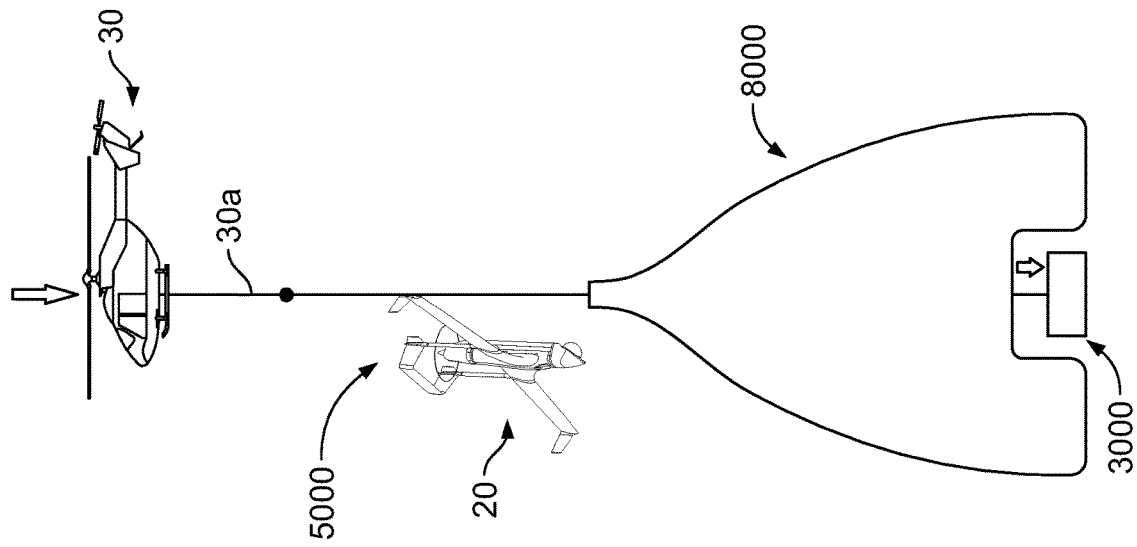
FIG. 12H is a diagrammatic view of the fixed-wing aircraft, the flexible capture member, the aircraft-landing device, and the anchor system after the fixed-wing aircraft has stopped moving and the anchor system has retracted the paid-out portion of the flexible capture member.

At time T3, as shown in FIG. 12F, the rotorcraft operator controls the rotorcraft 30 to station-keep relative to the anchor system 3000, at which point $F_{OPPOSING}$ equals $F_{DRUM}$. This begins a neutral phase of the fixed-wing aircraft retrieval process, described above with respect to T1 through T2.

Figure 12G:
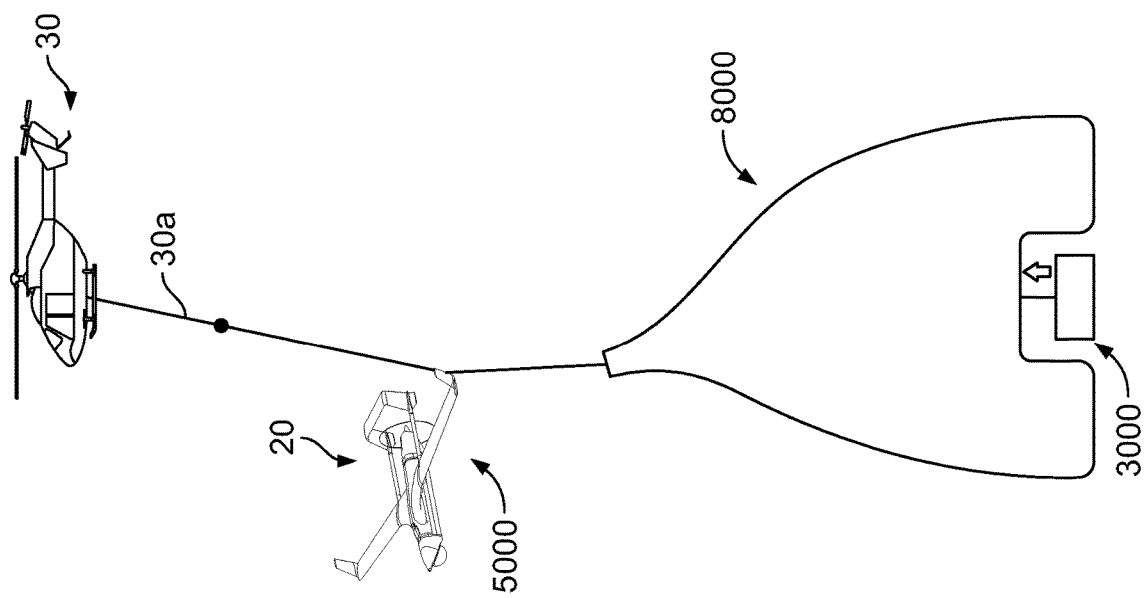
FIG. 12G is a diagrammatic view of the fixed-wing aircraft, the flexible capture member, the aircraft-landing device, and the anchor system just after the fixed-wing aircraft captures the flexible capture member and as the anchor system is paying out flexible capture member.

At time T4, as shown in FIG. 12G, the fixed-wing aircraft operator controls the fixed-wing aircraft 20a to contact and capture the flexible capture member 5000 extending between the rotorcraft flexible member 30a and the drum 7312. This begins a payout phase of the fixed-wing aircraft retrieval process. The impact of the fixed-wing aircraft 20a on the flexible capture member 5000 exerts a force $F_{OPPOSING}$ on the flexible capture member 5000 that exceeds $F_{DRUM}$, which causes the drum 7312 to spin clockwise (from the viewpoint in FIG. 10D) and payout the flexible capture member 5000. As described above, this increases P1 to (or even above) 600 psi—i.e., the pressure relief valve set point. In the payout phase, P1 maintains its 1,000 psi value as of time T4. Once the movement of the fixed-wing aircraft 20a has dampened such that $F_{OPPOSING}$ no longer exceeds $F_{DRUM}$ (just before time T5), P1 decreases to 550 psi.

At time T5, as shown in FIG. 12H, the rotorcraft operator controls the rotorcraft 30 to descend toward the aircraft-landing device 8000, and there is slack in the flexible capture member 5000 extending between the captured fixed-wing aircraft 20a and the drum 7312. Accordingly, $F_{OPPOSING}$ is less than $F_{DRUM}$, and the haul-in phase begins, as described above for time T0 through T1.

Figure 12I:
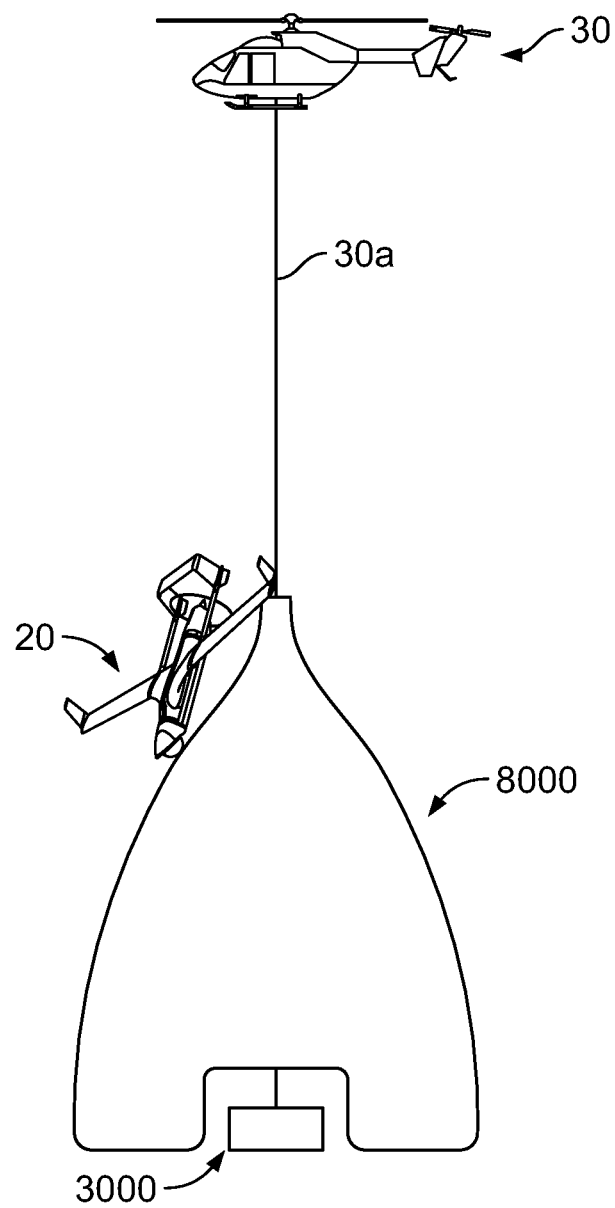
FIG. 12I is a diagrammatic view of the rotorcraft, the fixed-wing aircraft, the flexible capture member, the aircraft-landing device, and the anchor system after the rotorcraft has lowered the fixed-wing aircraft onto the aircraft-landing device.
Figure 12J:
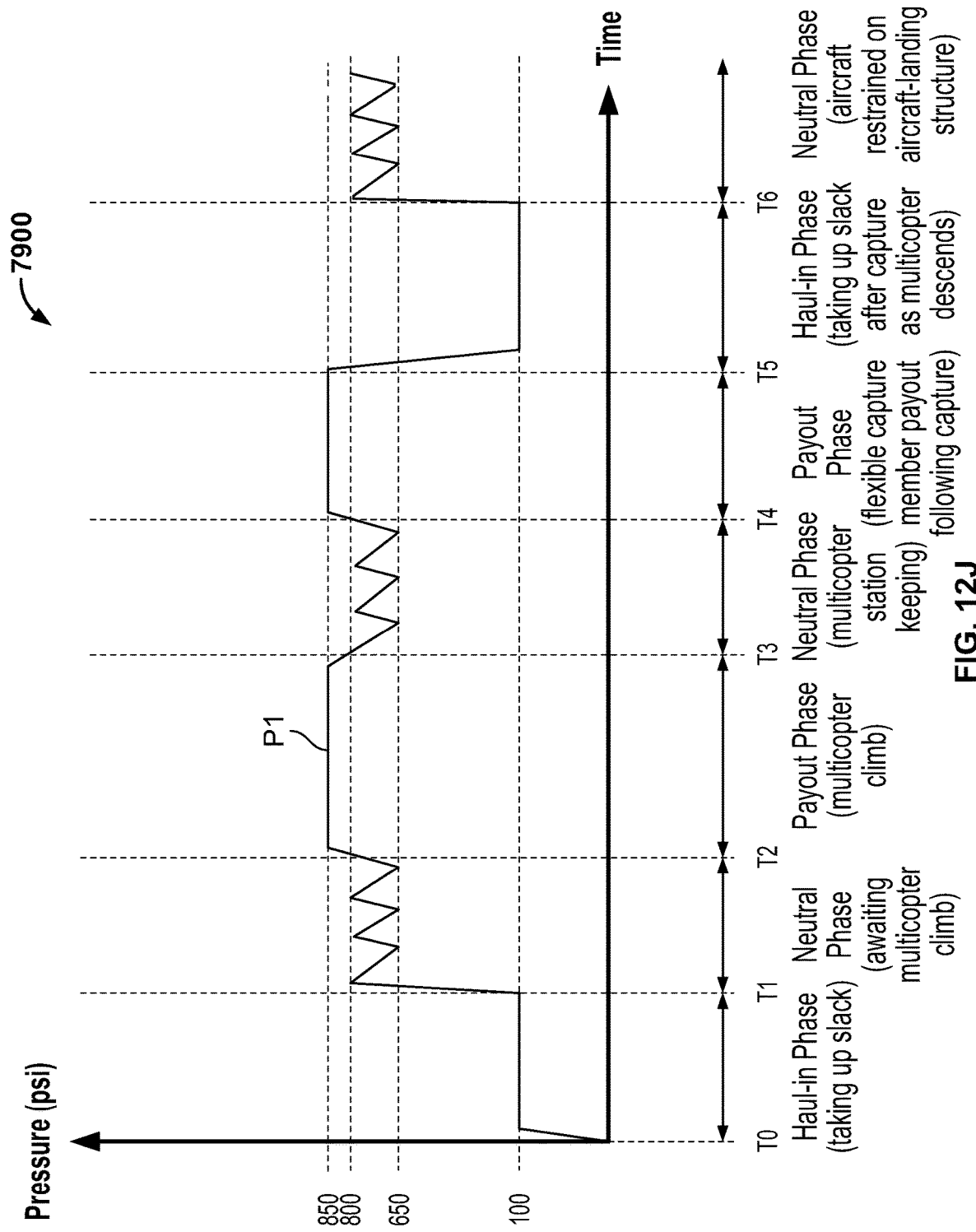
FIG. 12J is a graph of two pressures during the fixed-wing aircraft retrieval process employing the anchor system with the hydraulic system of FIGS. 10A-10D.

At time T6, as shown in FIG. 12I, after the fixed-wing aircraft 20a has reached and is resting on the aircraft-landing device 8000, the rotorcraft operator controls the rotorcraft 30 to hover, and $F_{OPPOSING}$ equals $F_{DRUM}$. This begins a neutral phase of the fixed-wing aircraft retrieval process, described above with respect to T1 through T2.

As the rotorcraft operator controls the rotorcraft 30 to hover, the ground crew detaches the rotorcraft flexible member 30a from the flexible capture member 5000. The rotorcraft operator controls the rotorcraft 30 to land clear of the aircraft-landing device 8000 and the fixed-wing aircraft 20a.

The anchor system 3000 is therefore configured to quickly and automatically modify its operation to regulate the force $F_{DRUM}$ applied to the flexible capture member as the fixed-wing aircraft retrieval process switches between the haul-in, neutral, and payout phases.

Various changes and modifications to the presently preferred embodiments described herein will be apparent to those skilled in the art. These changes and modifications can be made without departing from the spirit and scope of the present subject matter and without diminishing its intended advantages. It is intended that such changes and modifications be covered by the appended claims.

The invention claimed is:

1. A method for launching a fixed-wing aircraft into wing-borne flight, the method comprising:
    attaching a fixed-wing aircraft to an aircraft launch apparatus including a saddle disposed along a longitudinal axis of the fixed-wing aircraft by actuating one or more front engagers and one or more rear engagers to engage a top and a bottom of a first wing of the fixed-wing aircraft;
    attaching the aircraft launch apparatus to a rotorcraft;
    flying the rotorcraft to a designated altitude; and
    releasing the fixed-wing aircraft from the aircraft launch apparatus.

2. The method of claim 1, wherein the fixed-wing aircraft includes a fuselage between the first wing and a second wing and between a first front engager and a second front engager, and wherein attaching the fixed-wing aircraft to the saddle includes the first front engager engaging the top and bottom of the first wing and the second front engager engaging a top and bottom of the second wing.

3. The method of claim 2, wherein the first and second front engagers engage a leading edge of each of the first wing and the second wing.

4. The method of claim 1, which includes attaching the fixed-wing aircraft to the saddle by coupling each of the one or more front engagers to a leading edge of the first wing of the fixed-wing aircraft.

5. The method of claim 1, wherein actuating the one or more front engagers and one or more rear engagers of the saddle includes pivoting the one or more front engagers about a first axis and pivoting the one or more rear engagers about a second axis.

6. The method of claim 1, wherein actuating the one or more front engagers and one or more rear engagers of the saddle includes actuating the one or more front engagers to cause the one or more front engagers to pivot about a first axis, wherein pivoting motion of the one or more front engagers forces the one or more rear engagers to pivot about a second axis.

7. The method of claim 1, wherein the one or more front engagers and the one or more rear engagers are linked such that both one or more front engagers and the one or more rear engagers open simultaneously.

8. The method of claim 1, which includes attaching the fixed-wing aircraft to the saddle of the aircraft launch apparatus by actuating the one or more front engagers of the saddle relative to respective leading edges of the first wing and a second wing of the fixed-wing aircraft.

9. The method of claim 1, which includes attaching the fixed-wing aircraft to the saddle of the aircraft launch apparatus by actuating the one or more rear engagers of the saddle relative to respective trailing edges of the first wing and a second wing of the fixed-wing aircraft.

10. The method of claim 1, which includes stabilizing the aircraft about a vertical (yaw) axis using rear landing gear.

11. The method of claim 1, which includes flying the rotorcraft substantially horizontally at a designated speed prior to releasing the fixed-wing aircraft from the aircraft launch apparatus.

12. The method of claim 1, which includes attaching the aircraft launch apparatus to the rotorcraft via a flexible member.

13. A method for launching a fixed-wing aircraft into wing-borne flight, the method comprising:
    attaching a fixed-wing aircraft to an aircraft launch apparatus;
    attaching the aircraft launch apparatus to a rotorcraft;
    flying the rotorcraft to a designated altitude;
    releasing the fixed-wing aircraft from the aircraft launch apparatus; and
    stabilizing the fixed-wing aircraft during flight about a vertical (yaw) axis using rear landing gear.

14. The method of claim 13, which includes attaching the fixed wing aircraft to a saddle of the aircraft launch apparatus by actuating one or more front engagers and one or more rear engagers of the saddle.

15. The method of claim 14, which includes attaching the fixed wing aircraft to the saddle by coupling the one or more front engagers to a leading edge of a wing of the fixed-wing aircraft.

16. The method of claim 14, wherein the fixed-wing aircraft includes a fuselage between two wings, and which includes attaching the fixed-wing aircraft to the saddle by causing a first front engager to engage a top and bottom of a first wing and a second front engager to engage a top and bottom of a second wing.

17. The method of claim 14, wherein actuating the one or more front engagers and one or more rear engagers of the saddle includes pivoting the one or more front engagers about a first axis and pivoting the one or more rear engagers about a second axis.

18. The method of claim 14, wherein actuating the one or more front engagers and one or more rear engagers of the saddle includes actuating the one or more front engagers to cause the one or more front engagers to pivot about a first axis, wherein pivoting motion of the one or more front engagers forces the one or more rear engagers to pivot about a second axis.

19. The method of claim 14, wherein the one or more front engagers and the one or more rear engagers are linked such that both front and rear engagers open simultaneously.

20. The method of claim 13, which includes attaching the fixed-wing aircraft to a saddle of the aircraft launch apparatus by actuating one or more front engagers of the saddle relative to respective leading edges of wings of the fixed-wing aircraft.

21. The method of claim 13, which includes flying the rotorcraft substantially horizontally at a designated speed prior to releasing the fixed-wing aircraft from the aircraft launch apparatus.

22. The method of claim 13, which includes attaching the aircraft launch apparatus to the rotorcraft via a flexible member.

* * * * *